United States Patent
Jackson et al.

(10) Patent No.: US 11,287,946 B2
(45) Date of Patent: Mar. 29, 2022

(54) INTERACTIVE MENU ELEMENTS IN A VIRTUAL THREE-DIMENSIONAL SPACE

(71) Applicant: Apple Inc., Cupertino, CA (US)

(72) Inventors: Dean Jackson, Holt (AU); Antoine Quint, Paris (FR); Barry Munsterteiger, Belmont, CA (US)

(73) Assignee: APPLE INC., Cupertino, CA (US)

( * ) Notice: Subject to any disclaimer, the term of this patent is extended or adjusted under 35 U.S.C. 154(b) by 15 days.

(21) Appl. No.: 16/228,704

(22) Filed: Dec. 20, 2018

(65) Prior Publication Data

US 2019/0121517 A1     Apr. 25, 2019

Related U.S. Application Data

(63) Continuation of application No. 14/697,474, filed on Apr. 27, 2015, now Pat. No. 10,162,475, which is a continuation of application No. 13/110,464, filed on May 18, 2011, now abandoned.

(60) Provisional application No. 61/470,181, filed on Mar. 31, 2011.

(51) Int. Cl.
*G06F 3/0481* (2013.01)
*G06F 3/04815* (2022.01)
(Continued)

(52) U.S. Cl.
CPC ........ *G06F 3/04815* (2013.01); *G06F 3/0482* (2013.01); *G06F 3/0485* (2013.01)

(58) Field of Classification Search
CPC .... G06F 3/0482; G06F 3/013; G06F 3/04817; G06F 3/0416; G06F 3/0481;
(Continued)

(56) References Cited

U.S. PATENT DOCUMENTS 6,184,884 B1    2/2001  Nagahara et al.
6,456,262 B1 *  9/2002  Bell ..................... A61B 3/113
                                                    345/472
(Continued)

OTHER PUBLICATIONS

Office Action, dated Jul. 2, 2014, received in U.S. Appl. No. 13/110,464, 12 pages.
(Continued)

*Primary Examiner* — Phuong H Nguyen
(74) *Attorney, Agent, or Firm* — Morgan, Lewis & Bockius LLP

(57) ABSTRACT

The present technology includes displaying a user interface in a simulated three-dimensional environment that includes selectable user interface objects located at different simulated distances from a respective viewpoint in the simulated three-dimensional environment. One or more of the selectable user interface objects are displayed with a simulated depth of field effect that includes applying a respective degree of blurring to the one or more selectable user interface objects. In response to detecting a navigation input, the one or more user interface objects are displayed at a different position relative to the respective viewpoint, and the respective degree of blurring applied to the one or more user interface objects is updated based on the simulated depth of field effect and a respective current position of the one or more user interface objects relative to the respective viewpoint.

18 Claims, 52 Drawing Sheets

(51) Int. Cl.
*G06F 3/0482* (2013.01)
*G06F 3/0485* (2022.01)

(58) Field of Classification Search
CPC .. G06F 3/04842; G06F 3/048; G06F 3/04845;
G06F 3/04815; G06F 3/0485; G06F
2203/04802; G06K 9/00201; G06T 15/00
See application file for complete search history.

(56) References Cited

U.S. PATENT DOCUMENTS

| | | | |
|---|---|---|---|
| 6,538,635 B1 | 3/2003 | Ringot | |
| 6,690,391 B1 | 2/2004 | Proehl et al. | |
| 8,429,564 B2 * | 4/2013 | Alexanderovitc | G06F 1/1626 |
| | | | 715/757 |
| 2005/0091596 A1 * | 4/2005 | Anthony | G06F 3/0482 |
| | | | 715/712 |
| 2007/0296646 A1 | 12/2007 | Yamamoto et al. | |
| 2008/0155617 A1 | 6/2008 | Angiolillo et al. | |
| 2010/0333026 A1 | 12/2010 | Hooper et al. | |

OTHER PUBLICATIONS

Final Office Action, dated Jan. 15, 2015, received in U.S. Appl. No. 13/110,464, 16 pages.
Notice of Allowance, dated Aug. 15, 2018, received in U.S. Appl. No. 14/697,474, 5 pages.

* cited by examiner

```
Script Editor - Edit Carousel 01. jAd.createRing = function() {
02.     var items = shape.getElementsByTagName('li');
03.     var angle = 360 / items.length, newAngle;
04.     for(var i = 0, l = items.length; i < l; i++) {
05.         newAngle = (angle * i);
06.         var matrix = new WebKitCSSMatrix();
07.         items[i].style.webkitTransform = matrix.rotate
(newAngle, 0, 0).translate(0, 0, 380);
08.     }
09. }
```

FIG. 10B

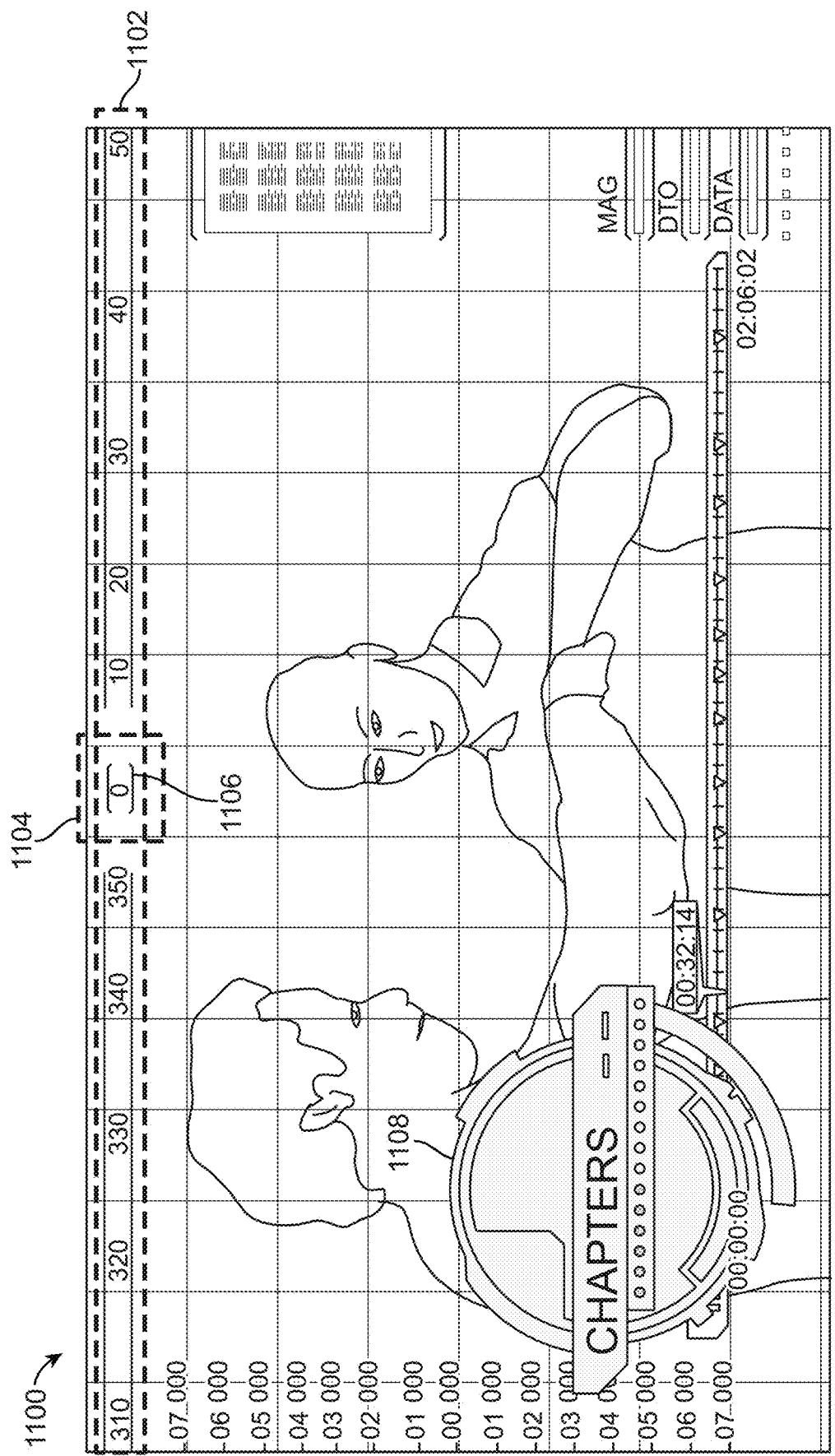

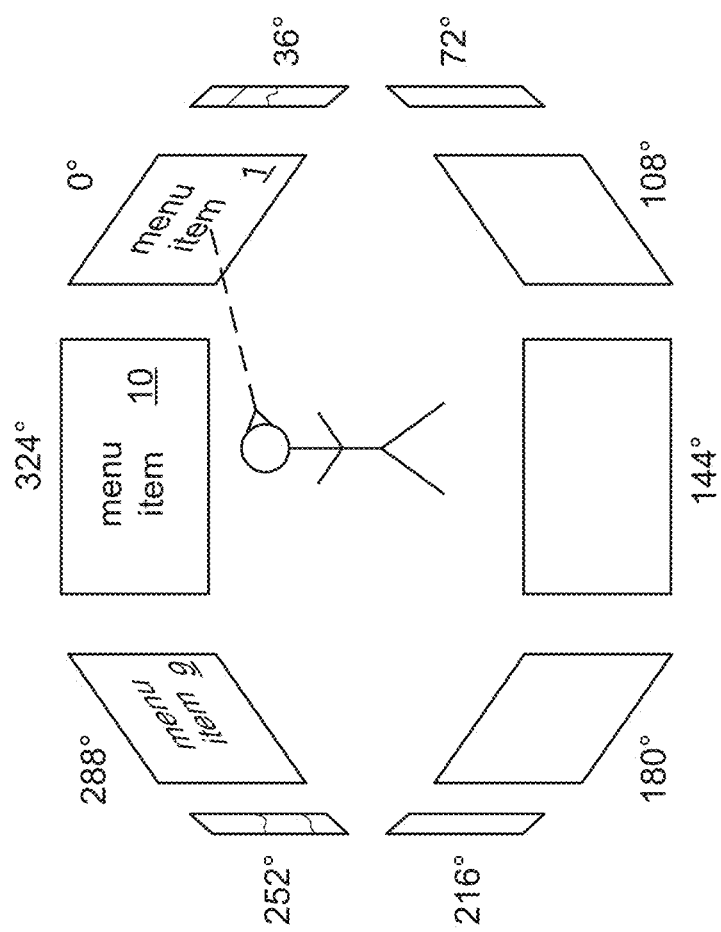

INTERACTIVE MENU ELEMENTS IN A VIRTUAL THREE-DIMENSIONAL SPACE

RELATED APPLICATIONS

This application is a continuation of U.S. application Ser. No. 14/697,474, filed Apr. 27, 2015, which is a continuation of U.S. application Ser. No. 13/110,464, filed May 18, 2011, which claims priority to U.S. Provisional Patent Application No. 61/470,181, filed on Mar. 31, 2011, all of which are incorporated by reference herein in their entirety.

CROSS-REFERENCE TO COMPUTER PROGRAM LISTING APPENDIX

Three computer program listing appendices are submitted herewith and have the following file attributes: (1) the file named Appendix1.txt was created on May 12, 2011, 7 pages; (2) the file named Appendix2.txt was created on May 12, 2011, 18 pages; and (3) the file named Appendix3.txt was created on May 12, 2011, 9 pages, which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

BACKGROUND

Technical Field

The present disclosure relates to an electronic menus and more specifically to three-dimensional-interactive-electronic menus.

INTRODUCTION

In many instances, computer-programming languages are a hindrance to electronic content creation and, ultimately, delivery to content consumers. Often content creators and designers simply lack the skill and the knowledge to publish their mental creations to share with the world. To begin to bridge this gap, content creators can use some electronic-content-development tools which allow content creators to interact with a graphical user interface to design the content while an electronic-content-development tool puts the computer-programming code in place to represent the electronic content on a user's computer.

One type of such tool is a web page development tool, which allows a user to create webpages with basic features by designing the webpage graphically within the electronic-content-development tool. However, in most instances, such tools can only assist users with basic features. Users wanting customized elements must still have knowledge of one or more computer-programming languages. For example, while some web-content development tools can assist with the creation of basic hyper-text markup language (html) content, these tools have even more limited capabilities to edit cascading style sheet (css) elements. Often variables within the css code must be adjusted directly in the code. Such adjustments require knowledge of computer-programming languages, which again, many content creators lack.

Accordingly, the existing solutions are not adequate to eliminate barriers between content creators and the presentation of high quality electronic content on a variety of platforms.

SUMMARY

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides a digital content authoring tool for amateur and professional content developers alike, without the need to understand or access any computer code, though that option is available to users skilled in the programming arts. In addition to the ability to create high quality digital content, the authoring tool is further equipped with the ability to manage digital assets and configure them for distribution and viewing on a variety of electronic devices—many of which have diverse hardware capabilities. Accordingly, the presently described technology eliminates many barriers to creating and publishing deliverable electronic content.

The authoring tool receives a collection of assets and other files collectively making up deliverable electronic content. In some instances, the authoring tool provides one or more templates, such as the pre-defined objects referenced above, as starting points for the creation of electronic content. A content creator can modify the templates according to his or her vision. In some embodiments, the authoring tool is configured to receive digital assets by importing those assets into the authoring tools asset library. The assets can be imported through a menu interface or through drag and drop functionality.

One template offered by the current invention may incorporate complex JavaScript to create a virtual three-dimensional (3-D) environment displaying a first person-perspective menu. A user interacting with this menu can view the menu from a "first-person" or "cockpit" point of view. Menu items are placed around the user and may be scrolled through by, for example, changing the perspective of the user in the 3-D environment. A viewport located in the 3-D environment is configured to encompass a viewing range which is used to simulate the user's view. When a menu item is in the direct view of the viewport, it may become "highlighted" and selected by a user. To scroll through menu items, the orientation of the viewport may be changed by a user input to bring other menu items within the viewable range of the viewport. As the orientation of the viewport is changed, a corresponding animation simulates the user's perspective of the 3-D environment changing. As menu items come in and out of the view of the viewport, they are animated as coming in and out of the user's view. This change in perspective can also be reinforced by the use of additional animations such as a change in scenery and a virtual user's head moving in conjunction with the user's input. The inspector or widget can be used to configure this menu as described above.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure, and are not therefore to be considered to be limiting of its scope, the principles herein are described and explained with additional specificity and detail through the use of the accompanying drawings in which:

FIG. 10B illustrates editing a JavaScript element;

FIG. 18A illustrates an exemplary 3-Dimensional, first-person-perspective menu JavaScript element;

FIG. 18D illustrates an exemplary representation;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art to eliminate or reduce barriers between content creators and presenting their content to content-consumers.

In some embodiments, the present technology relates to a computer-implemented application for aiding in the creation of electronic content. In one aspect the present technology aids a content developer in creating a multimedia application or web-based application, though it is not limited to such uses.

Figure 1:
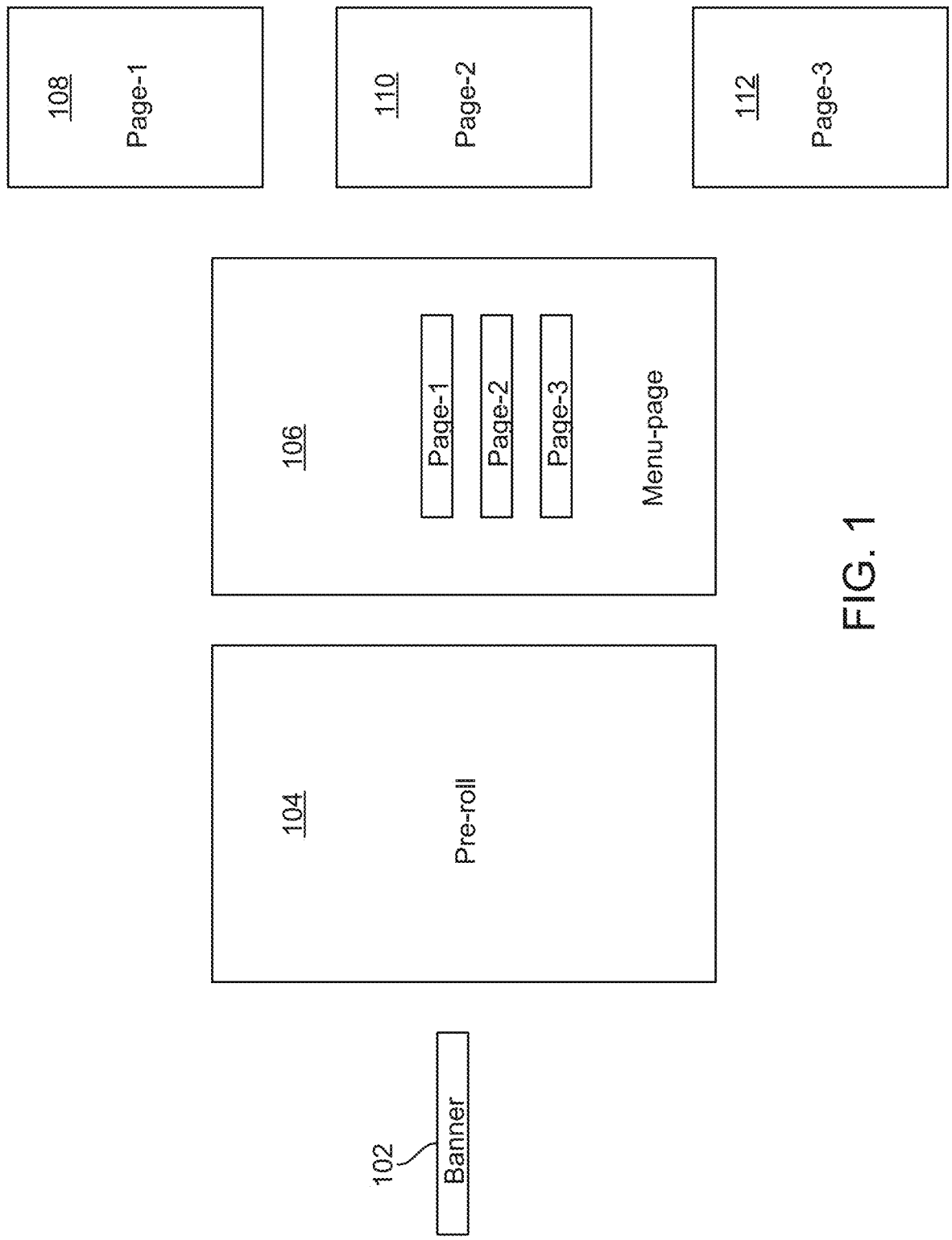
FIG. 1 illustrates an exemplary graphical-application-flow template screen within a graphical user interface of the authoring tool.

FIG. 1 illustrates a graphical-application-flow template screen within a graphical user interface of the authoring tool. This screen illustrates a general layout of a typical application and is the starting point of the authoring tool. The typical application can progress in layers moving from left to right.

For example, banner 102 is often the first part of the application presented to content consumer. In some embodiments, the banner can be an image, video, or text that is presented to a content consumer, sometimes within other content. In such instances, the banner is similar to a banner advertisements commonly encountered on the Internet. In some embodiments, the banner is more akin to an icon on a desktop.

In either analogous situation (a banner advertisement or an icon) a content consumer can interact with the banner 102, often in the form of a click or selection action, which progresses the content into its next screen, the pre-roll 104. The pre-roll screen can be as simple as an icon indicating that the full content is loading, or more involved, such as a progress base, title page, or a movie.

After the pre-roll screen has completed, the user is presented with the menu-page 106. The menu page is analogous to home page on an Internet website, or a title menu commonly encountered in a movie on a digital video disk (DVD). The menu-page 106, links to all or most other subsequent pages of the application. As an example, menu-page 106 links to subsequent pages, Page-1 108, Page-2 110, and Page-3 112, which each contain their own content.

While the template illustrated in FIG. 1 is one example of a potential application template, other templates may be available. In some embodiments the templates can be modifiable. For example, one or more additional screens can be added, deleted, repeated, or otherwise modified as seen fit by the content-creator. However, in some embodiments the template is not modifiable by the user. In some embodiments portions of the template are modifiable while others are not. For example, the banner and menu pages can be required, and/or the flow of certain pages (banner→preroll→menu) is fixed.

A content-creator can add assets to the pages to easily fill out their application. An asset can be any file containing digital content. The content-creator can import the content-creator's assets into the authoring tool by dragging a collection of assets or a directory containing assets into an assets menu (illustrated in subsequent figures), or can import the assets using menu options, or by any other known mechanism.

In some instances, one or more assets can be interrelated. In some embodiments, the content creation application can also detect those relationships that can be useful later. For example, if a movie is imported at the same time as its poster frame, the authoring tool can associate the poster frame with the movie. The simplest example of how this can be executed is anytime a movie file is imported with a single image, the authoring tool can assume the that the image is the movie poster frame and create that association in the meta data of those respective files.

The poster frame can be an image in JPEG format with dimensions that match those of the video player that will be used to play the movie. It is also desirable to name the image file according to a pre-defined naming convention so that the authoring tool can identify and associate the poster with the appropriate video. This is especially useful when more than one other asset is imported along with the poster frame.

In some instances, when a specific asset is imported, the authoring tool can recognize that another related asset is needed and automatically create the asset. Using a movie file as an example, if the movie file is imported without a poster frame, the authoring tool can search the movie file for its poster frame and extract the image. If the authoring tool cannot find the poster frame within the video file, it can automatically use the first frame, or first non-blank frame, as the poster frame. In another example, the authoring tool can require multiple different encoding ratios or bitstreams for a movie depending on the device that the content is intended to be viewed on and its current connection speed. In such instances, the authoring tool can compress the movie file according to the specifications needed for that particular device, anticipated network bandwidth, or several devices and network combinations. Analogous examples can also be made with music bitrates, or aspect ratios and bits-per-pixel (BPP) for images.

As will be addressed in the following figures, assets can be added to the page templates by dragging the asset from an asset menu and dropped onto the page templates, by using an insert asset menu option, or by any other known mechanism for inserting an object. In some embodiments, different pages, or certain locations on a page, can only accept certain types of assets. While in some embodiments, different pages or locations on a page can accept any type of asset, and these pages will configure themselves to be compatible with an inserted asset.

Figure 2A:
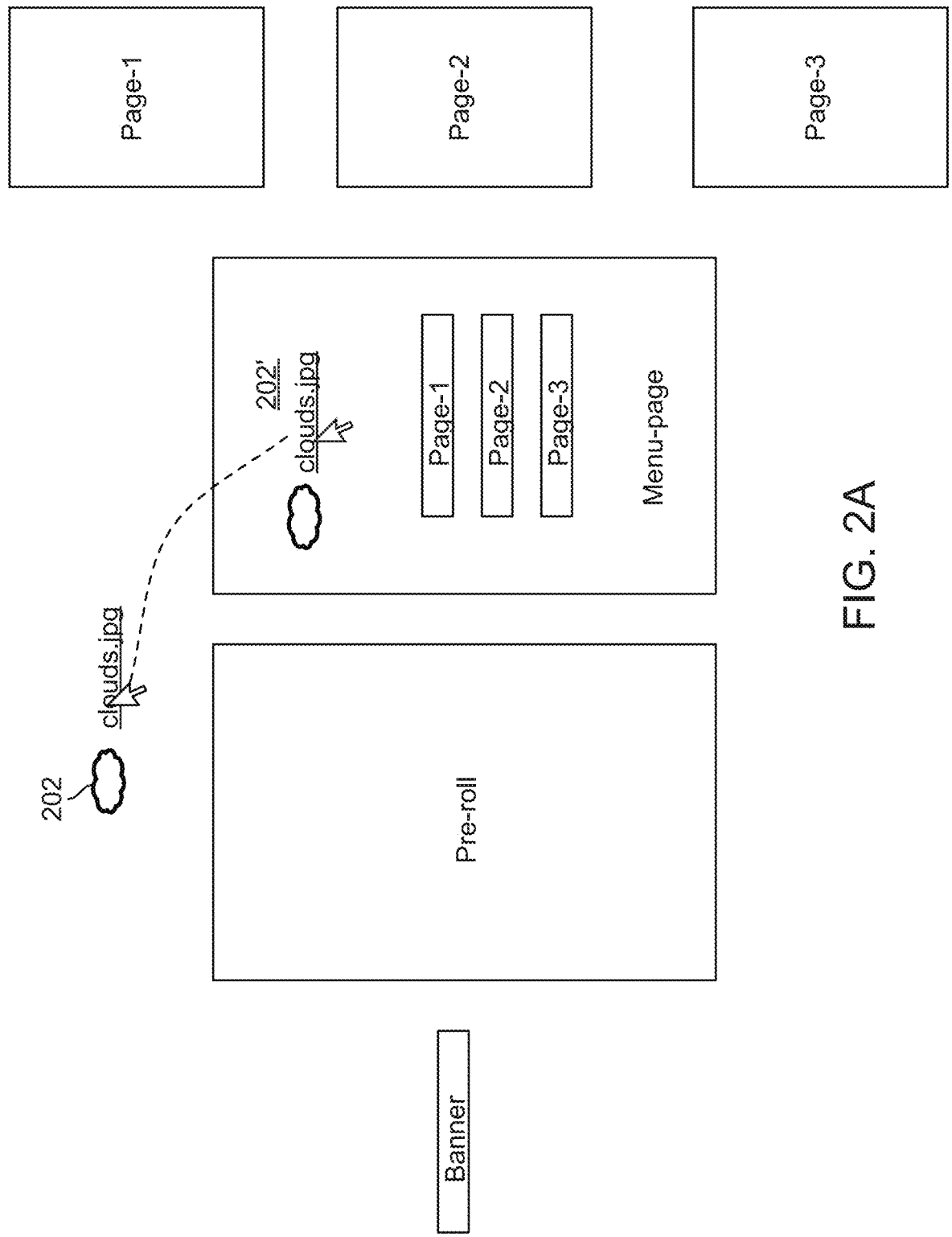
FIG. 2A illustrates the exemplary graphical-application-flow template screen as an initial content creation screen.
Figure 2B:
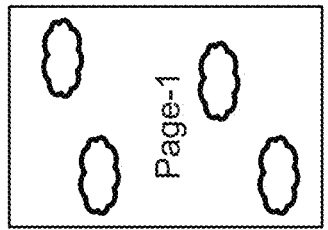
FIG. 2B illustrates the result of the action illustrated in FIG. 2A.
Figure 2B:
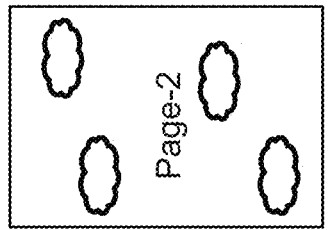
Figure 2B:
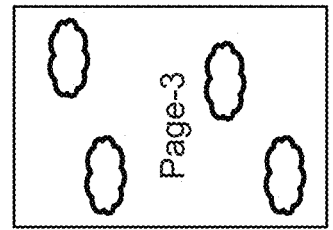
Figure 2B:
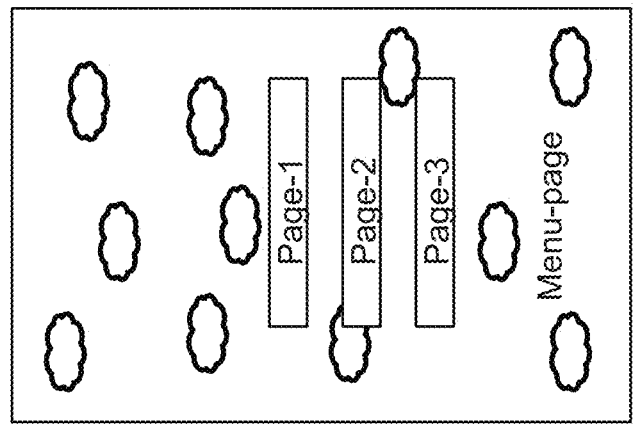
Figure 2B:
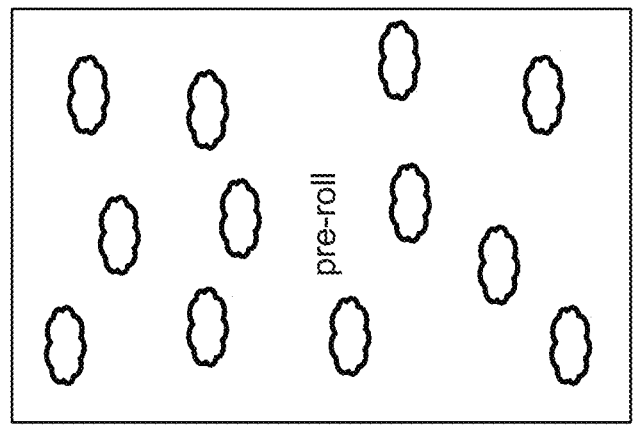
Figure 2B:

As addressed above, in addition to being a graphical-application-flow template screen, the screen illustrated in FIG. 1 is also able to receive content. FIG. 2A illustrates the graphical-application-flow template screen as an initial content creation screen. In FIG. 2A, the content-creator has selected an asset, a clouds.jpg image 202 and drags the image onto the menu page as indicated by 202'. FIG. 2B illustrates the result of the action illustrated in FIG. 2A, wherein the clouds.jpg image has been applied to the entire template. Each page in the graphical-application-flow template now has the clouds.jpg image as a background image.

When a modification is made to one screen in this a graphical-application-flow template screen view, showing each of the screens within the application, the same modification is made to each of the other screens, as appropriate. As in the example illustrated in FIG. 2A and FIG. 2B, since the background of the Menu-page was modified, the background of all of the screens within the application was also modified. Other modifications in one screen that can be translated to the other screens include, but are not limited to, adjustments to fonts and colors, or relationships between Page-1 and the menu item for Page-1. However, not all modifications made in this view make sense to translate to the other screens. A modification to the Pre-roll might not make sense to add to the other pages. For example, adding a video to the pre-roll screen is one such modification that would not be applied to the other screens.

Figure 3:
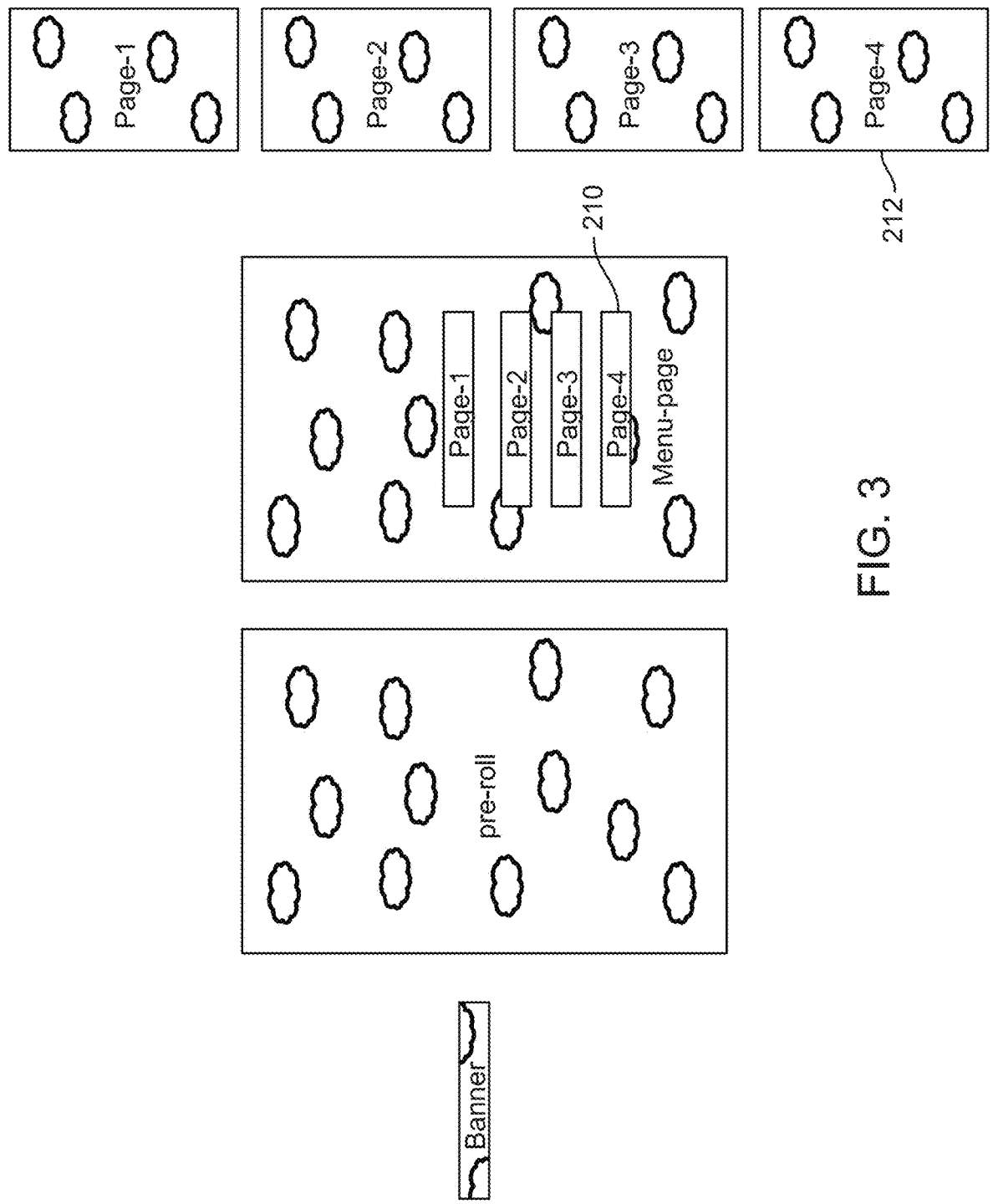
FIG. 3 illustrates an exemplary action adding additional pages to the template.

FIG. 3 illustrates that additional pages can be added to the template. When a new page is added, such as Page-4 212, the Menu-page updates to include the page in the menu as illustrated by menu item 210. Additionally, any template-wide characteristic, such as the cloud background, is automatically applied to the new page. Other changes can also be propagated automatically, as is discussed throughout. For example, when a page is renamed the corresponding menu element can also be retitled.

Figure 4A:
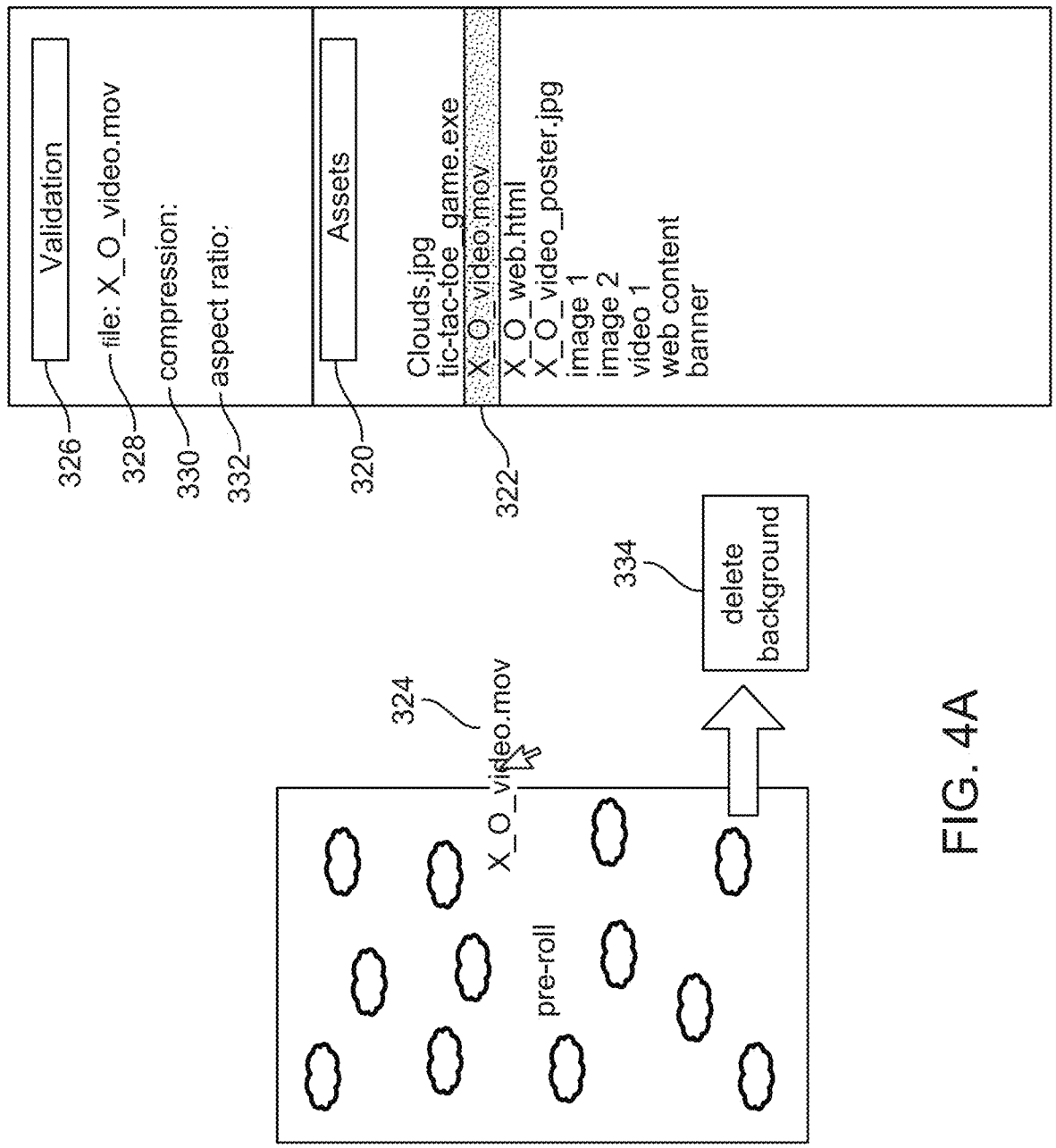
FIG. 4A illustrates exemplary modifications made to the content of a single page.

FIG. 4A illustrates modifications made to the content of a single page. 334 illustrates that commonly applied elements can be modified or removed on the individual pages of the application. Specifically 334 illustrates that the cloud background that was automatically applied to the pre-roll page in the graphical-application-flow template screen, can be removed from this page, individually, in this screen specific view.

Also illustrated in FIG. 4A is an "Assets" menu 320. This menu graphically lists each of the assets that are available for inclusion into the program. These assets include text, videos, web content, images, etc. that the user has created and made available to the authoring tool.

Also illustrated is a Validation tool 326 to validate selected assets. In the illustration, X_O_video.mov 322 is selected and the validation tool can illustrate the particular characteristics of the file and whether those characteristics are compatible with one or more device types for which the content is intended to be displayed. Validation will be discussed in more detail below.

FIG. 4A also illustrates that asset 322 is being dragged on dropped 324 on the Pre-roll screen, thus inserting the asset onto the Pre-roll page.

Figure 4B:
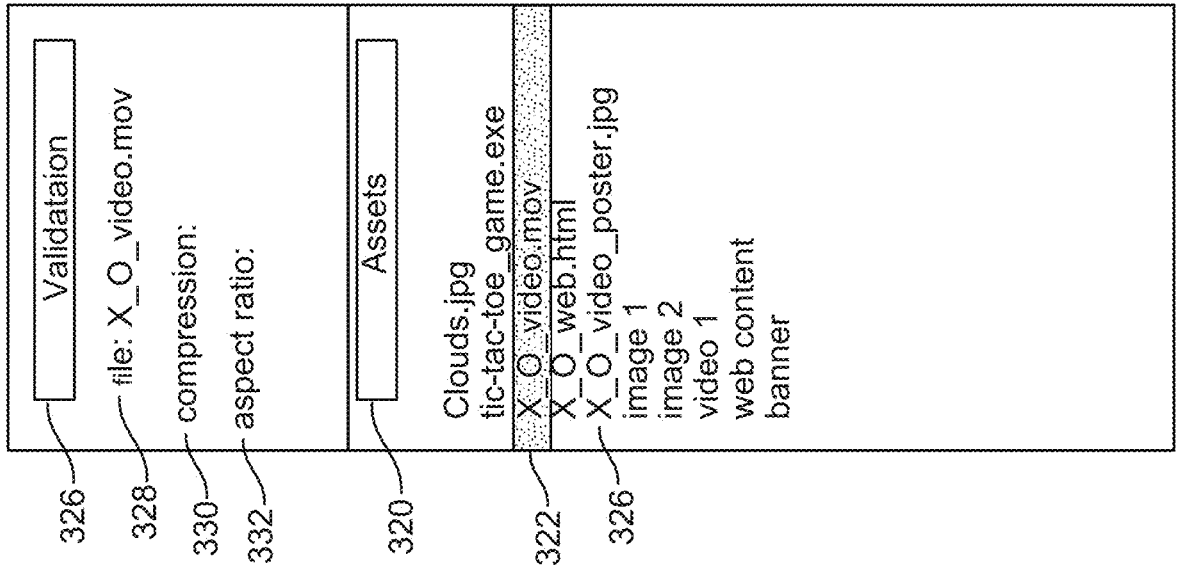
FIG. 4B illustrates an updated Pre-roll page based on the action illustrated in FIG. 4A.

FIG. 4B illustrates the updated Pre-roll page. The cloud background has been deleted and the X_O_video.mov has been inserted on the Pre-roll pages and its poster image (asset 326) is displayed 334.

Figure 5A:
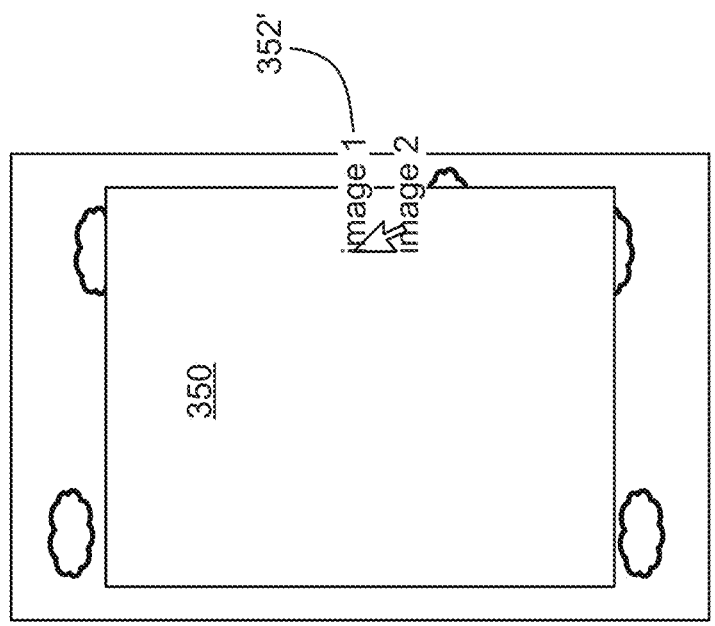
FIG. 5A illustrates an exemplary action inserting multiple images into a page.
Figure 5A:
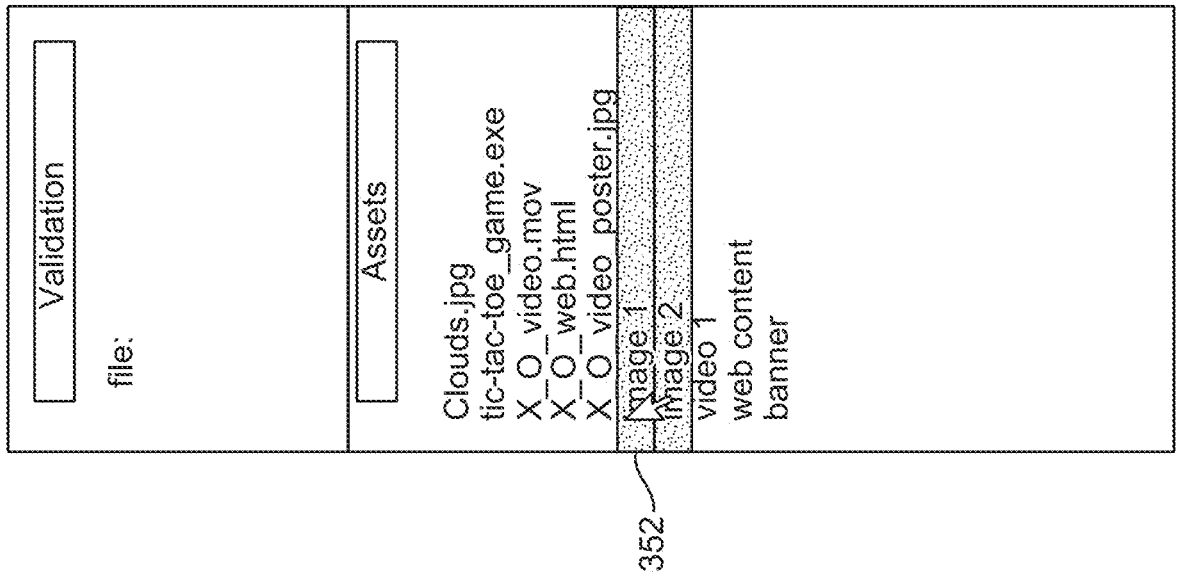

FIG. 5A illustrates inserting multiple images into a page. Specifically Page-1 is shown having an object container, or placeholder 350. A user has selected two images 352, image 1 and image 2 and has dragged and dropped the images 352' into placeholder 350.

Figure 5B:
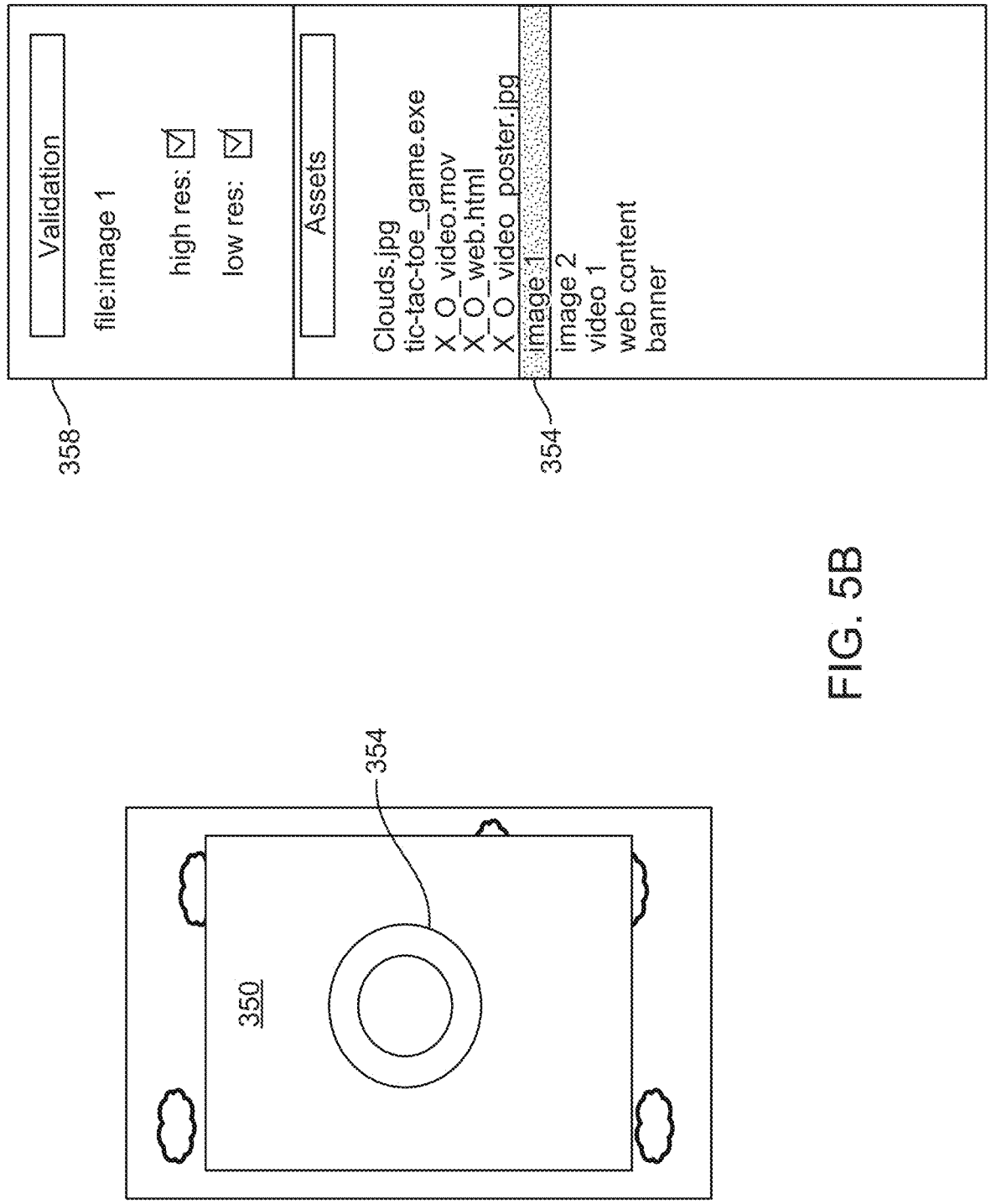
FIG. 5B illustrates the page from FIG. 5A updated with one of the images inserted.

FIG. 5B illustrates the updated page having both images of the images inserted, but only displaying the first image. Specifically, container 350 is shown with image 354 displayed within it. Additionally, the validation tool 358 is shown validating that the image 354 is available in the required resolutions (high and low). When image 1 was imported, the user imported two images—the high-resolution image and the low-resolution image. However, for simplicity of use, the authoring tool recognizes that the images are two different versions of the same asset and displays a common asset in the asset library. This allows the user to manipulate a single object (e.g., dragging to the canvas) to make the assignment and the authoring tool works behind the scenes to grab the appropriate version based on the current display mode. In some embodiments, the assets conform to a naming convention to allow the authoring tool to associated two different versions of the assets. For example, a user can create image_1@2x.jpg and image_1.jpg files. When imported, we associate these two as the 2× and 1× versions, respectively, for an asset named image_1.jpg. In the user interface the authoring tool would only display one entry, but flags it to indicate it is a multi-resolution asset, for example: image_1.jpg [1×] [2×]. The availability of both required assets is indicated in the real time validation tool 358.

Figure 5C:
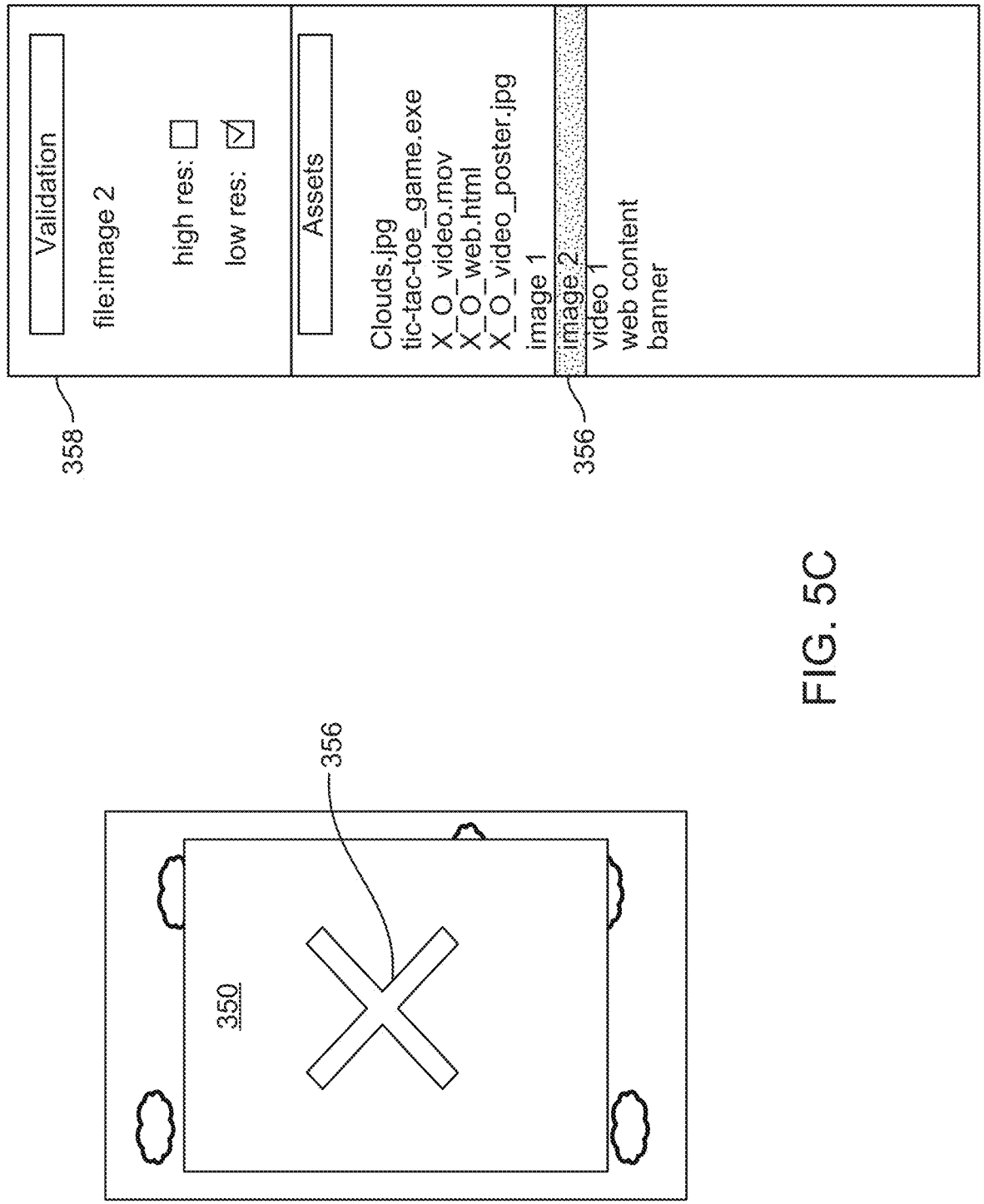
FIG. 5C illustrates the page from FIG. 5A updated with one of the images inserted.

FIG. 5C illustrates the updated page having both of the images inserted, but only displaying the second image. Specifically, container 350 is illustrated with image 356 displayed within it. In this instance, the content creator has chosen to navigate to the second image within the design application. It can be especially useful to show the exact assets and user interface that the end user device will see at run time so that the content designer can adjust the content as needed without having to switch from a design application to a test application. Additionally, validation tool 358 indicates that image 2 356 is only available in low resolution and that a high resolution image is still needed. As can be inferred from the discussion above, Image_2 was imported without a corresponding high-resolution version. The real-time validation tool 358 can inform the content developer that the high-resolution asset is needed.

While in some embodiments it is possible for the authoring program to make missing assets from available counterparts, it is not desirable to create a higher resolution image from a lower resolution image. However, the authoring tool may be able to create a lower resolution from a properly sized higher resolution image. In either case, the application will indicate which assets were provided by the user and which were automatically generated, so that the user can review these proposed auto-generated assets and decide if he/she wants to use them or provide his/her own.

Figure 6:
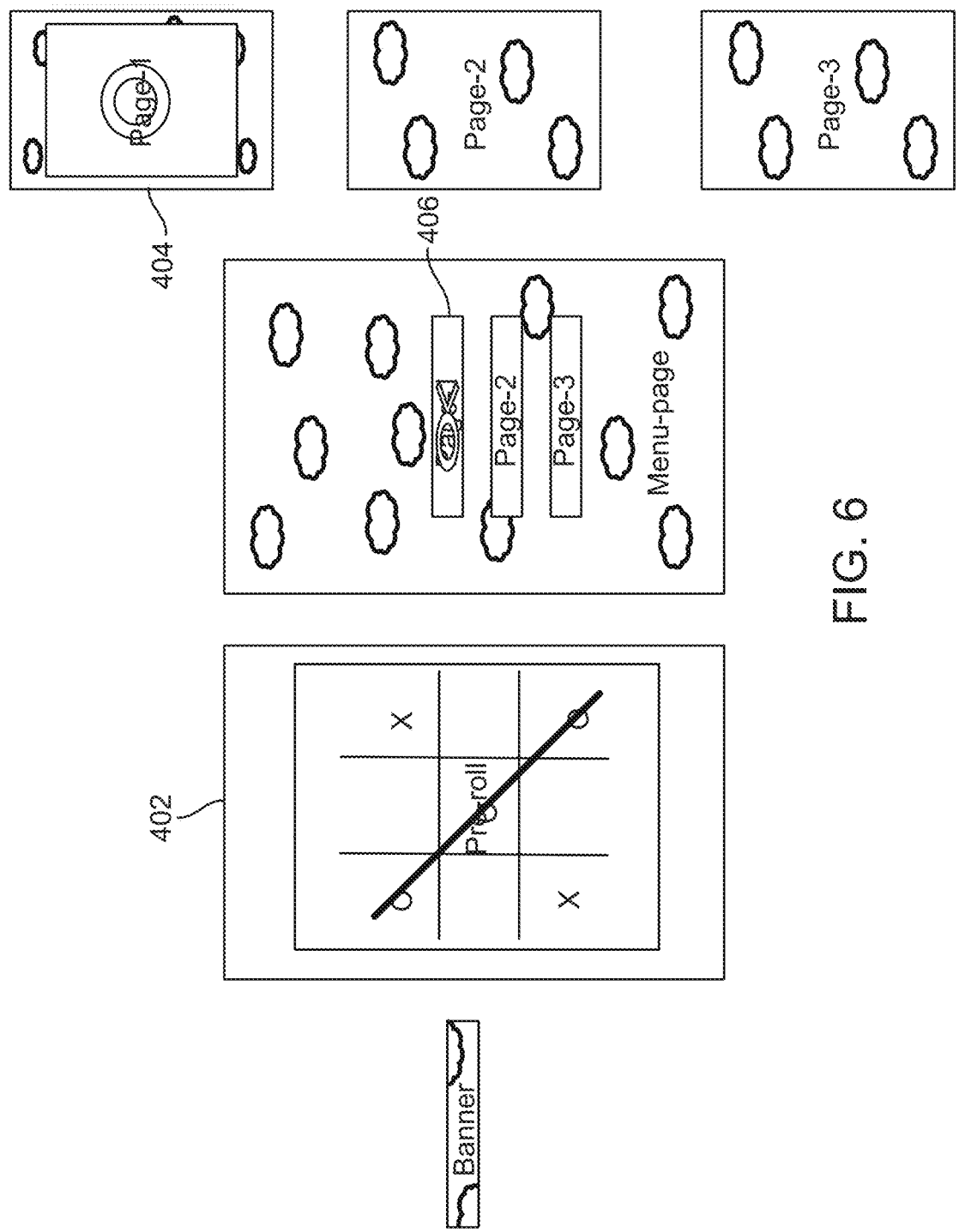
FIG. 6 illustrates an updated graphical-application-flow template screen view.

FIG. 6 illustrates an updated graphical-application-flow template screen view. The pre-roll screen 402 is illustrated with the update made to that page in FIG. 4A. Notably, the background has been deleted and a movie has been inserted. The movies poster frame is illustrated. Additionally, Page-1 404 is illustrated with one of the images inserted into that page in FIG. 5A. The menu page has also updated to match the changes made to Page-1. Link 406 now contains an icon made from a blend of the images inserted in Page-1. The link image could have been an asset that was associated with the figures, an asset that was separately inserted, or, in some embodiments, it can be automatically generated.

As addressed above, simply helping content developers get their content into an application is just one step in the process. An authoring tool needs to also allow content creators to adjust their creations and the functionality of the application within the user interface of the authoring tool.

This principle of the present technology can be understood by exploring a web-based application or a collection of web-browser-compatible content resembling the application. Web-browser-compatible content often has several different components of code. For example, Hyper-text-markup language code (HTML) can define the basic format and content, JavaScript can define the movement of objects defined by the HMTL code, and cascade style sheet (CSS) elements can adjust the format or style of the formatting elements defined in the HTML code. (It is understood that other code types and objects are also web-browser-compatible content. The present technology should not be considered limited to the code languages described herein.)

Figure 7A:
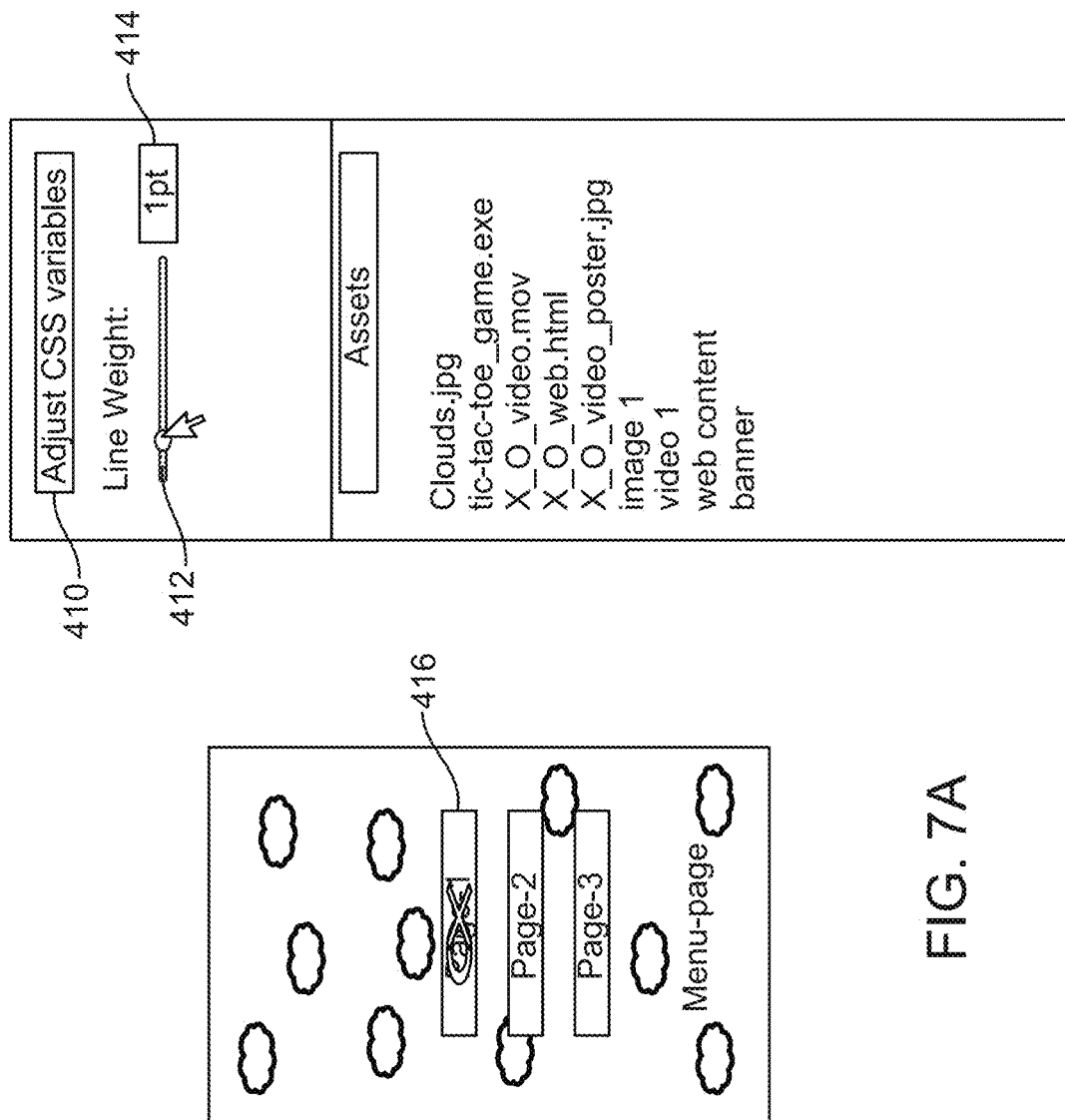
FIG. 7A illustrates exemplary adjustments to CSS elements using a widget/inspector.
Figure 7B:
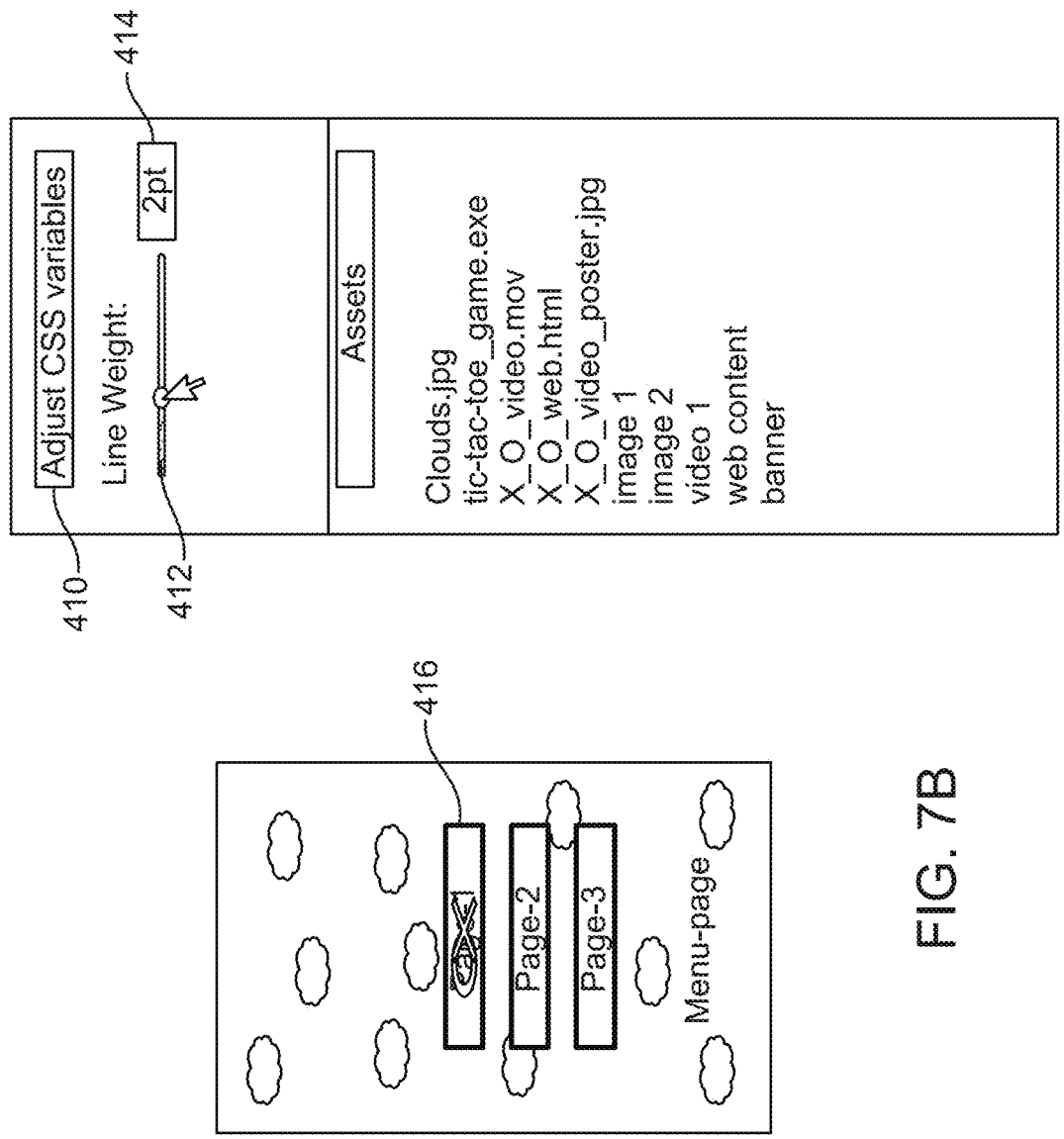
FIG. 7B illustrates the result of the action illustrated in FIG. 7A.

In such an application using HTML code, JavaScript and CSS, it is not sufficient to merely allow a content creator to enter content in HTML. The content creator needs to be able to make refined adjustments to make high quality content. As illustrated in FIG. 7A and FIG. 7B such adjustments can be made using a widget to adjust CSS elements. A CSS widget or inspector 410 is displayed for adjusting a line weight by a slider 412 user interface element or by entering a value in a text box 414. In the illustrated example, the content creator is adjusting the line weight used to display the box 416. FIG. 7B illustrates that the line weight has been adjusted by moving the slider to a 2 pt line weight. The slider and text box have adjusted corresponding to this change.

Figure 8:
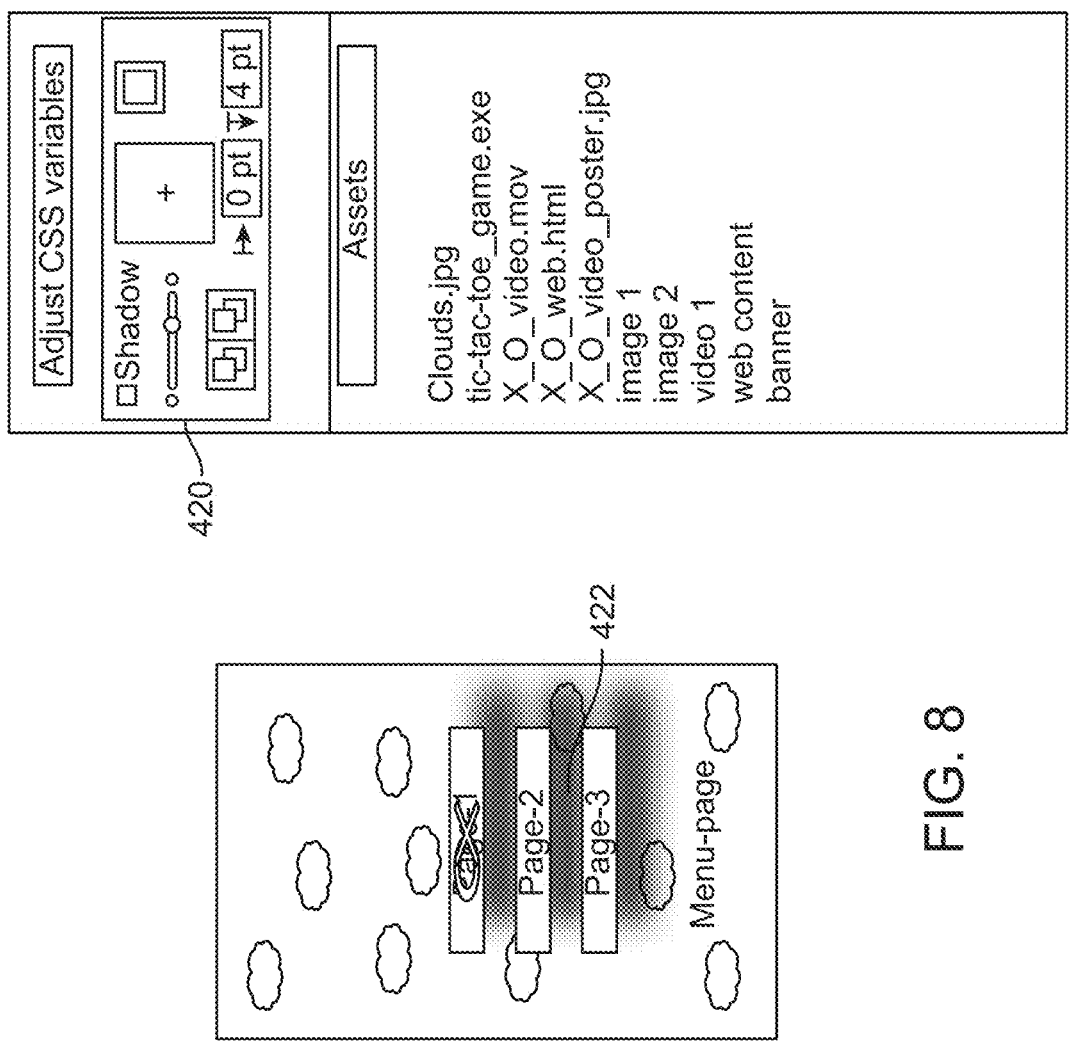
FIG. 8 illustrates an exemplary CSS inspector.

FIG. 8 illustrates another CSS inspector. Specifically, a shadow inspector 420 can be manipulated to adjust the direction, weight, offset and other attributes of a shadow, such as shadow 422.

Figure 9A:
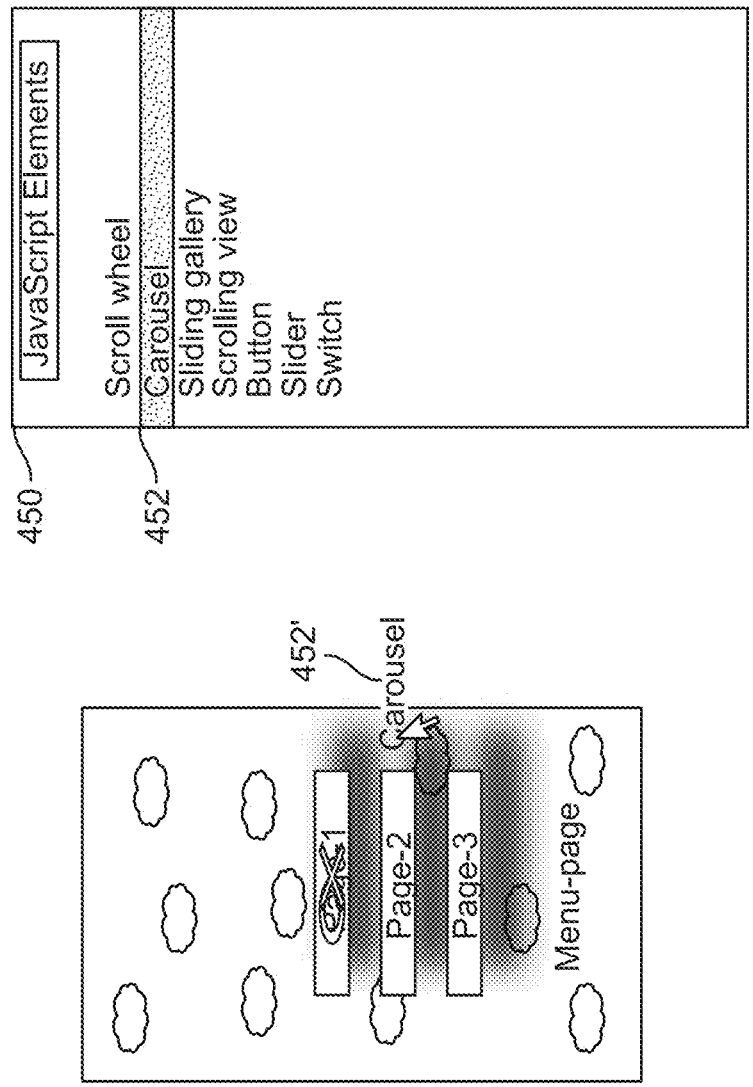
FIG. 9A illustrates an exemplary menu of JavaScript elements.
Figure 9B:
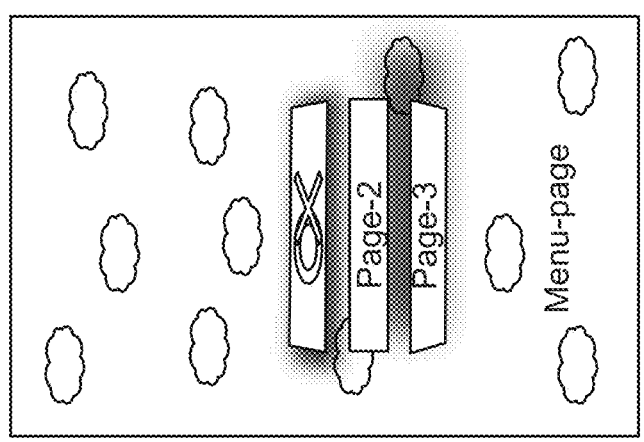
FIG. 9B illustrates an exemplary menu of JavaScript elements.

FIG. 9A and FIG. 9B illustrates a menu of JavaScript elements. Again, it is desirable to allow content-creators to introduce and adjust their content as much as possible within the user interface. As such, the present technology makes use of a JavaScript library of JavaScript elements such as those presented in the JavaScript menu 450. The JavaScript library can include primitive elements such as buttons, sliders, and switches that are used standalone; and more complex "composite" elements such as carousels, scroll views, and lists that have multiple "cells" that may contain primitives and other composite elements. It should be appreciated the other common JavaScript elements not shown here can also be included in the JavaScript library.

As illustrated, a user has selected the Carousel element 452 and dragged and dropped the Carousel element 452' onto the menu page. Such action transforms the listing of links on the menu page into a rotatable 3-D Carousel as illustrated in FIG. 9B.

In some embodiments, widgets or inspectors can also be provided for adjusting known variables within the JavaScript code. For example, in the case of the rotatable 3-D Carousel, the shape of the menu items, the speed and direction of rotation, spacing, number of objects in the menu can be adjusted using an inspector.

Figure 10A:
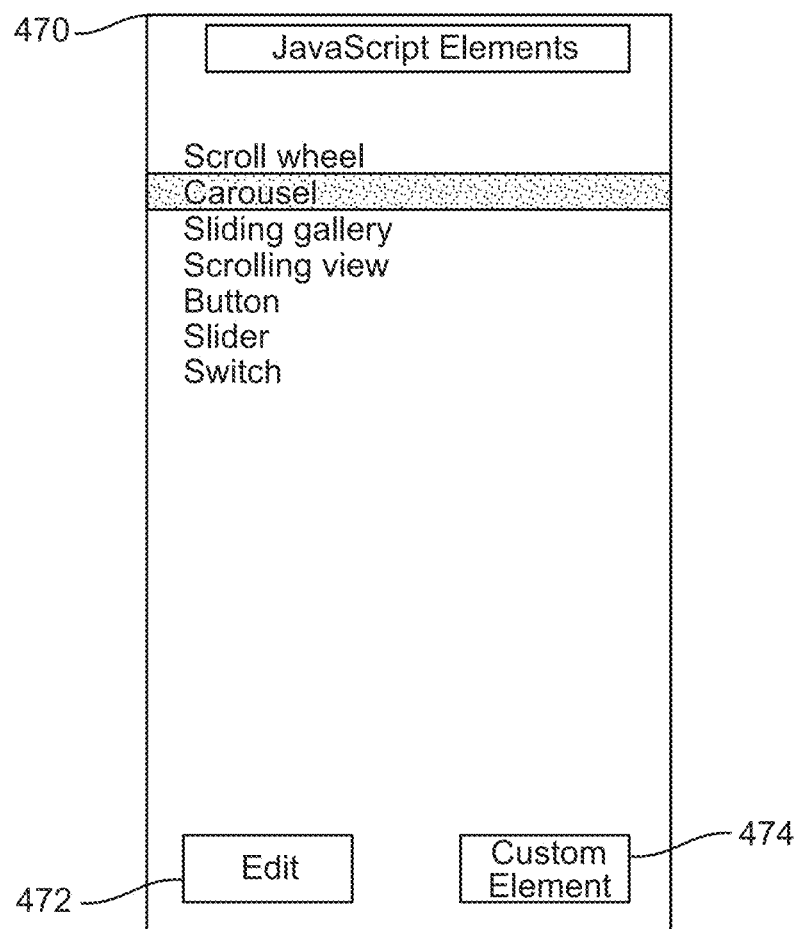
FIG. 10A illustrates an exemplary JavaScript elements menu having buttons for editing selected code.
Figure 10C:
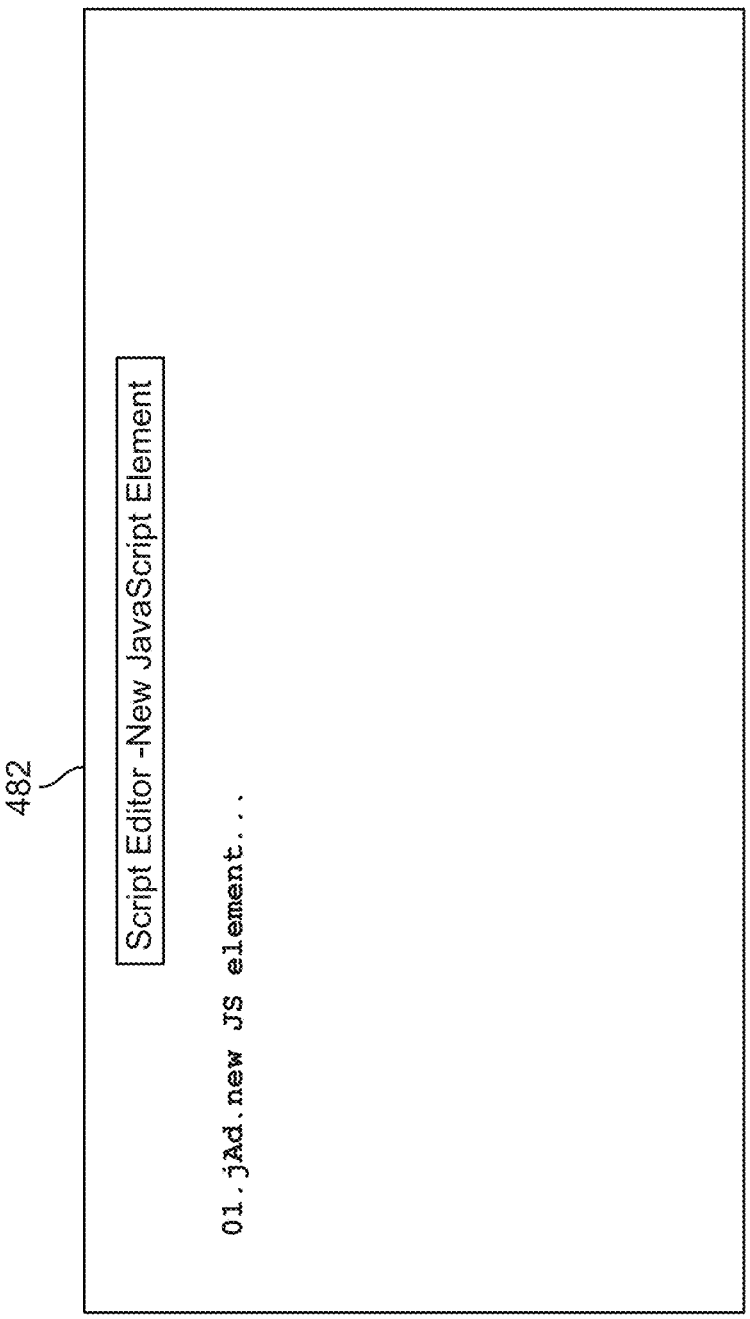
FIG. 10C illustrates adding a new JavaScript element.

While many adjustments can be made in the form of user-interface elements to allow users with little or no experience working with code to create high quality content, the present technology also facilitates and allows an advanced user to add new elements or customize new elements. FIG. 10A, FIG. 10B, and FIG. 10C illustrate that JavaScript elements can be edited at the code level or created. FIG. 10A shows a JavaScript elements menu having buttons for editing selected code 472 or for creating a custom JavaScript element. FIG. 10B illustrates editing the Carousel JavaScript element 480.

FIG. 10C illustrates adding a new JavaScript element 482. When a new JavaScript element is introduced, the user can also define which elements of the JavaScript element should be interactive or modifiable using an inspector. The user can create a definitions or properties file to accompany the new JavaScript element that defines variable elements within the JavaScript code and a range of available parameters. The properties file can also define which inspector elements need to be provided, e.g., a slider, pull down menu, buttons, etc.

When a content-creator modifies a JavaScript element or adds a new JavaScript element that element can be saved for later use in other projects. Accordingly, a content-creator can make highly customized content and reuse design elements in later projects as they see fit.

In such instances, wherein a content developer adjusts or creates his/her own code, the present technology can also include a debugger application to ensure that the code is operational.

Figure 11:
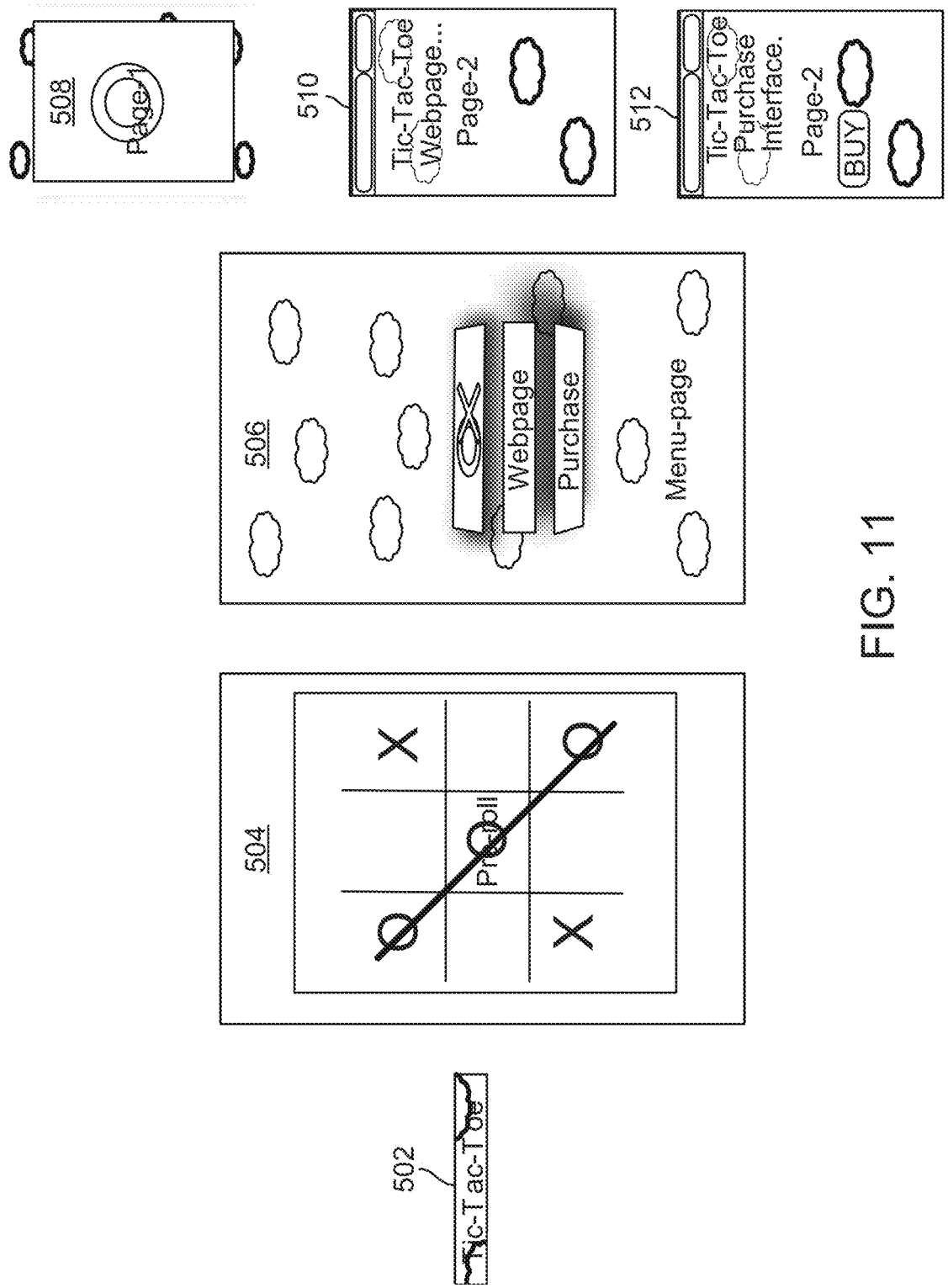
FIG. 11 illustrates a completed application in the graphical site map view.

FIG. 11 illustrates a completed application in the graphical site map view. The banner image 502 is illustrated having the clouds background and the Tic-Tac-Toe title of the application. If a user clicks on or interacts with the banner the application will launch and proceed to the Pre-roll page 504. The Pre-roll page 504 is illustrated without the clouds background and containing the Tic-Tac-Toe movie. Presently, the poster frame image is displayed, though, if a user interacts with the image, or a determined period of time has lapsed (such as the time to load or buffer the movie) the movie will begin to play. After the completion of the movie, the application progresses to the Menu-page 506. The Menu-page 506 includes the rotatable 3-D Carousel having links to the images Page-1 508, a Webpage, Page-2 510, and a Purchase Interface, Page-3 512. Clicking on any menu link will take the user to the respective page to view the associated content. Scrolling the rotatable 3-D Carousel will rotate the carousel to the next menu item.

Having a complete application is only one step in successfully publishing electronic content and presenting it to users. As addressed above, today's devices come in many different sizes and have different display and processing capabilities. Accordingly, content often needs to be configured or optimized for different devices. Such a step requires knowledge of the capabilities of each device. Additionally, different users connect to the Internet in various ways and sometimes multiple ways, even in the same usage session. Accordingly, getting content to users requires taking into account the variance in the different network technologies too.

Even if a content developer did understand the varying capabilities of the different device and network connections and further knew the different specifications required to optimize content for delivery and presentation on a content consumer's device, creating optimized packages of each application would be a time consuming process.

Accordingly, the present technology can automatically perform this function. Before creating a content package optimized for a particular device, the assets within the application must have their compatibility with a device's specifications and common network types validated. The content distribution server might also impose certain requirements, and these too can be considered in the validation process.

Figure 4B:
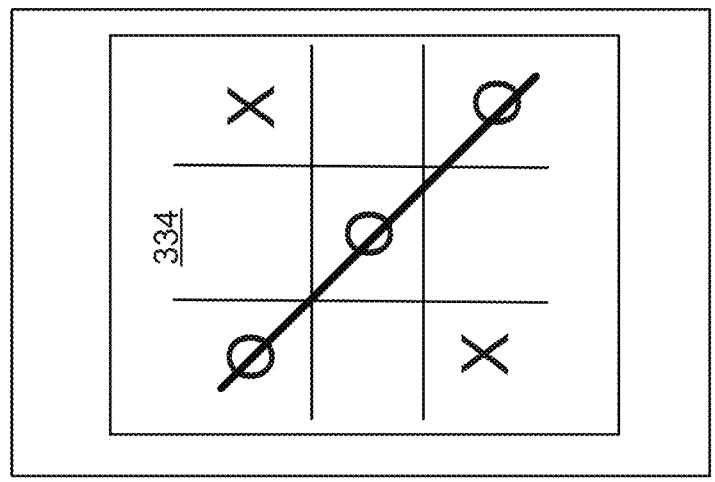

While some validation can be conducted during the creation of the application (the validation widget in FIGS. 4 and 5 can alert the user that assets having different characteristics are needed) a validation process can also be included to ensure the application is ready to be packaged for distribution.

Figure 12:
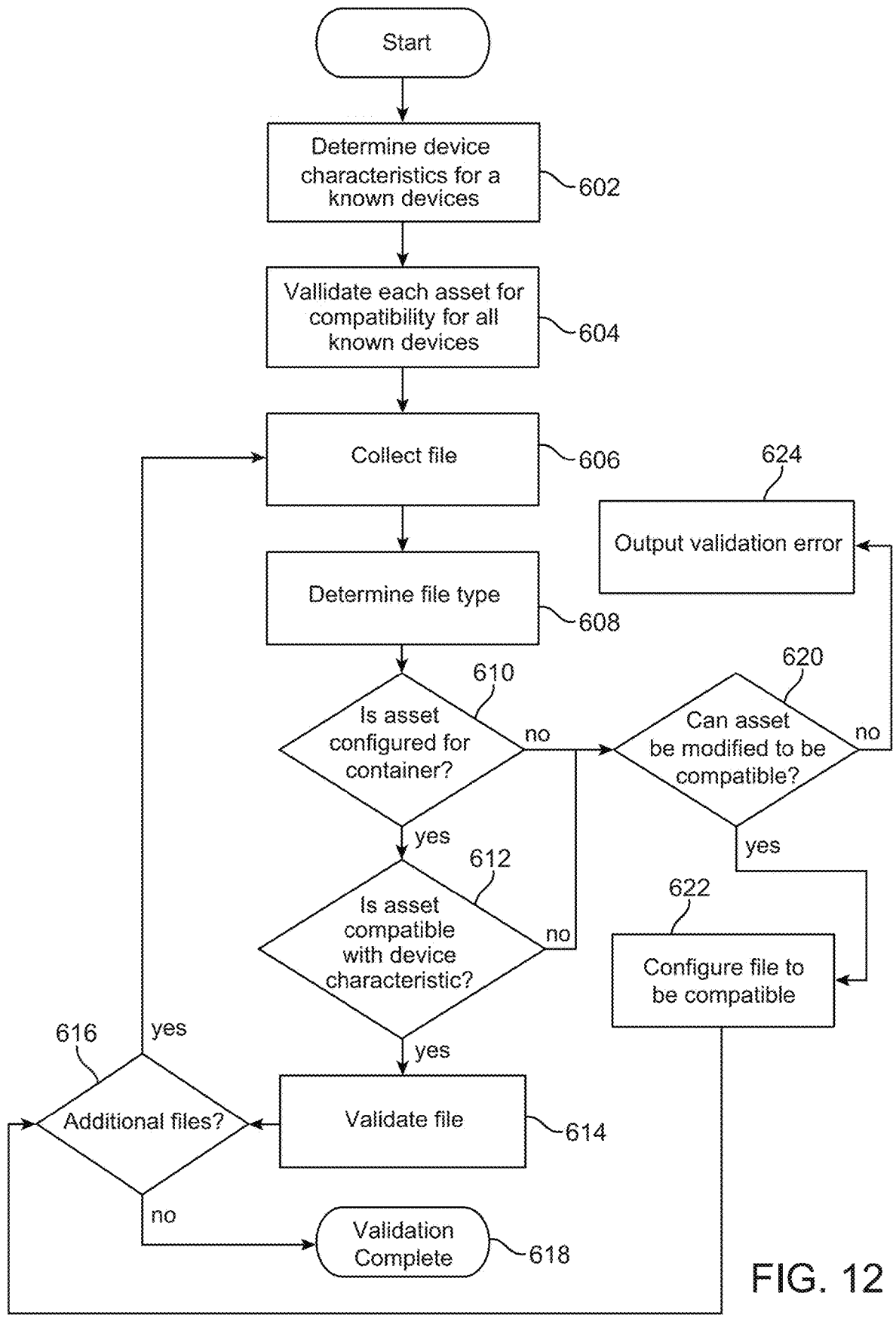
FIG. 12 illustrates an exemplary asset validation process.

FIG. 12 illustrates an exemplary asset validation process. The authoring tool can be endowed with knowledge of all known devices, groups of devices, connection types, and content distribution servers for which the content might be distributed. Alternatively, the user can input the device characteristics. The authoring tool may also learn of additional device configurations through communication with a server. Regardless of how learned, the authoring tool can determine device characteristics for all known devices and potential connection types 602. In some embodiments the user might select a subset of the known devices and connection types if the content is not intended for distribution outside of those devices.

Based on the determined characteristics of the known devices and connection types, each asset within the content is validated 604 for meeting the relevant characteristics. For example, images might need to be validated for appropriate bpp, and aspect ratio, while videos might require need to be validated for frame rates, size, aspect ratios, compression, encoding type, etc. The validation can occur as follows: A first asset is collected from the finished application 606 and the validation module determines the type of file 608 (image, banner, text, video, etc.).

Based on the asset characteristics the validation module can determine firstly if the asset is appropriate for its use in the application. As addressed above, certain assets are not universally appropriate for all screens in the application. If an incorrectly configured asset was inserted in a container such is determined at 610. An incorrectly configured asset can be one that is not in the appropriate aspect ratio for the frame or one that is not available in the multiple configurations for which the object is expected to be required when viewed by users on their devices. For example, an asset in the banner page might be required to be provided in a landscape and a portrait configuration.

If the validation routine determines that the asset is configured for its container the validation algorithm next determines 612 if the asset is compatible with the characteristics of each device on which it might be displayed. For example, the routine determines if the asset is available in all aspect ratios and pixel densities and file sizes that might be required to serve and display the content on the devices.

If the validation routine determines the asset is compatible with each device, the asset validation is complete 614 and the routine determines if there are additional assets requiring validation 616. If not the validation routine is complete and it terminates 618.

If, however, there are additional files to validate, the routine begins anew collecting the next asset 606.

Returning to 610 wherein the asset is analyzed for configuration with its container and 612 wherein the asset is analyzed for configuration with device characteristics, if either analysis determines that the asset is not properly configured for the container or device characteristics, respectively, the routine proceeds to determine if the asset can be modified automatically at 620. Assets can be modified automatically where it might require resizing, encoding, or generation of a lower quality asset. If the asset can be modified to be compatible then the routine proceeds to 622 and the asset is appropriately configured. In some embodiments the user is given the option of whether the routine should perform the modification. If the asset is not determined to be modifiable at 620, the routine outputs a validation error and requests user involvement to fix the problem 624.

Figure 13:
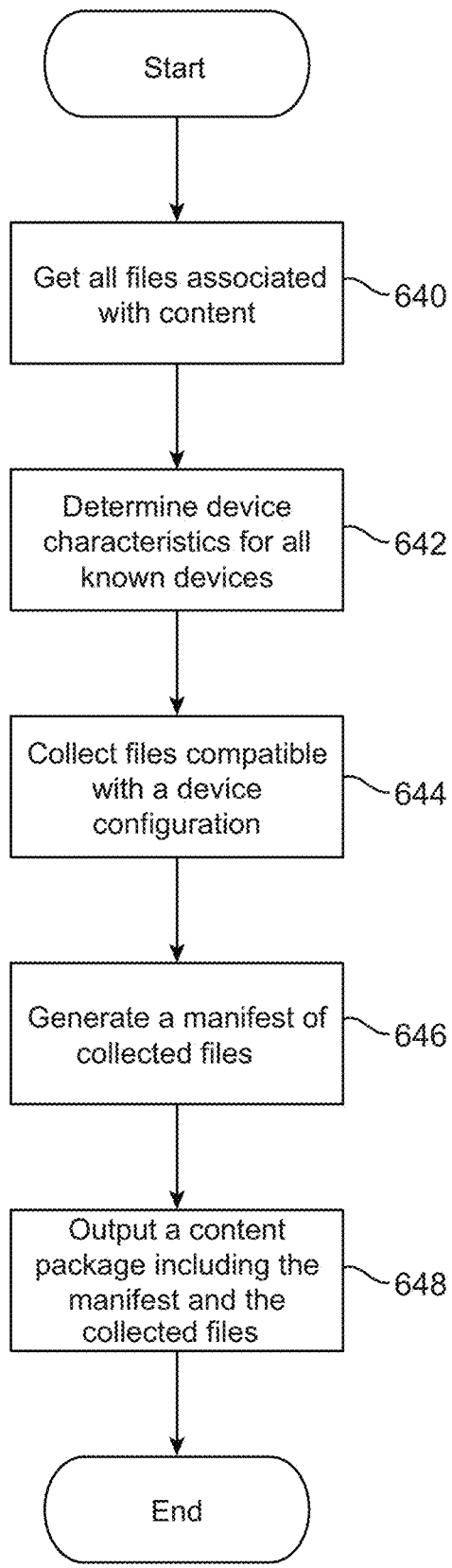
FIG. 13 illustrates an exemplary method of packing the application for upload to a content delivery server.

Once all assets have been verified the application must be packaged for upload and use by a content delivery server. FIG. 13 illustrates an exemplary method of packing the application for upload to the content delivery server. At 640 the routine gathers all assets associated with the application. At 642 the routine determines device configurations and collects the assets that are compatible with one of the device configurations 644 and generates a manifest of collected files 646. The manifest is a descriptive file identifying each of the assets and their relationship to the main application file. Finally, a content package is output including all assets and the manifest configured for the specified device configuration 648.

The routine illustrated in FIG. 13 can be repeated for each device configuration desired. Alternative, the manifest file can designate different assets for different device configurations. Regardless of the method of creating the package for upload to the server, the output should be according to the server's requirements. If the server is configured to accept one application configured for each device than the method of FIG. 13 is followed. If the server is configured to accept a manifest describing all assets and the appropriate situation for employing the assets then such a package can be created.

Before the package can be uploaded to a content delivery server, the application must first be tested. This step can be especially important for professional content creators. Since content creation is their livelihood they need to view each screen of the application as it will be displayed on the individual devices. The importance of this step is even more important when some assets have been modified by the authoring tool and therefore may not have been viewed by the content creator.

The application can be tested in each format (device configuration) for which it is expected to run. Only after the application has been tested for a given device configuration should it be approved to be uploaded to the server for distribution to content consumers.

In some embodiments, the above-described technology is an HTML5 authoring tool which is useful for, among other things, creating mobile advertisements. It embodies a number of key processes for authoring, testing and publishing advertisements to the mobile advertisement network. However, many of the activities described herein are applicable to HTML5 authoring in general.

In one aspect, the present technology is used for authoring of interactive HTML5 content for the web, for advertising, for inclusion in non-web content delivery applications such as, a book reader, a magazine, an interactive menu system for accessing video content whether viewed on a traditional computer, mobile devices, tablets, set-top boxes, or other devices.

The first step in creating an advertisement is defining the structure and flow of an ad. This can be defined manually, by adding and ordering pages using a graphical site map, or automatically, by selecting a pre-built project template. The project template defines the initial structure of the ad, for example: a banner page, leading to a splash page that cycles while content is loaded, leading to a "pre-roll" video page that plays an introductory video, leading to a menu page with navigation options to one or more content pages displaying company, product, or other information the advertiser wishes to provide. Project templates may define a rigid set of possible pages that cannot be edited, or may define a starting set of pages that the user can modify by adding, removing, reordering, or restructuring the flow of pages, or may be based on various factors including lines of business (automotive, publishing, music, film, consumer electronics, fashion/apparel, etc).

The next step is defining the types of pages to be included in the project. The project templates may define the types of pages to be used or they can define the category of each page and allow the user to select from a range of page templates in that category. For example the project template can define that one of the pages is intended to be a "menu." The user can select from a range of possible menu "page templates" to apply.

Once a page template has been applied (either as determined by the project template or manually selected by the user), page-specific attributes can be edited, for example: the background color of the page, the size of the page, the orientation of the page, other page template specific properties, number of elements in a gallery, the default location for a map, and so on.

The next step in the process is adding content to the pages in the project. The page templates contain placeholder elements for content to be provided by the advertiser, for example, an image placeholder to be filled in with a company logo or product image. Placeholder elements may have pre-determined styles applied to them, for example, a button with a preset color, border, opacity, etc. In such a case, the user need only provide text for the title of the button. In some aspects, the styles may be rigid and non-modifiable by the user, while in other aspects, the styles may be set initially but editable by the user by editing individual parameters, e.g., background color, border color, etc. In some embodiments, the styles are edited visually using an inspector rather than by specifying the CSS attribute and value, thus eliminating the need for in-depth knowledge of CSS properties. The styles can also be edited by applying a style preset representing a number of style elements and their associated value, e.g., "red flame" style with red gradient background, bright orange border, and yellow glow shadow.

In some instances, placeholder elements can be "pre-rigged" with animations that persist after an element has been customized by the user. For example, an image element set to fade in when it is first displayed. Some elements can represent multiple content items in a list, grid, or other "gallery" or "container" style display, such as e.g., a "carousel" of videos, a sliding gallery of images, a scrolling view of a very large image or set of images, etc. Some elements can represent multiple "cells" in a list, grid, or other "gallery" or "container" style display, with multiple content elements within each "cell", e.g., a "carousel" containing a video, title, and short description, a sliding gallery of movie character images with audio buttons that plays a voice clip from the character, etc.

Content can be added to a project in a variety of ways. For example, text content can be modified by typing new values into the item, or by typing into a text field in its inspector.

Content can be dragged and dropped onto a placeholder, even a placeholder containing other content.

The application also supports the creation of content for devices with different hardware characteristics such as display size, resolution and/or device orientation. Page templates and page elements can automatically select the appropriate content for the target environment (device hardware). For example, page templates are provided for specific device resolutions, page templates are provided for specific device orientations (e.g. portrait and landscape), and page templates can handle changes in a device orientation and reconfigure their elements as changes occur. Page templates may be limited to a single display resolution, relying on hardware scaling of the video output by the device or they can handle changes in display resolution and reconfigure their elements as change occur. For example, the templates can animate elements to new sizes/positions as resolution changes, scale bitmap objects to fit the new resolution, substitute bitmap assets with new assets appropriate for the new resolution.

An advertisement can contain multiple "renditions" of content to be automatically selected by at runtime for optimal display, e.g., normal and hi-res versions of bit-map images for display at different scales/display resolutions, multiple bit rate video streams to be selected based on network, device, or other criteria for optimal user experience.

Multiple renditions may be provided to the advertisement manually by the user, or they may be provide automatically by the application by downsampling a "hi-resolution" version to lower resolution versions as needed or by downsampling an ultra-resolution "reference" version to a "hi-resolution" version and all subsequent lower resolution versions as needed. In the case of automatic downsampling, this can be done based on the original asset dimensions assuming it will be displayed at its natural size, e.g., a 100×100 pixel image can be down sampled to a 50×50 image if the hi-resolution and lo-resolution requirements differ by 50% in each dimension.

In addition to dimension-based "renditions", bandwidth-based "renditions" may also be created, and other advanced optimization techniques can be applied, to ensure optimal download speed over varying network types (EDGE, 3G, WiFi).

To ensure compatibility with the advertisement server, networks and known devices, image assets are analyzed to ensure they meet size requirements such as a maximum total size, and maximum image resolution based on bits-per-pixel (BPP), e.g., EDGE network: <0.75 BPP, 3G network: <1.0 BPP, and WiFi: <2.0 BPP.

Video assets are analyzed to ensure they meet size requirements such as a maximum total size and maximum data rate, e.g., EDGE: 80 kbps, 3G: 300 kbps, and Wi-Fi: 1000 kbps.

System-generated and user-provided text assets are processed. For example, JavaScript is concatenated and minified, CSS is concatenated and minified, HTML, JavaScript and CSS is compressed, etc.

Advanced techniques are applied to image assets: multiple images are combined into a single "sprite" image to speed up downloading (one HTTP request versus multiple); HTML, CSS and JavaScript re edited to refer to the new sprite; individual images are inlined as base 64 data into HTML files to minimize HTTP requests; and a web archive is created as a single initial download (tar/zip) with essential advertisement elements.

The system includes the ability for users to add custom JavaScript code in a variety of ways. Write handlers that implement responses to events generated by the system. Such events can include: 1) a button was pressed; 2) the user touched the screen; 3) a new page was navigated to; and 4) the advertisement application was paused, or resumed. Custom JavaScript code can also be used for implementing custom on-screen controls (buttons, sliders, etc.); implementing custom on-screen display elements (views, graphs, charts); implementing custom logic (calculators, games, etc.); and integrating with Web Services functionality, etc. Any custom elements can also be saved for reuse in other projects.

During development of the HTML 5 application, content and functionality can be verified in an interactive environment by on-screen preview within the authoring environment and by toggling the editing "canvas" from authoring mode to interactive mode causing the on-screen elements to become "live" and respond to user input. The project can also be exported to disk such that it can be opened and viewed by the appropriate client application on the users local machine such as a web browser, other desktop reader application, mobile web browser, or other mobile reader application. Additionally, the project can be exported to a shared network location so it can be opened and viewed by the appropriate client application on a remote, network connected machine. Exporting to a shared network location also allows the project to be opened and viewed by the appropriate client application running in a local simulated environment. Another mechanism of exporting is to publish the content from within the authoring tool that allows access to the content via an appropriate client application running on a mobile device. In some embodiments, live changes ca be made in the authoring environment and are published to the viewing application.

As addressed above, testing and previewing the authored application can be an extremely important step, especially for those that are using the authoring tool professionally. Accordingly the authoring tools testing simulations include the ability to test in many different network states as well so as to simulate the real world operation of the application. In some embodiments, the authoring tool can simulate a fast connection becoming slow so that the content creator can view how the advertisement might look if server decided to send a lower resolution asset based on its real time analysis of network condition.

Figure 14:
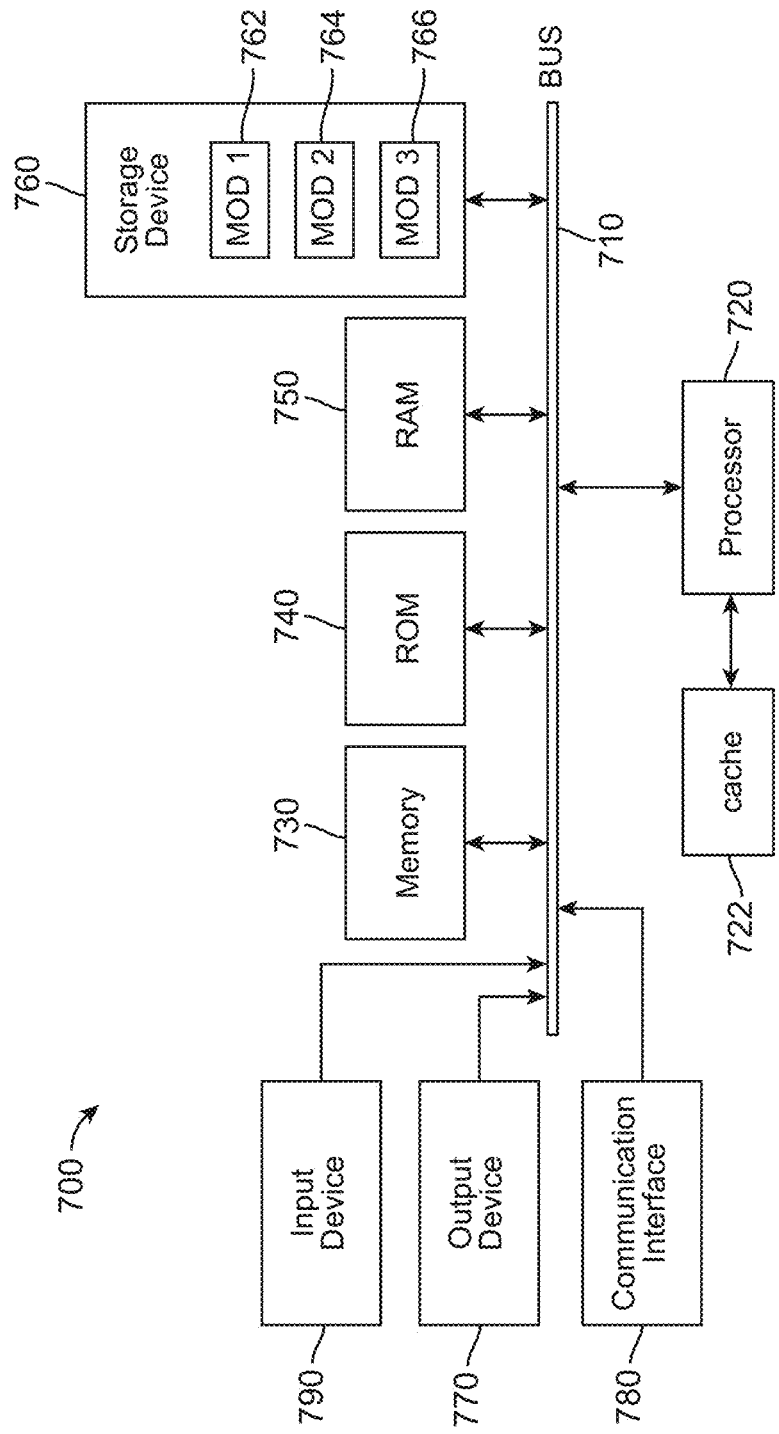
FIG. 14 illustrates an example system embodiment.

As shown in FIG. 14, an exemplary system 700 for implementation of the present technology includes a general-purpose computing device 700, including a processing unit (CPU or processor) 720 and a system bus 710 that couples various system components including the system memory 730 such as read only memory (ROM) 740 and random access memory (RAM) 750 to the processor 720. The system 700 can include a cache 722 of high speed memory connected directly with, in close proximity to, or integrated as part of the processor 720. The system 700 copies data from the memory 730 and/or the storage device 760 to the cache 722 for quick access by the processor 720. In this way, the cache 722 provides a performance boost that avoids processor 720 delays while waiting for data. These and other modules can be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer readable storage media provide nonvolatile storage of computer readable instructions, data structures, program modules and other data for the computing device 700. In one aspect, a hardware module that performs a particular function includes the software component stored in a non-transitory computer-readable medium in connection with the necessary hardware components, such as the processor 720, bus 710, display 770, and so forth, to carry out the function. The basic components are known to those of skill in the art and appropriate variations are contemplated depending on the type of device, such as whether the device 700 is a small, handheld computing device, a desktop computer, or a computer server.

Although the exemplary embodiment described herein employs the hard disk 760, it should be appreciated by those skilled in the art that other types of computer readable media which can store data that are accessible by a computer, such as magnetic cassettes, flash memory cards, digital versatile disks, cartridges, random access memories (RAMs) 750, read only memory (ROM) 740, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 720. The functions these blocks represent may be provided through the use of either shared or dedicated hardware, including, but not limited to, hardware capable of executing software and hardware, such as a processor 720, that is purpose-built to operate as an equivalent to software executing on a general purpose processor. For example the functions of one or more processors presented in FIG. 14 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 740 for storing software performing the operations discussed below, and random access memory (RAM) 750 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 700 shown in FIG. 14 can practice all or part of the recited methods, can be a part of the recited systems, and/or can operate according to instructions in the recited non-transitory computer-readable storage media. Such logical operations can be implemented as modules configured to control the processor 720 to perform particular functions according to the programming of the module. For example, FIG. 14 illustrates three modules Mod1 762, Mod2 764 and Mod3 766 which are modules controlling the processor 720 to perform particular steps or a series of steps. These modules may be stored on the storage device 760 and loaded into RAM 750 or memory 730 at runtime or may be stored as would be known in the art in other computer-readable memory locations.

Figure 15A:
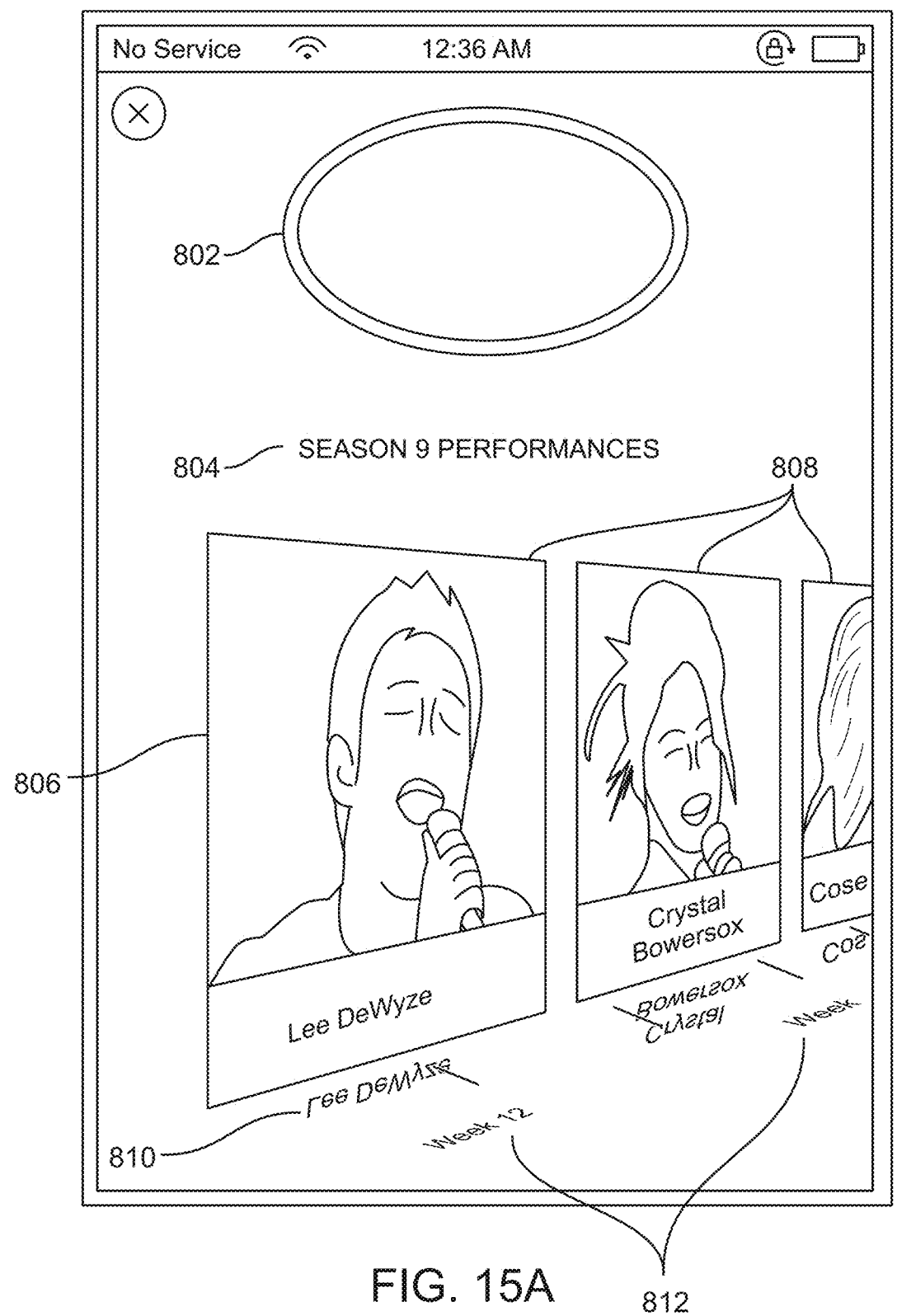
FIG. 15A illustrates an exemplary perspective wall JavaScript element.

As mentioned above, a JavaScript library can include complex "composite" elements. FIG. 15A illustrates a perspective wall JavaScript element. The perspective wall JavaScript element is a virtual wall with one or more rows 806 of files or items 808, where the wall is set at an angle from a user such that the row or rows 806 stretch into the distance. The items 808 can be pictures, logos, text, etc. Above the wall, there can be pictures or logos 802 and text 804 for informational, descriptive, branding, etc. purposes. Below the wall, there can be intriguing visual effects, such as virtual mirror reflections 810 of the row or rows 806, or descriptive text 812 on wall "floor" (i.e. the plane perpendicular to the wall but intersecting with the bottom of the wall). A user can use a swiping gesture to "scroll" (i.e. move the row or rows 806) and navigate along the wall to different files or items 802. Furthermore, the row or rows 806 can optionally wrap around to form a virtual infinite loop of items 808 (i.e. by connecting the first item to the last item) for the user to scroll through.

Figure 15B:
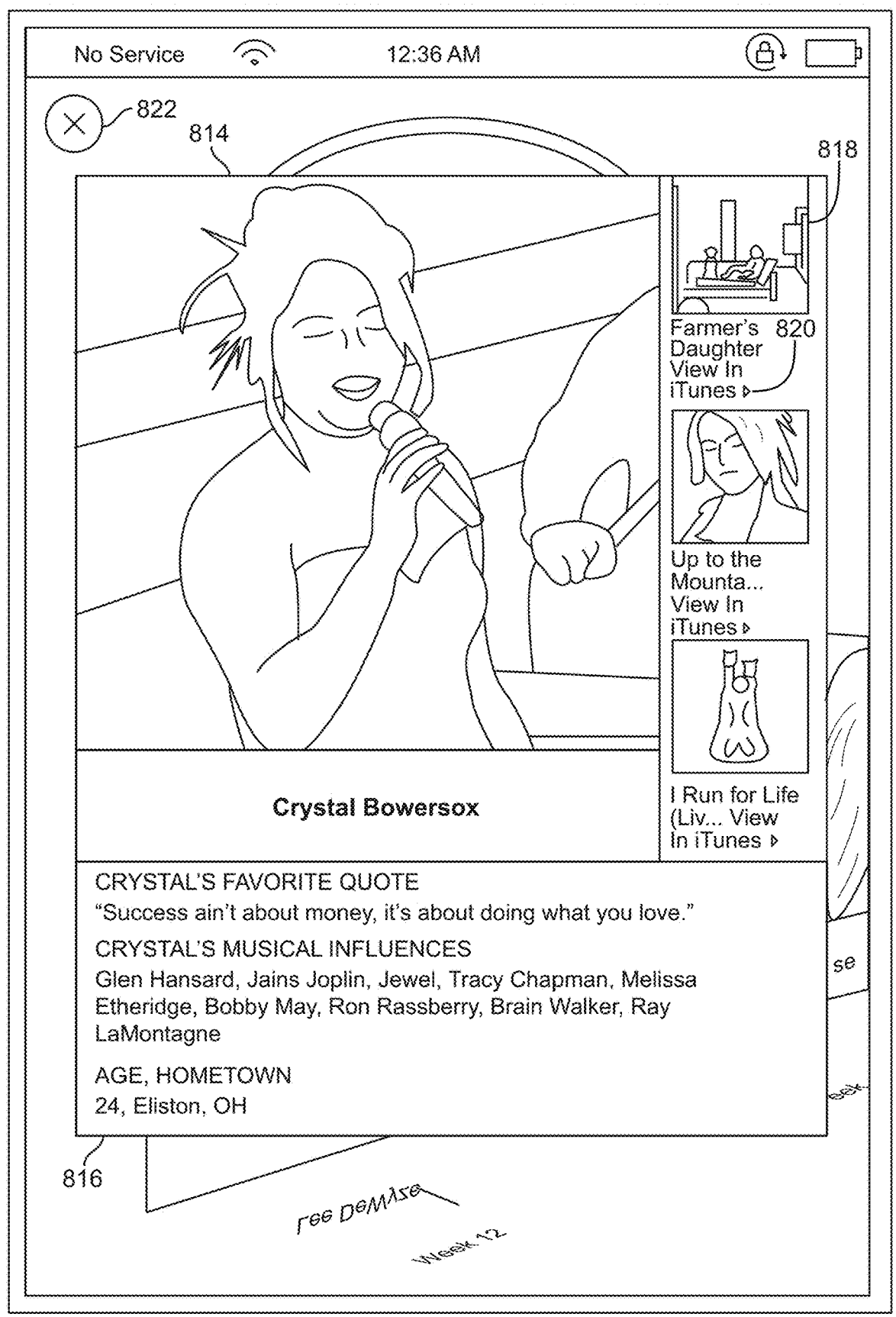
FIG. 15B illustrates an exemplary selection action.

FIG. 15B illustrates how a user can tap or select an item 808 to cause it to "pop out" or "fly out" and enlarge 814 to show more details 816 about it the perspective wall. Additional pictures (i.e. album cover art) 818, data (i.e. song titles), or links (i.e. to an online digital content store such as ITUNES) 820 can be provided to give information to the user or to enable the user to directly purchase the file or item 808 without having to go to an online store to search for it.

At any time, the user may close the content (and return to the state before the content) by selecting the close button 822.

Figure 16:
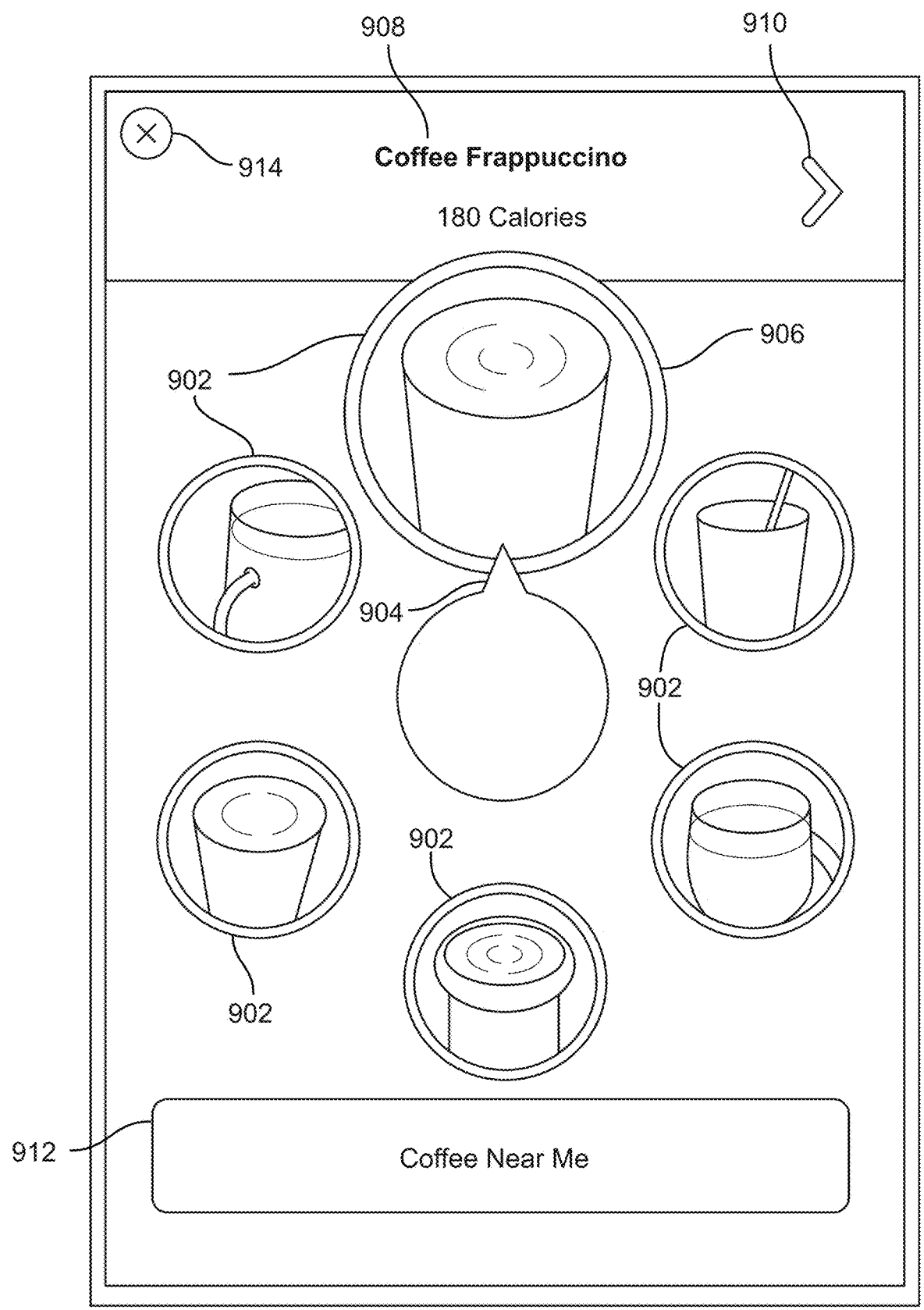
FIG. 16 illustrates an exemplary pinwheel menu JavaScript element.

FIG. 16 illustrates a pinwheel menu JavaScript element. The pinwheel menu JavaScript element is a virtual wheel functioning as a circular menu allowing a user to select from a multitude of items or files 902. The user can use his/her thumb or finger to rotate the pinwheel until the item he/she wishes to select is at the "selected" position. The "selected" position can be defined by an arrow 904 and can be any position in the pinwheel. In this example, the "selected" position is the top position. Thus when an item is in the top position 906, the item becomes "selected." When a particular item is selected 906, it becomes larger in size than the rest of the unselected items. As such, when items are rotated around the wheel, they grow in size as they pass through the "selected" (i.e. top) position and shrink after coming out of the "selected" position.

The pinwheel can also be spun, so that a random item is chosen. This allows for an interactive and engaging way for the user to choose a random item. There can also be a detail portion 908 on the screen that displays more information about the selected item. Tapping the selected item again 906 or pressing a button on the screen 910 can bring the user to a new page with even more detailed information. Additionally, a special button 912 can be provided for the user to find nearby locations where the item is offered. The pinwheel menu and content can be closed by the user at any time by pressing the close button 914.

Figure 17A:
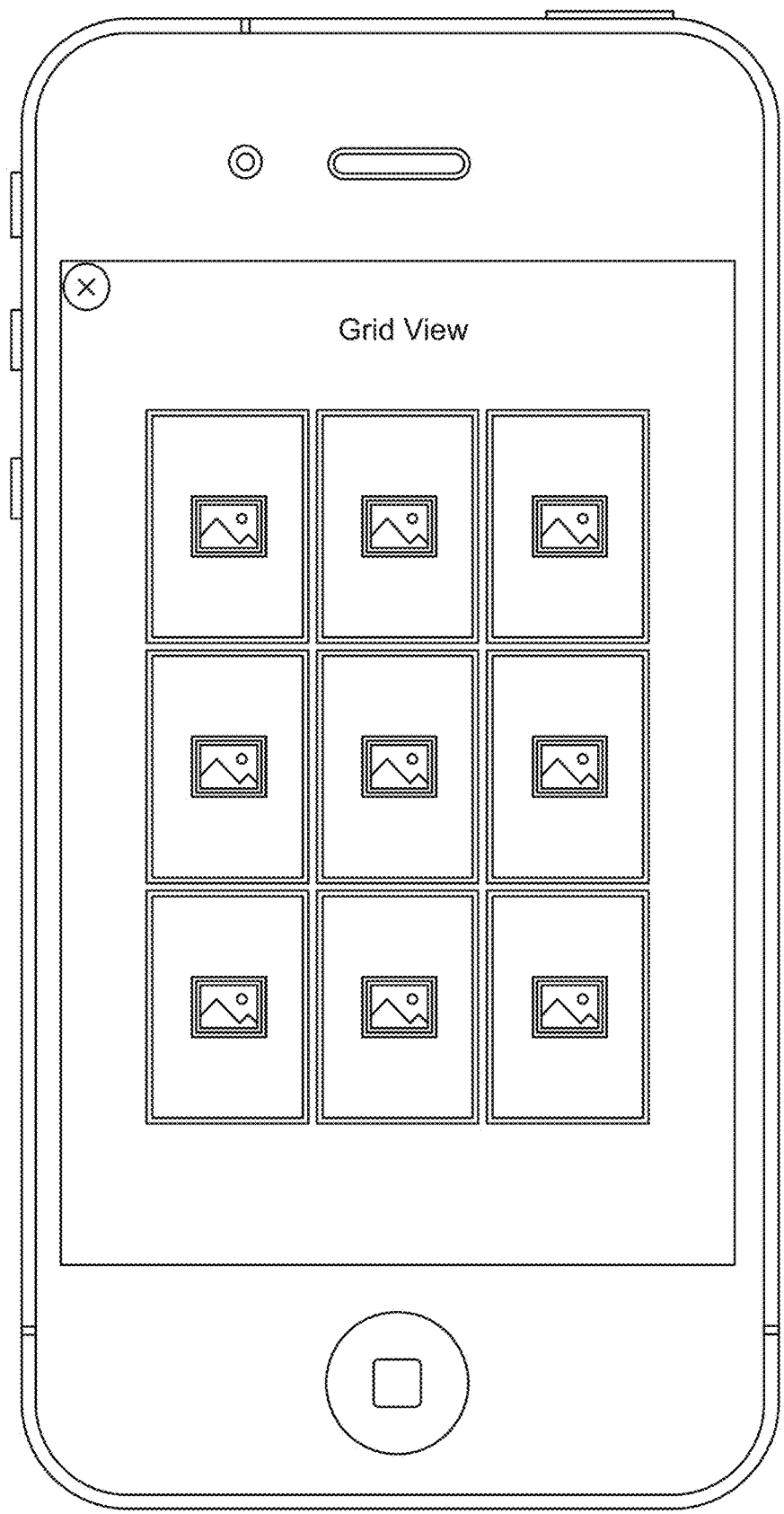
FIG. 17A illustrates an exemplary bare N×M gallery JavaScript element.
Figure 17B:
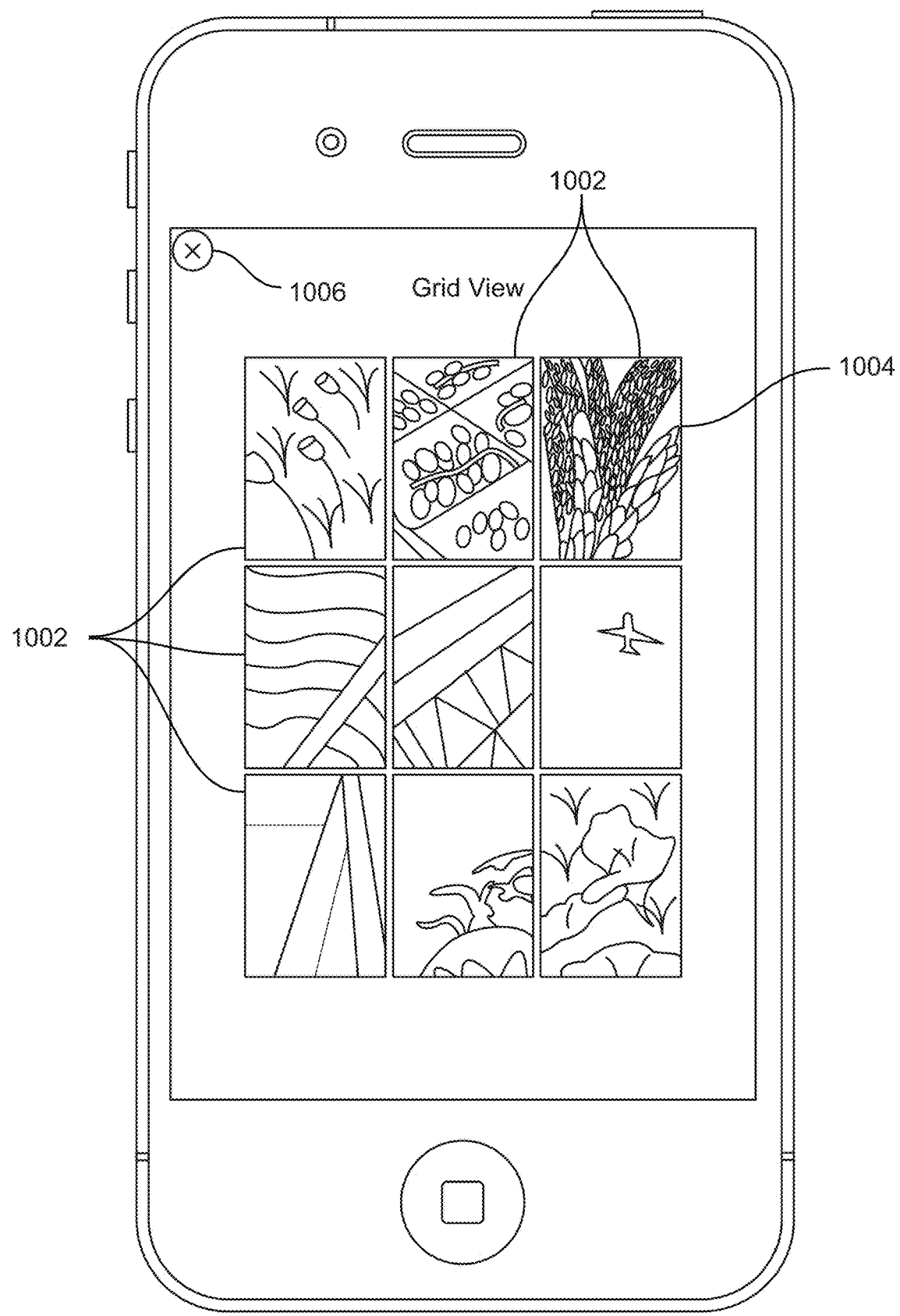
FIG. 17B displays an exemplary 3×3 gallery JavaScript element.
Figure 17C:
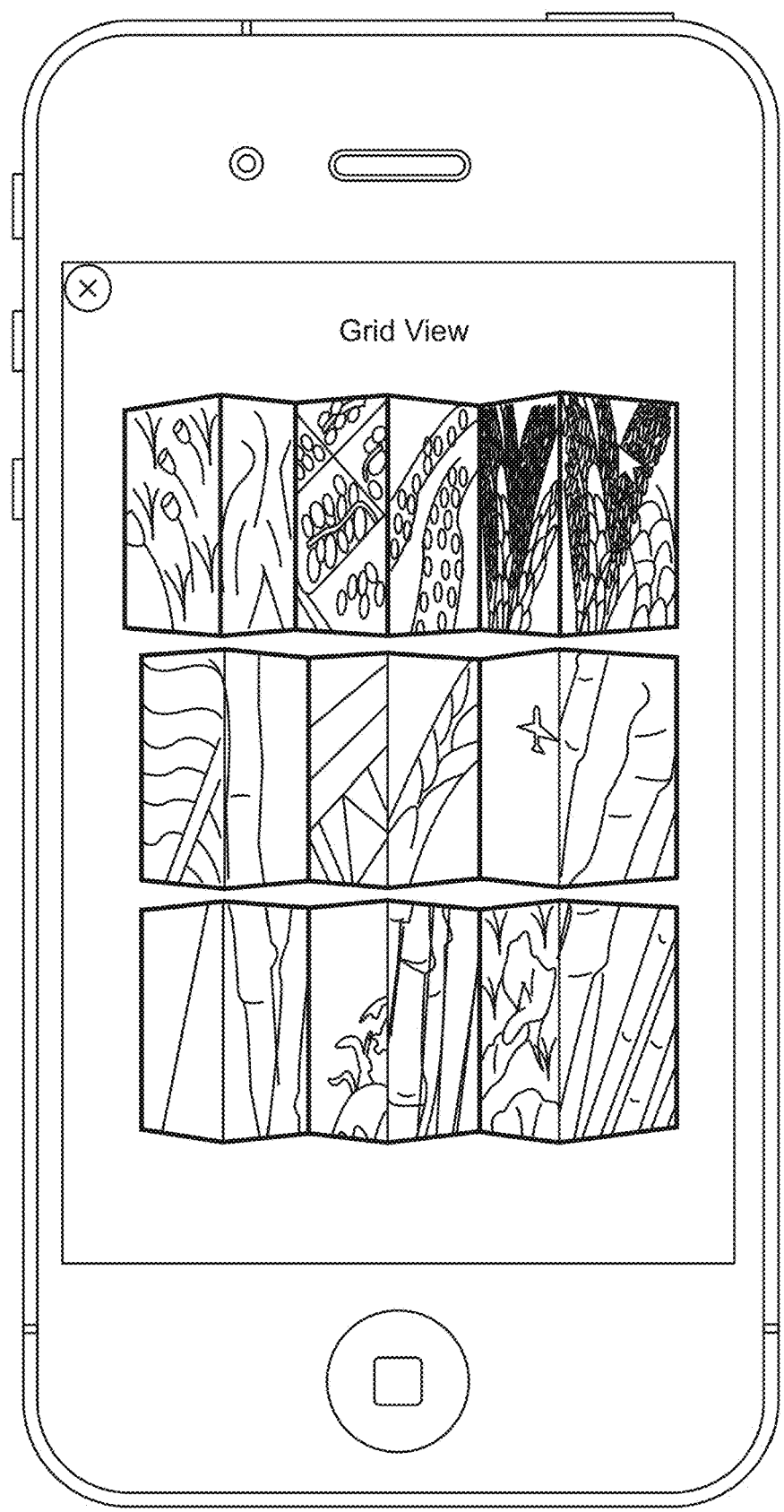
FIG. 17C illustrates an exemplary transition effect.
Figure 17D:
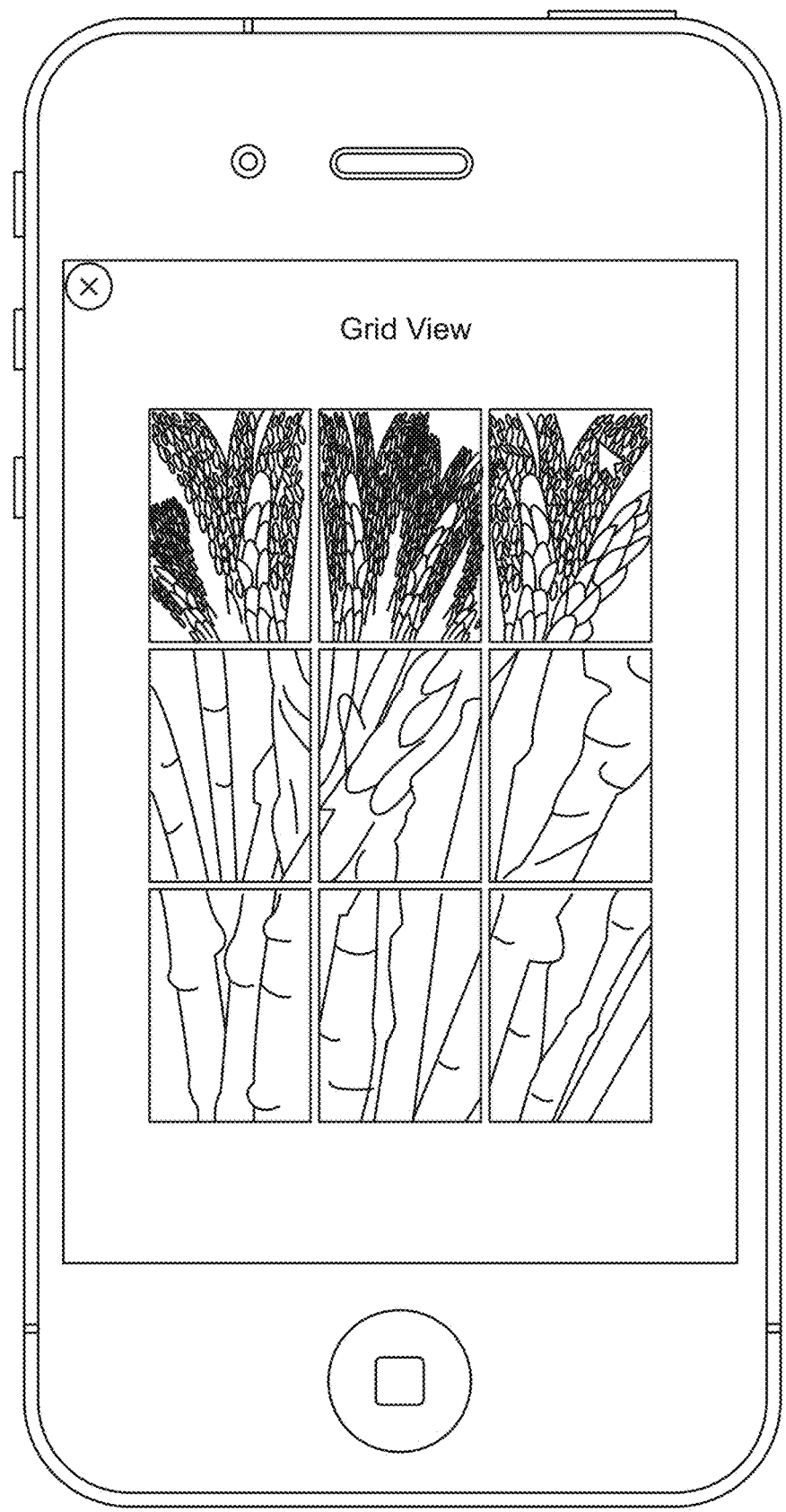
FIG. 17D illustrates an exemplary transition effect.
Figure 17E:
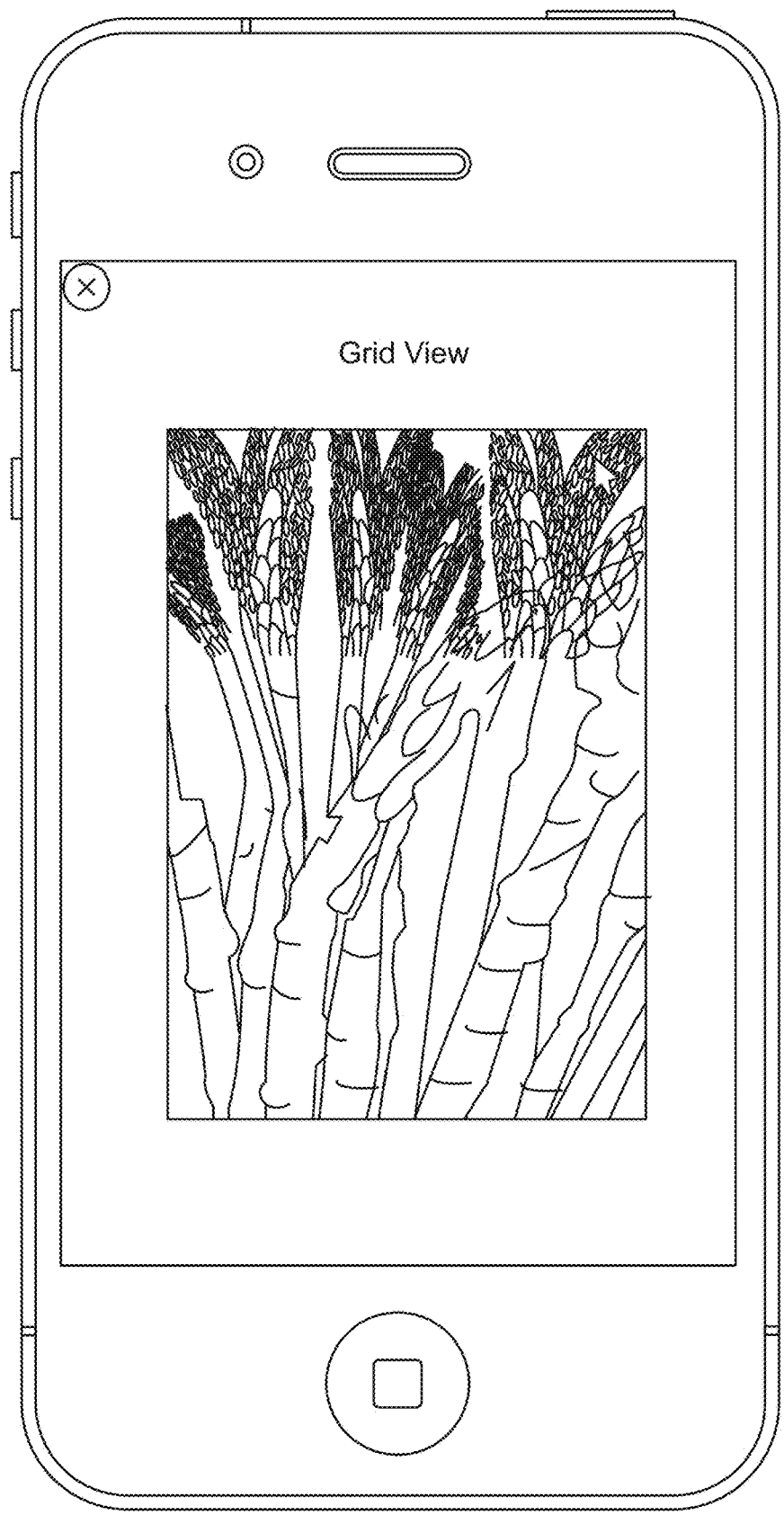
FIG. 17E illustrates an exemplary completed transition effect.

FIG. 17A illustrates a bare N×M gallery JavaScript element with 3×3 sections (i.e. N=M=3), but not yet supplemented with content. N and M are positive integers greater than 0. FIG. 17B displays an example 3×3 gallery JavaScript element containing content. The 3×3 gallery is a collection of nine (i.e. 3×3) items 1002 (which can be depicted by images), each of which can be selected by a user. Initially the collection displays a smaller and/or sectional image for each of the nine items. When the user selects or taps on a particular item 1004, all of the images begin to rotate on vertical axes. During the rotation, it is revealed that each image is actually on the front of a 3-Dimensional rectangular box and the side of each box has a part of a larger full image of the selected item 1004. Each side of the box is of the same size and orientation as compared to each other and as compared to the fronts of the boxes. Alternatively, each image is on the front of a card, which when flipped presents a portion of a composite image formed by the rest of the cards. FIG. 17C illustrates this 3×3 gallery example rotating midway after the user has selected an item 1004. When the rotation is complete, nine parts of a larger full image of the selected item 1004 can be seen by the user. There are still gaps between each of the nine parts; these gaps are not necessary but they allow the user to better see the visual effects of the 3-Dimensional rotation. The nine parts (with gaps in between) of the large full image of the selected item 1004 are shown in FIG. 17D. The nine parts can merge to form a complete large image of the selected item 1004 as illustrated in FIG. 17E. There can be another button or link to offer the user additional information. Also, the user can choose to go back (i.e. by tapping on the large full image, by tapping somewhere not on the image, by tapping on a "return" button) and the blocks will separate and rotate back to the initial appearance displaying all of the images, as shown in FIG. 17B. Again, the user may close the content at any time by selecting the close button 1006.

Figure 17F:
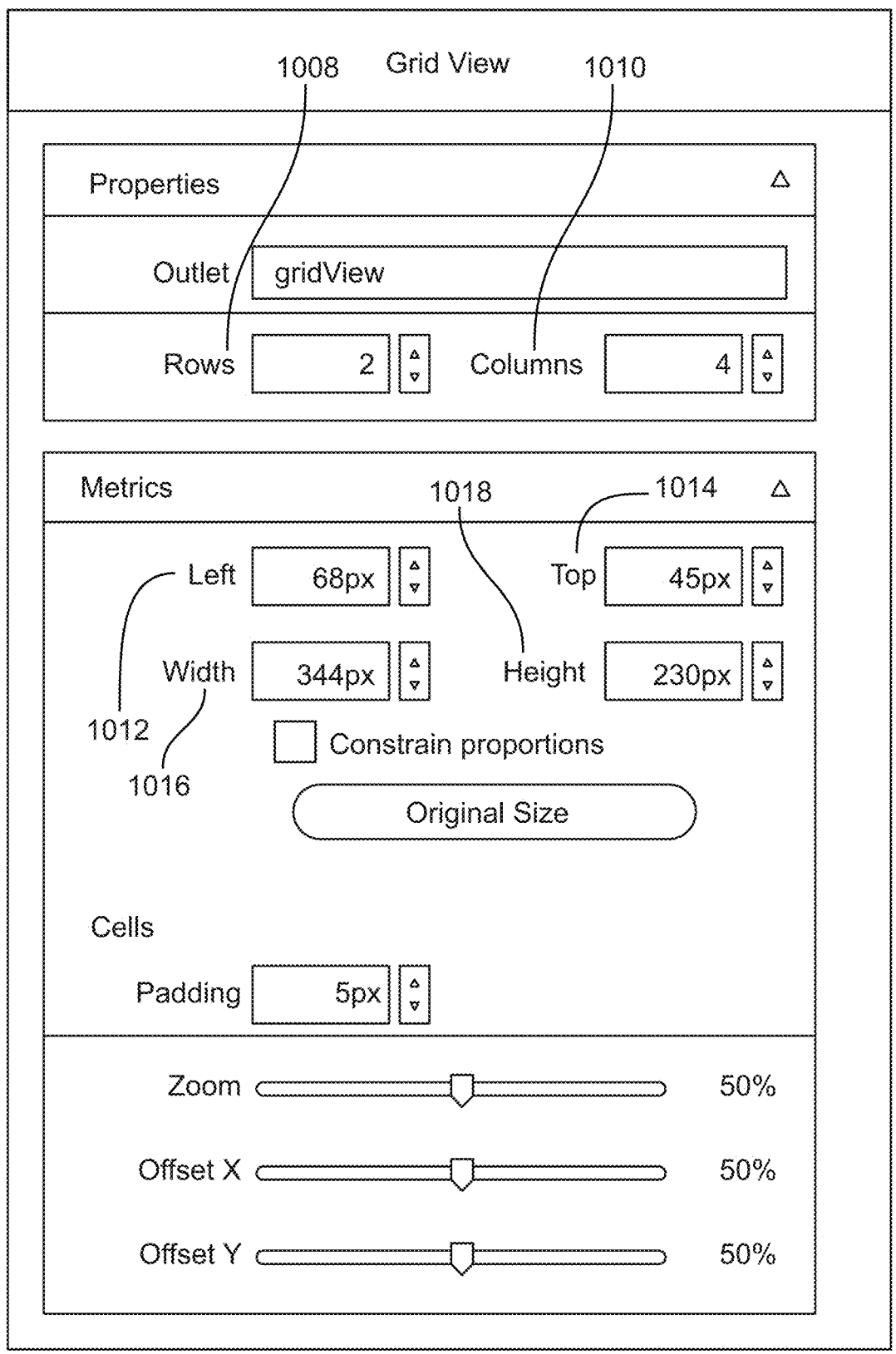
FIG. 17F illustrates an exemplary interface for adjusting JavaScript variables.
Figure 17G:
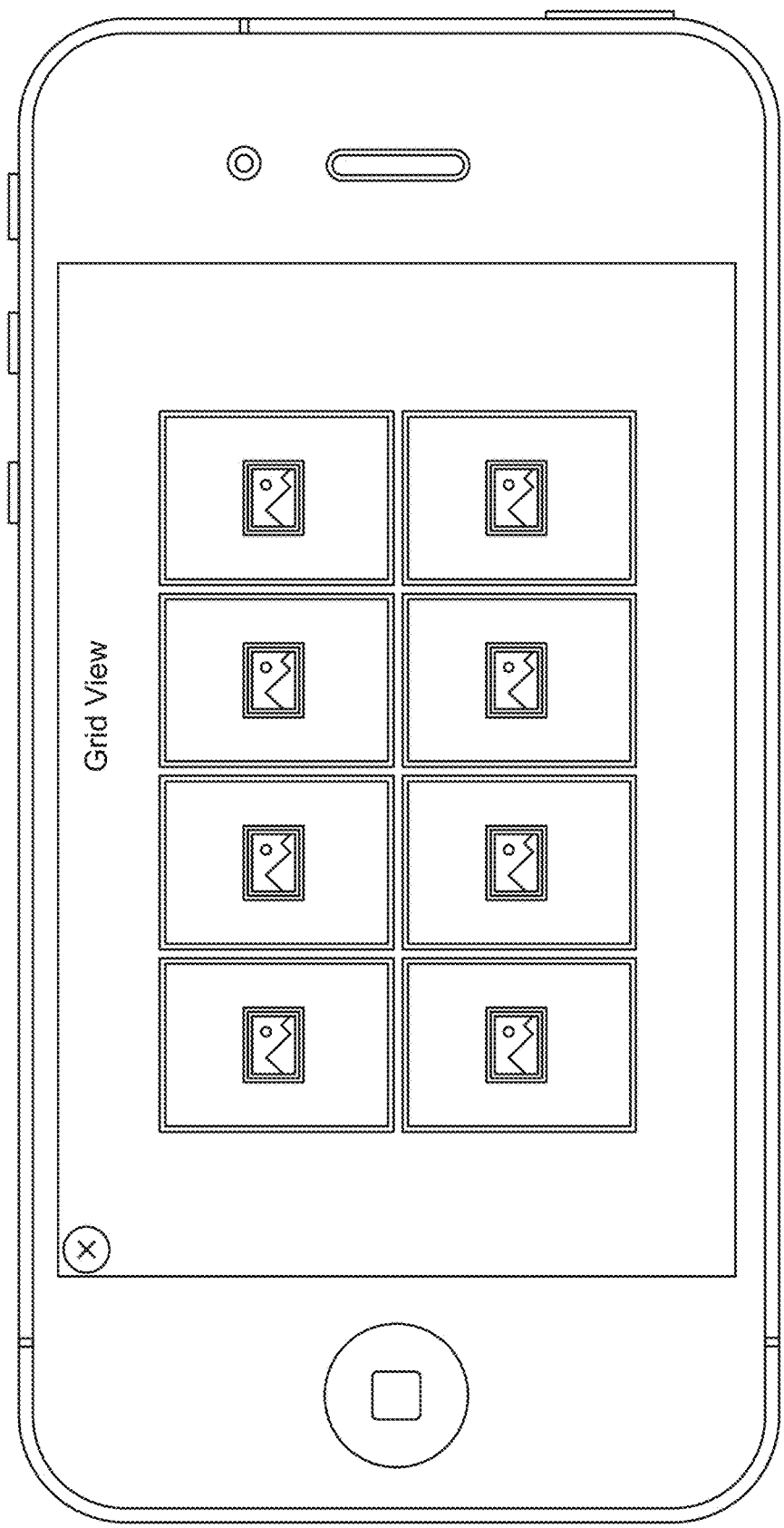
FIG. 17G illustrates an exemplary gallery having various variables adjusted with an inspector.

In some embodiments, widgets or inspectors can also be provided for adjusting known variables within the JavaScript code. For example, in the case of the N×M gallery, an inspector (FIG. 17F) can adjust the N and M parameters (rows 1008 and columns 1010 of the gallery), the effective boundaries (i.e. by adjusting the left 1012 and top 1014 positions) where the content will appear, the width 1016 and height 1018 of the content, and many other details. FIG. 17G shows an exemplary gallery having various variables adjusted with an inspector.

For the perspective wall example, the adjustments an inspector can make include (but is not limited to) altering the shape and size of the files or items, the speed of scrolling, the angle of the wall, spacing between the files or items, the number of files or items visible at once to the user, the degree of transparency of the virtual mirror reflection, whether there is information on the wall "floor," whether the row or rows wrap around, and how text appears.

In the example of the pinwheel menu, an inspector can adjust the number of items, the speed of scrolling, the size and shape of the items, and other details.

FIGS. 18A-18D illustrate an example virtual 3-Dimensional environment, first-person-perspective menu JavaScript element. A user interacting with this menu 1100 can view the menu items from a "first-person" or "cockpit" point of view. This can be accomplished through use of a viewport positioned in the virtual 3-D environment. As shown in these figures, the viewport may be initially positioned at a coordinate in the center of the virtual 3-D environment and oriented to face a starting position. The viewport may also be positioned at other locations in the 3-D environment, such as off to the side or in a corner. The direction the viewport is facing may be represented as a single ray originating from the viewport in a set direction. The range of view seen by a user through the viewport may be an angle of varying size originating from the viewport. For example, the range of view may be configured to be 90 degrees so that the user may view the menu items from a first person point of view and may see 45 degrees to each side of the direction the viewport is facing to encompass a total 90 degree view of the virtual 3-D environment.

The menu items available for selection are preferably located in front of and around the viewport and can be located at the user's various viewpoints or perspectives. A menu item may be viewable if it is within a predefined range within the viewport. For example, the viewport may be configured to have a range of view of 90 degrees spanning 45 degrees to either side of the ray representing the direction the viewport is facing, as described above, and any menu item falling within this range of view may be viewable by the user. The menu item that is located directly in the direction the viewport is facing may be come "highlighted." When a menu item becomes "highlighted" it may be selected by the user. All of the available menu items may be located "around" the viewport. For example, in the virtual 3-D environment, the menu items may be located on along a virtual continuous enclosed (i.e., circular, polygonal, etc.) path, in a horizontal plane relative to the viewport, the viewport being positioned at approximately the center of the enclosed circular path (i.e., center of circle or polygon), as shown in FIG. 18D. There can be a compass-like indicator along the border showing a user which way he/she is currently facing through the viewport. On the screen, the indicator can be in the form of a bar showing the user which rotational degree he/she is currently at and which way he/she can rotate. For example, referring back to FIG. 18A, an indicator can be a horizontal bar 1102. The center 1104 of the horizontal bar indicator can show which direction the user is currently viewing, that direction being represented by a rotational degree (i.e., "0") 1106.

A user can change the orientation of the viewport to change the user's perspective of the virtual 3-D environment. The user can accomplish this through any known input means such as, but not limited to, moving a mouse, clicking/ selecting a directional arrow, gesturing on a touch screen, inputting on a keyboard, or inputting a voice command through a microphone. The change in the orientation of the viewport may be animated such that the user can view the change and additional menu items can be brought into view as they come within the view of the viewport in the virtual 3-D environment. In addition to other menu items coming into view, other animations may be used to animate the change in orientation of the viewport within the virtual 3-D environment. For example, the position of the viewport may be represented by an image of a person meant to represent the user, and animated to move as the configuration of the viewport is changed. Additionally, the animation may include a change in the foreground and background scenery to further animate the effect of change in orientation of the view of the viewport in the 3-D environment.

For example, if the user wishes to scroll through different menu items, the user may change the configuration of the viewport to the left by pressing a left button on a keyboard. As the viewport's configuration in the 3-D environment is being adjusted to the left, the animation of the user can be changed to represent this by simulating the user's head and/or body turning in the opposite direction (i.e., scrolling left simulates turning the user's head and/or body right). Additionally, animated mountains or trees in the background may shift to the right to simulate the user changing his or her view to the left.

This way a user may be able to move through all of the menu items available for selection. As the user scrolls or turns, the rotational degrees in the horizontal bar indicator 1102 can shift as well. As menu items come within the predefined view of the viewport, they can be displayed on the screen. Conversely, as menu items move away from the predefined view, they are not displayed.

For example, if the user scrolls left, it can animate his/her head and/or body turning right 90 degrees, still looking straightforward (at his/her "3 O'Clock" position). In effect, a menu item 1108 which comes within the view of the viewport will rotate left or counterclockwise along the virtual continuous (i.e., circular, polygonal, etc.) path and go off the screen, while the next menu item (1110 in FIG. 18B) will rotate left or counterclockwise along the virtual path onto the screen.

The animation may also be used to represent a menu item becoming "highlighted," as described above. For example, when a menu item is highlighted, the animated representation of the highlighted menu item may light up or appear brighter while the non-highlighted items are darker. Another example is that a highlighted menu item may appear to increase in size as compared to the non-highlighted items. A further example is that a highlighted menu item may also appear to have a certain "highlighted" border around it. Yet another example is a highlighted menu item may also appear to be in focus while the other non-highlighted items are blurred. One other example is a highlighted menu item may appear to directly face the viewport while the other items appear to be at an angle. Any of these examples may be employed individually or in combination with each other.

Further, additional information may be displayed when a menu item becomes highlighted. For example, certain meta data associated with the menu item may be displayed.

Figure 18B:
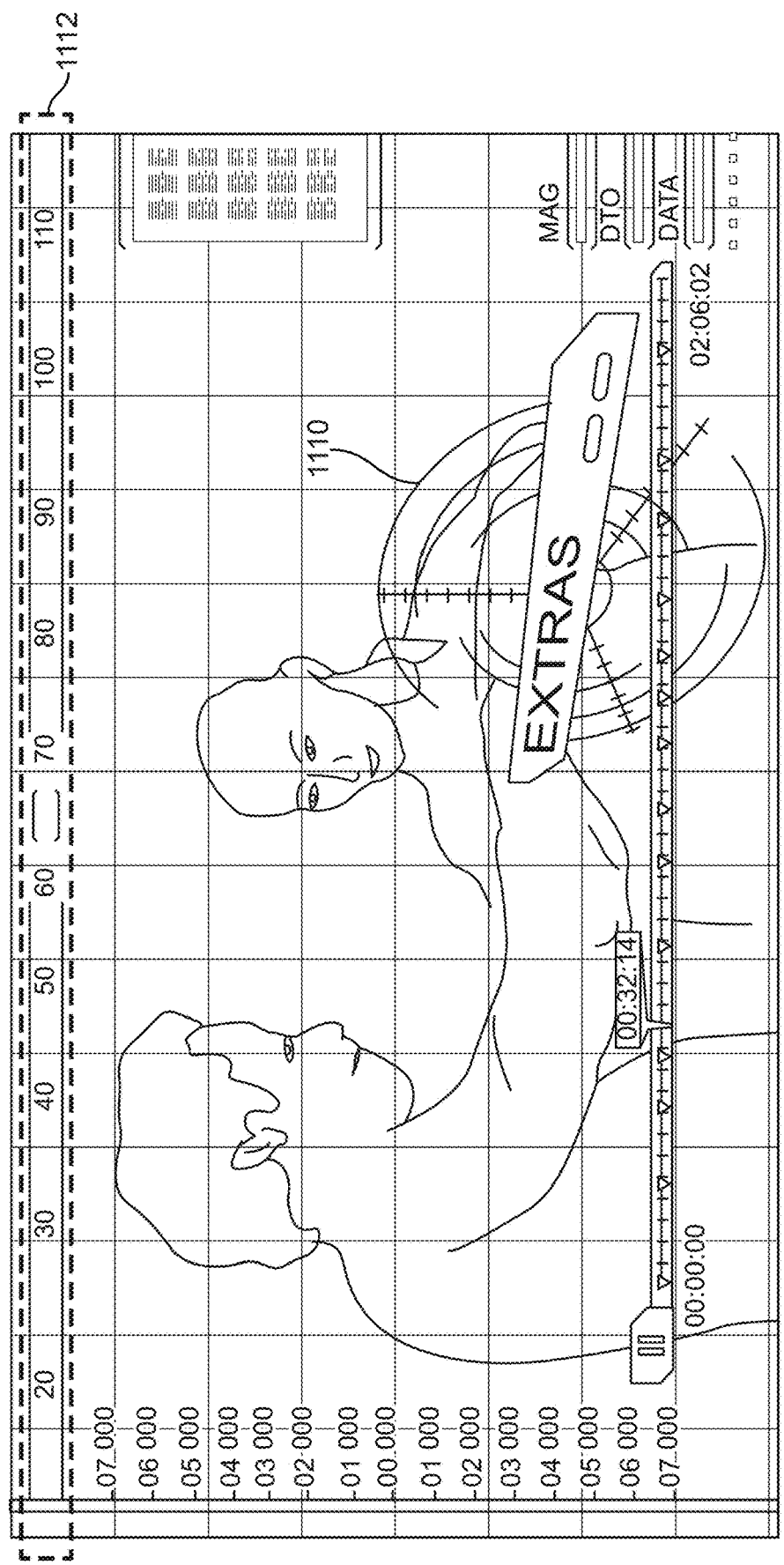
FIG. 18B illustrates an exemplary transition effect.
Figure 18C:
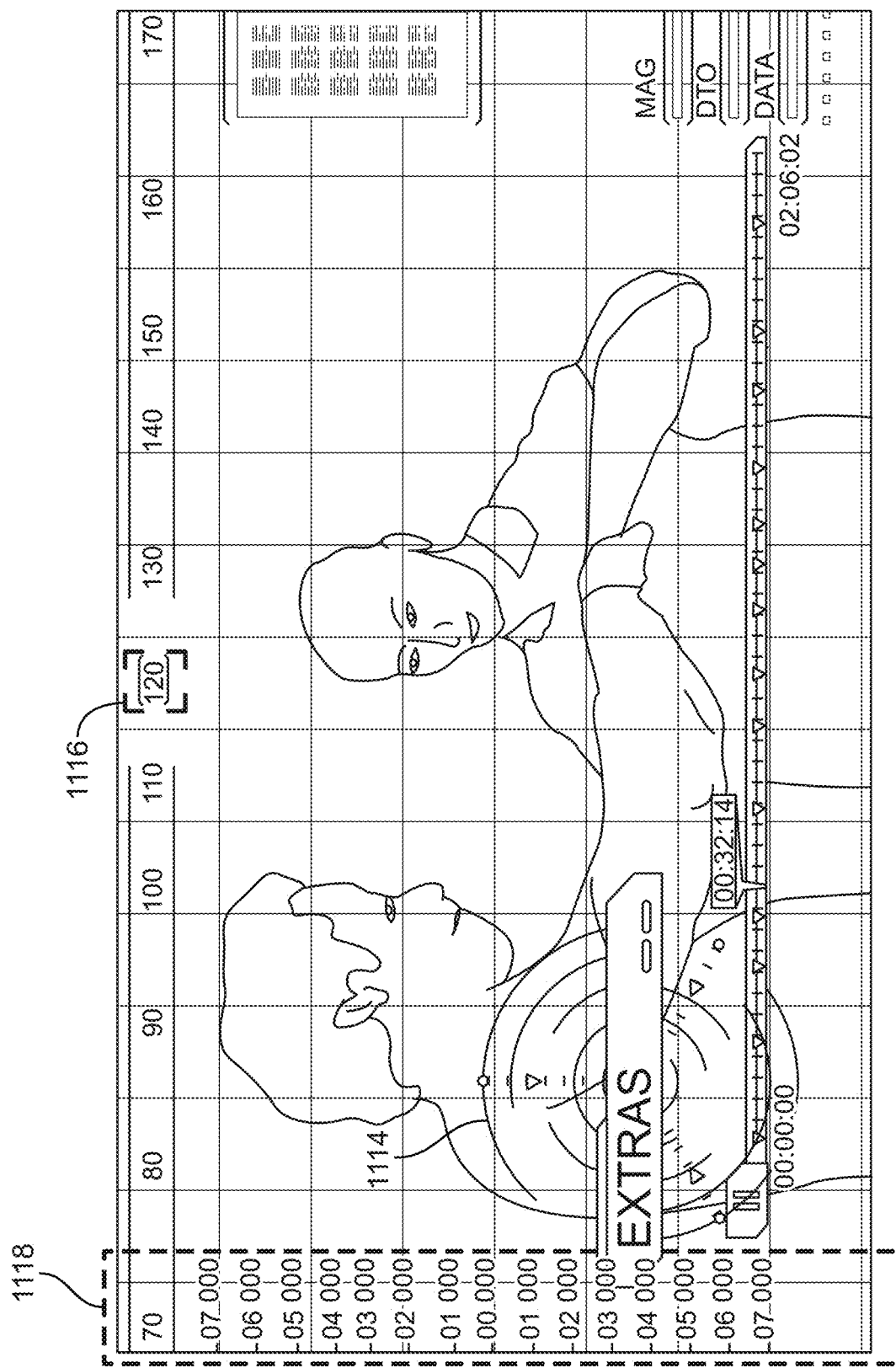
FIG. 18C illustrates an exemplary completed transition effect.

FIG. 18B shows the menu in the midst of the user's scrolling left, representing his/her head and/or body turning right. As the user scrolls left (as he/she turns right), he/she can see the next menu item (i.e., in effect, the next menu item being rotated counterclockwise onto the screen). FIG. 18B shows the next menu item as it is being rotated onto the screen 1110 as well as the shifting of the degrees 1112 in the horizontal bar indicator. The user can scroll left until this next menu is in its "highlighted" position. FIG. 18C shows this next menu item in its "highlighted" position 1114 as well as the rotational degree 1116 of the user's viewpoint, which is where this item is located. The user can either select this item, or scroll left or right to another item.

In addition, there can be other viewpoints or perspectives for items to be located at, such as along a vertical axis 1118. There can be items located at particular viewpoints determined by particular degrees on both horizontal and vertical bars.

Again, in some embodiments, widgets or inspectors can also be provided for adjusting known variables within the JavaScript code. For example, in this case, an inspector can adjust the number of menu items, the speed of turning/ shifting, the various angles and degrees relating to the user's point of view, whether or not there are other axes for menu items (i.e., vertical axis), whether or not there are any indicators (and their locations), and many other details.

Figure 19A:
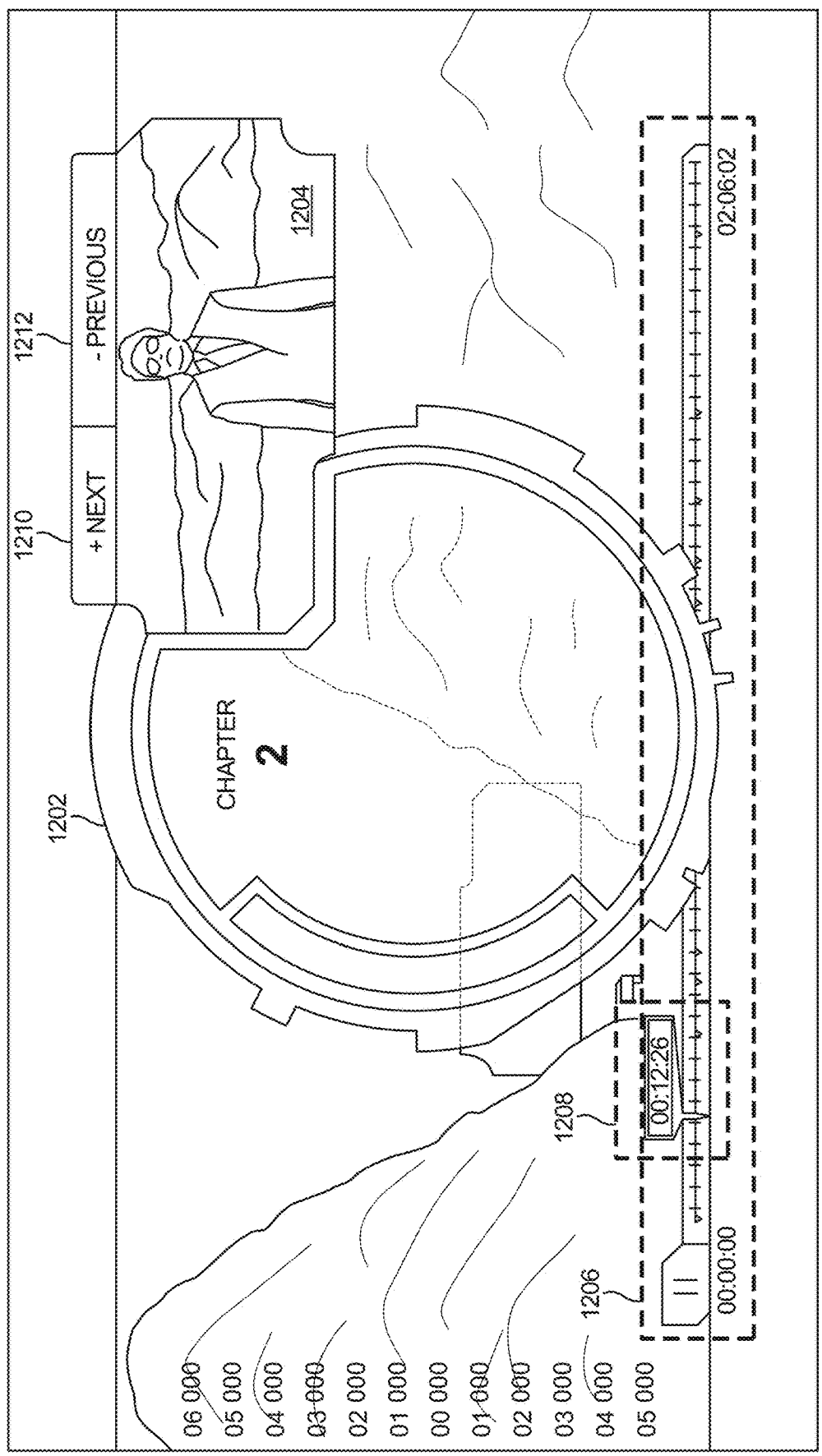
FIG. 19A illustrates an exemplary 3-Dimensional, linear tunneling menu JavaScript element.
Figure 19B:
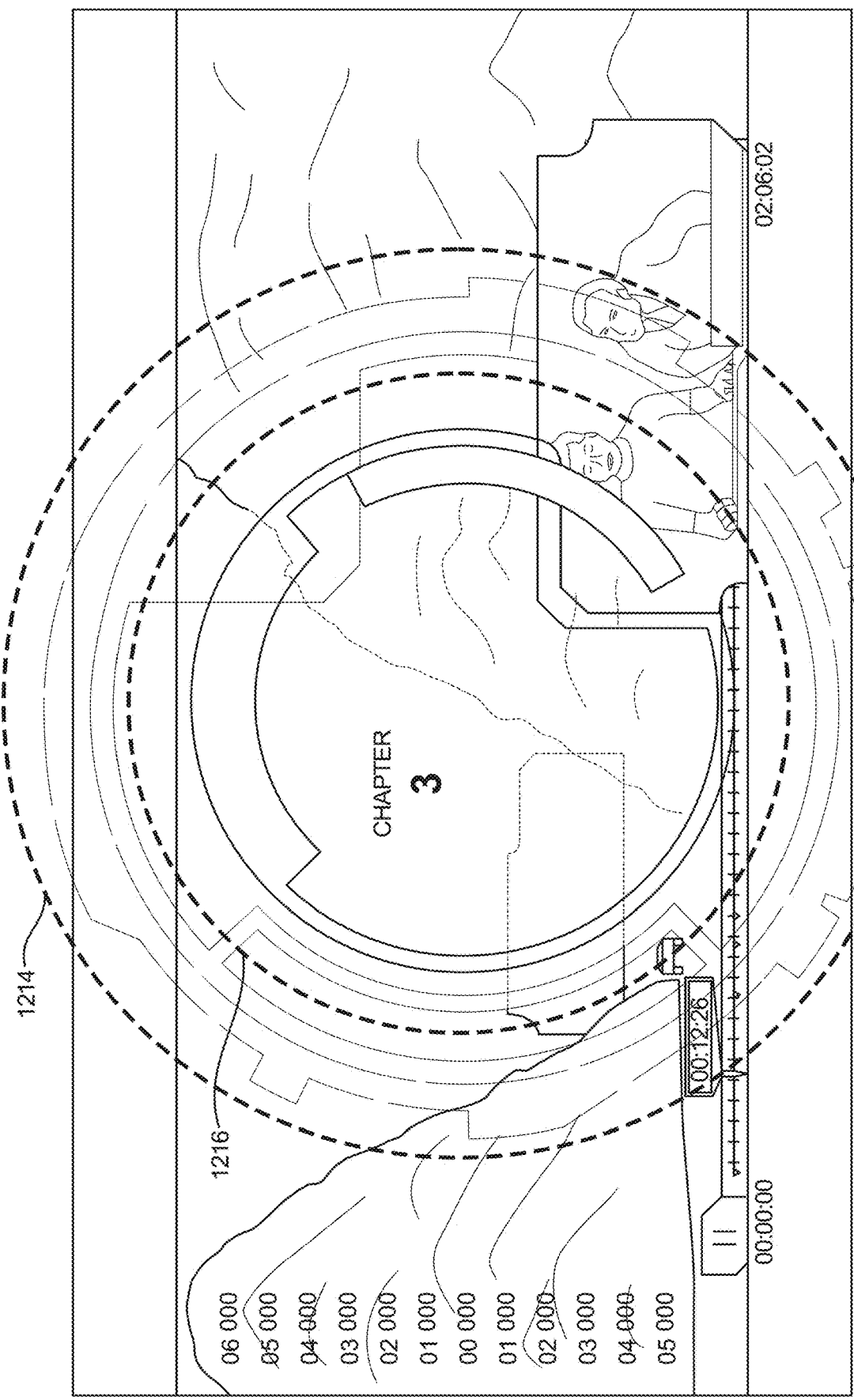
FIG. 19B illustrates an exemplary transition effect.

FIG. 19A shows an example linear, 3-Dimensional, tunneling JavaScript element. A user interacting with this menu element 1200 can move through menu items by moving "forward" or "backward," not on a horizontal or vertical axis ("x axis" and "y axis"), but on a third linear axis ("z axis") formed approximately by the user's point of view receding to a one-point perspective at the center of the screen, as shown in FIG. 19D.

Referring back to FIG. 19A, the currently "highlighted" (i.e., to be selected) menu item can be shown to the user in a default position 1202. He/she can select this item if he/she so chooses. Additional details 1204 can also be displayed on the screen for the user to view. Moreover, there can be another indicator 1206 to display information about the currently "highlighted" menu item in relation to the other menu items available for selection. This indicator can show the position 1208 of the currently "highlighted" item relative to the other items.

If the user does not want to select this item, he/she can scroll up on the screen (or select a button 1210, i.e., "next") to move "forward" on the "z axis" to reach the next item, or he/she can scroll down on the screen (or select another button 1212, i.e., "previous") to move "backward" to reach the previous item. As the user moves "forward" (on the z axis), the menu item moves out 1214 of the currently "highlighted" position. The user begins to pass through the no longer currently "highlighted" menu item 1214 (in effect, the formerly "highlighted" menu item begins to enlarge and fade 1214 until it is no longer visible on the screen) as shown in FIG. 19B; it enlarges because from the concept of vantage points, bigger equates to closer and smaller equates to further. Also, as the user moves "forward," the next menu item begins to appear 1216 on the screen.

Each menu item is a 3-D object too. The depth menu is laid out along the Z-axis, through the user's head and away to the (fake) horizon. Some menu items must be hidden when they are off-screen, to avoid the user feeling like things are flying through their head. This happens a bit in the depth menu, as the user navigates through the menu items, they pass from in front to behind (where they are then hidden completely).

A further feature of the depth menu to make it appear more realistic is provide though a simulated depth of field.

The elements that are farther away in the Z direction are blurred, to prevent everything from appearing in focus and making the illusion of depth not realistic. As the menu items come in the plane of the screen (right in front of the user) the blur is animated away and the item is brought into focus.

Figure 19C:
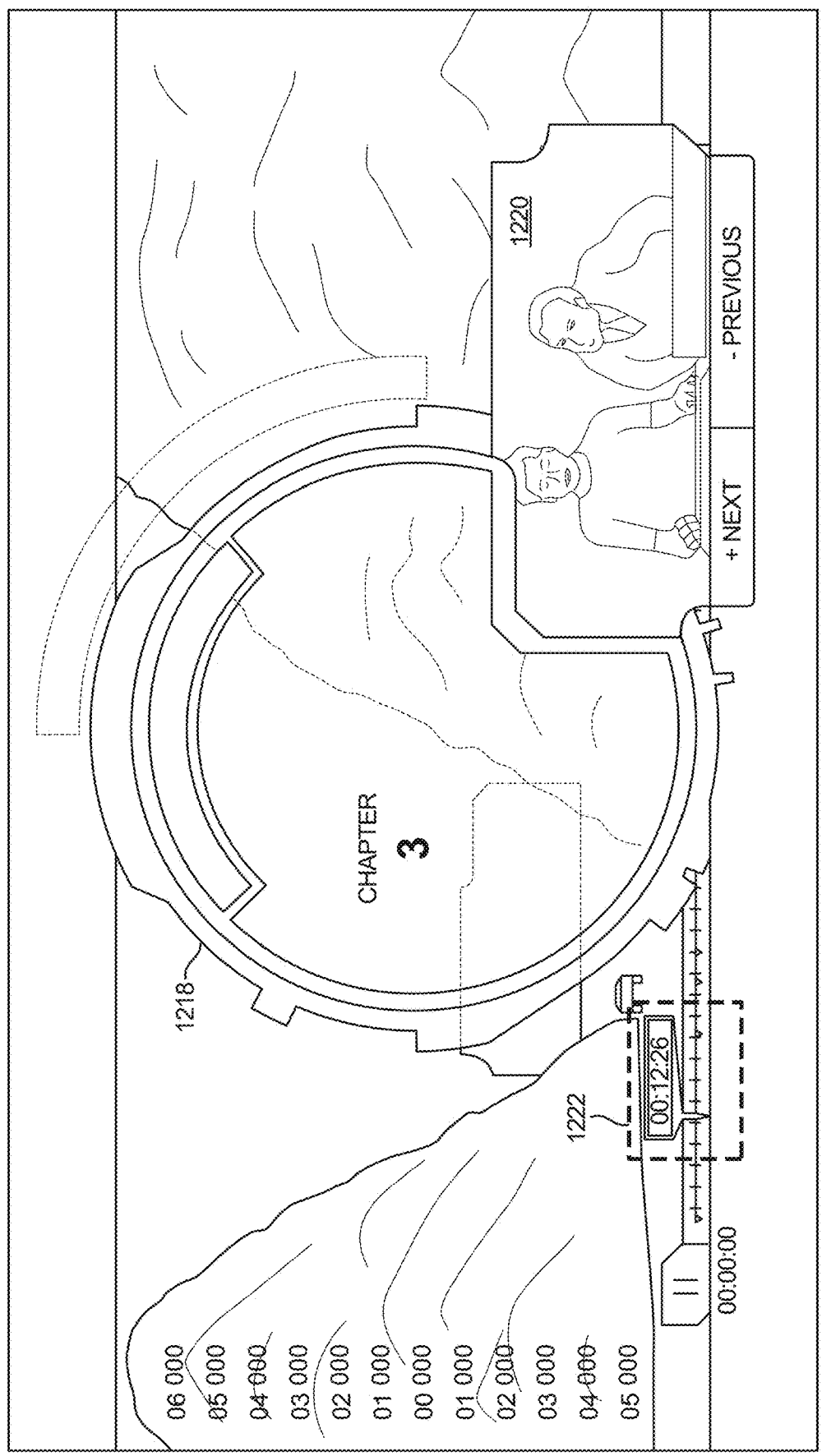
FIG. 19C illustrates an exemplary completed transition effect.
Figure 19D:
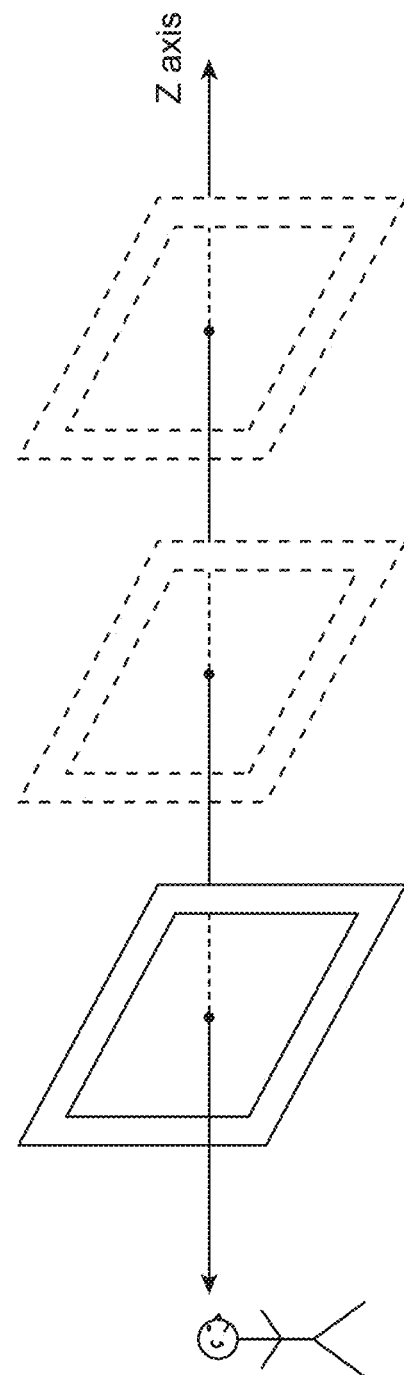
FIG. 19D illustrates an exemplary representation.

FIG. 19C shows this next menu item in the currently "highlighted" position 1218. Again, additional information 1220 about this item can be displayed on the screen. The indicator 1222 displaying information about this item in relation to the other items can also be updated. The user can select this item. Otherwise, he/she can move "forward" (i.e., scroll up, select "next," etc.) or move "backward" (i.e., scroll down, select "previous," etc.) on the z axis to reach the next item or previous item, respectively.

As described above, in some embodiments, widgets or inspectors can be used to adjust certain variables within the JavaScript code. For example, in this case, a widget or an inspector can be used to adjust the number of menu items, the speed of moving (i.e., moving along the z axis), whether or not there are any indicators (and their locations), whether or not there is other information to be displayed (and their locations), and many other details. Thus, without having extensive knowledge about computer programming languages (i.e., JavaScript), one can still easily adjust and customize such an element.

Figure 20A:
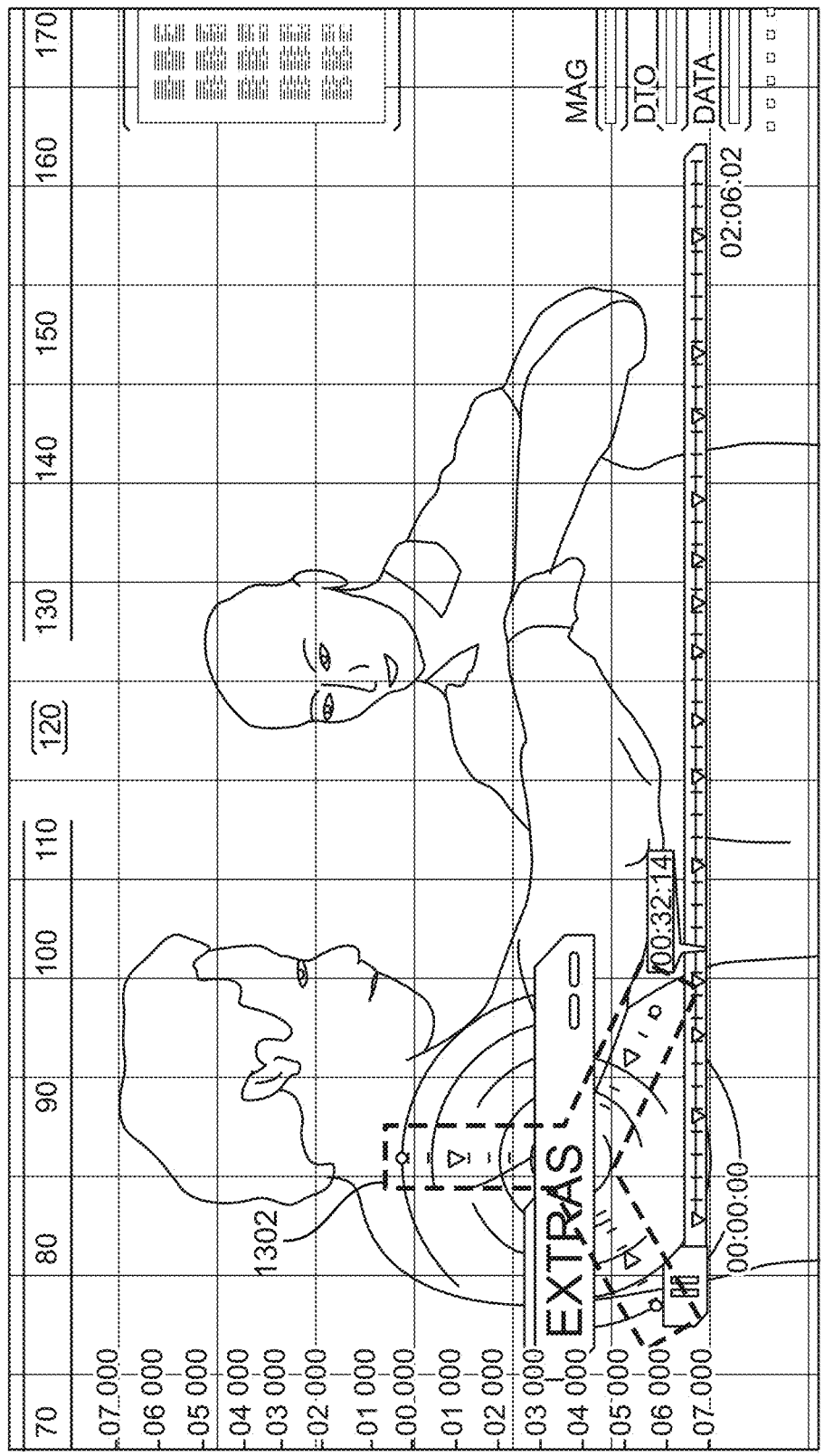
FIG. 20A illustrates an exemplary 3-Dimensional, revolving door menu JavaScript element.
Figure 20B:
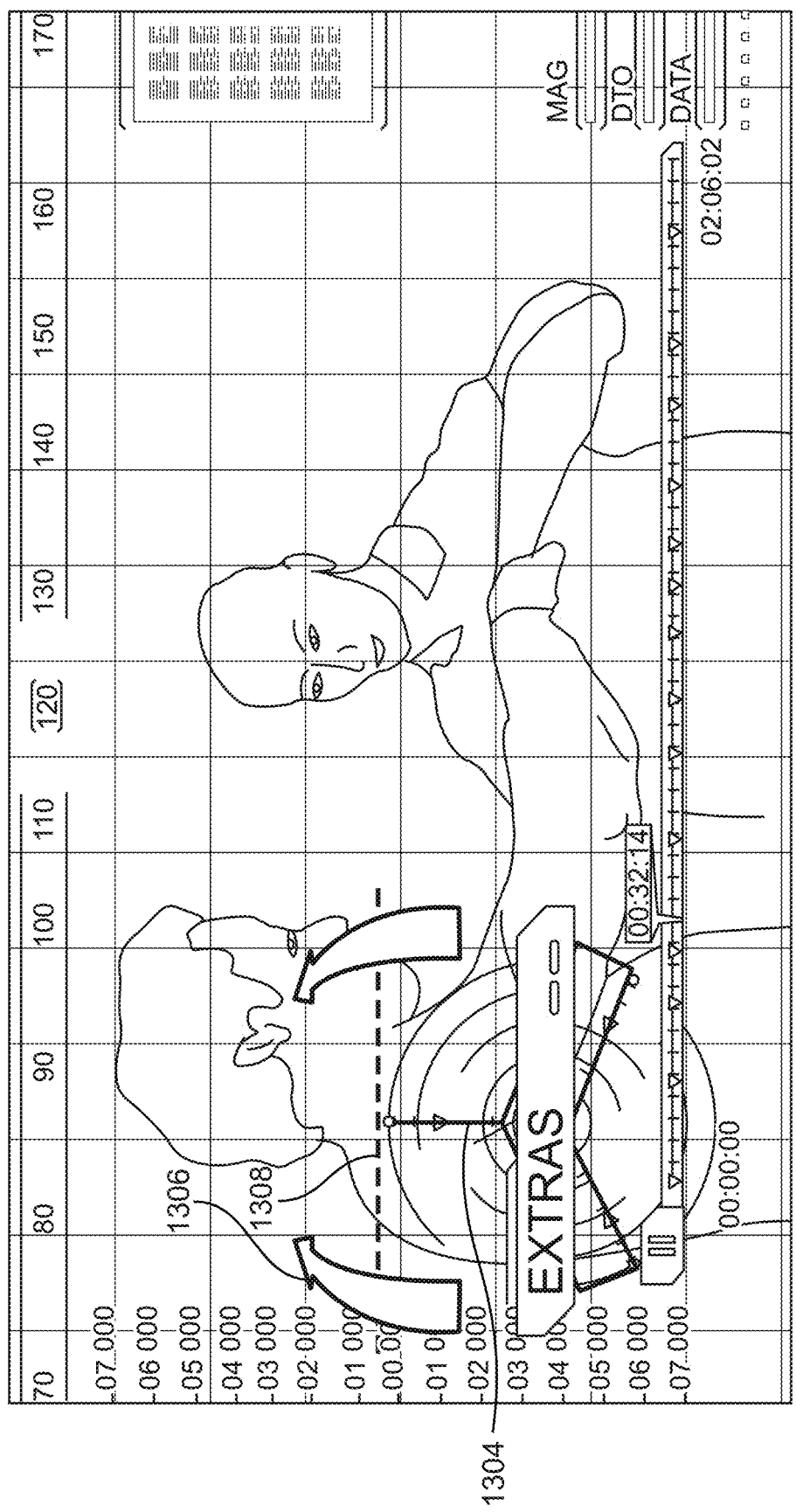
FIG. 20B illustrates an exemplary transition effect.
Figure 20C:
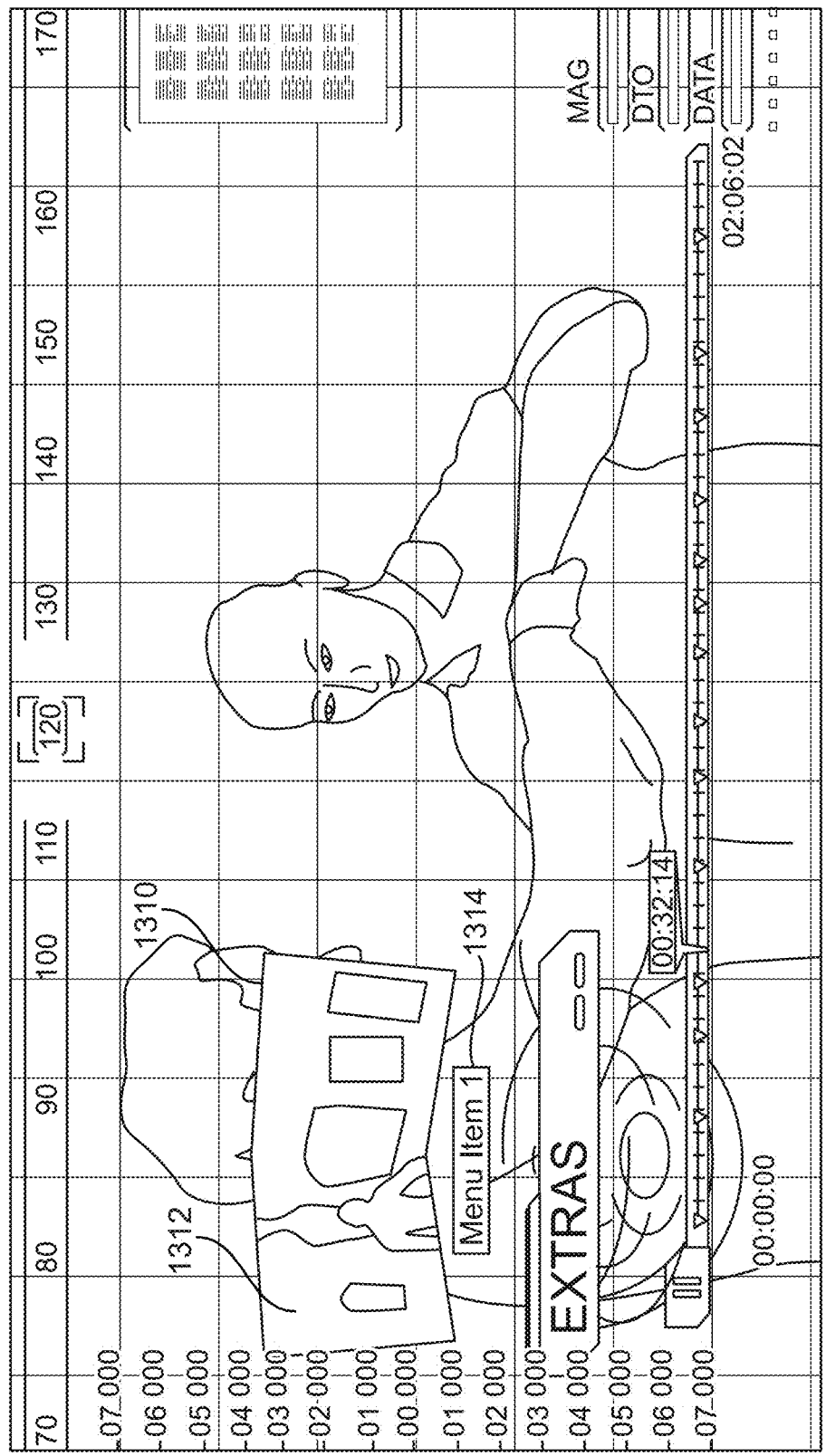
FIG. 20C illustrates an exemplary completed transition effect.

FIG. 20A illustrates an example 3-Dimensional, "revolving door" menu JavaScript element. It is denoted as a "revolving door" menu because the menu resembles a revolving door. This particular example menu has three doors (also known as "wings" or "leaves"). The menu can be initiated or activated automatically or by the user. If initiation/activation is to be triggered by the user, then there can be a selectable element (i.e., the menu's initial position 1302) for the user to initiate/activate the menu. Once activated or initiated, the top of this example three-wing or three-leaf "revolving door" menu emerges from its initial position 1302 in the same plane as the screen. FIG. 20B shows the example three-wing or three-leaf "revolving door" menu beginning to emerge 1304 from its initial position. The top of the menu is actually rotating upward (and "into" the screen) 1306 along a virtual horizontal axis 1308. FIG. 20C shows the menu after it has emerged and rotated into its default position 1310. The sides of the two doors facing the user can together form a menu item 1312, which is in the currently "highlighted" (i.e., to be selected) position. There can be an area 1314 for displaying additional information about the menu item.

Figure 20D:
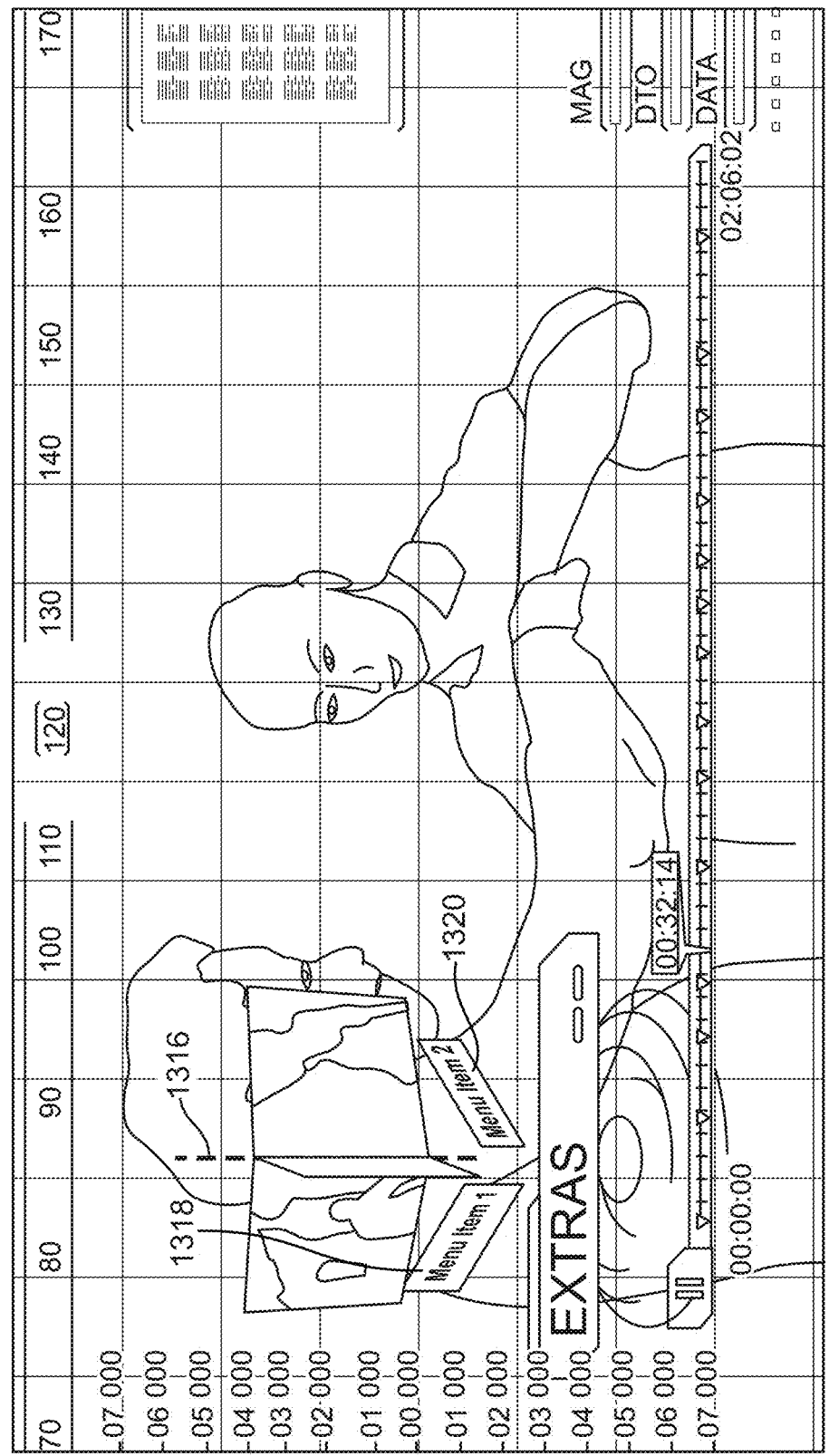
FIG. 20D illustrates an exemplary transition effect.
Figure 20E:
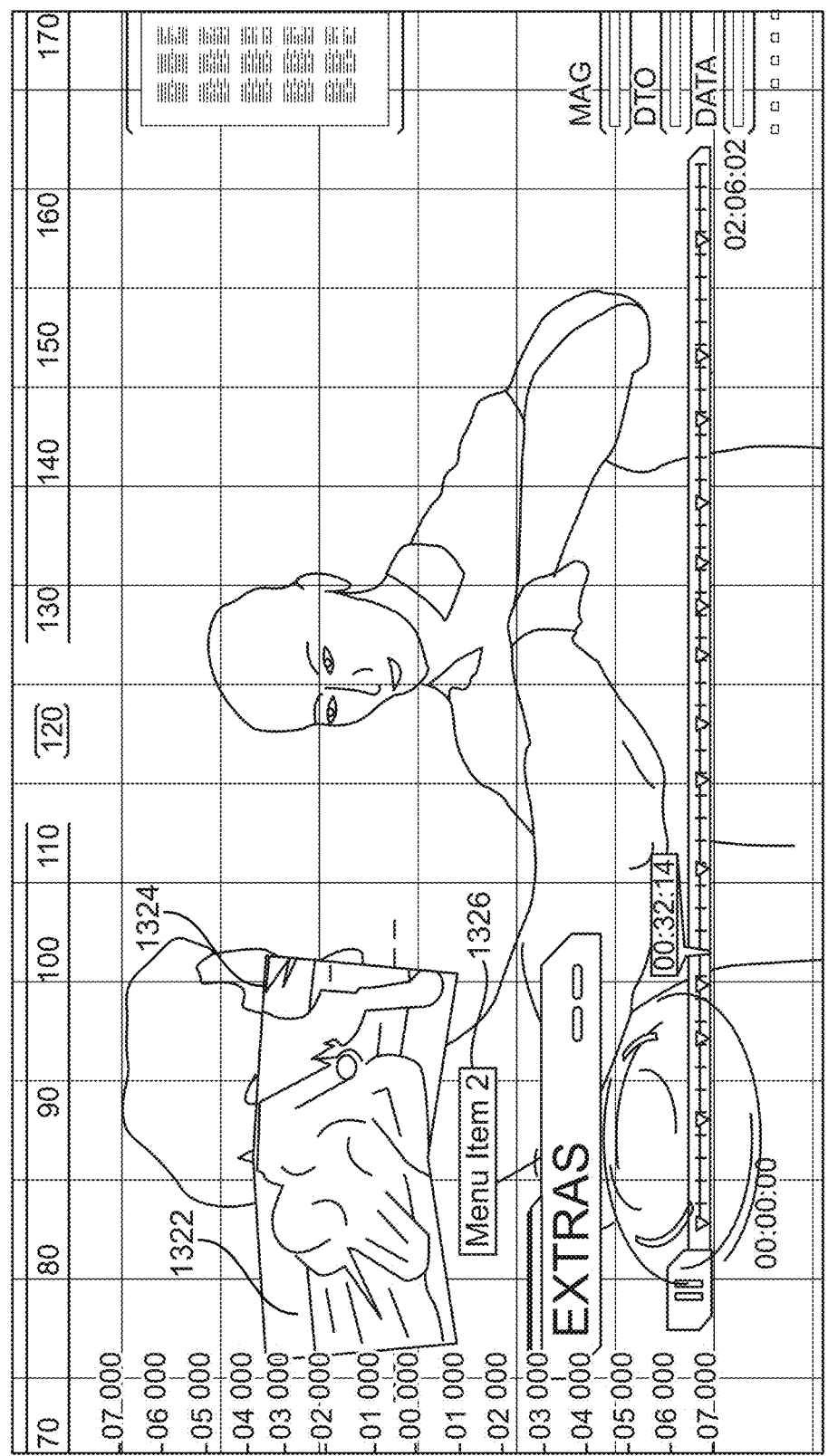
FIG. 20E illustrates an exemplary completed transition effect.

The user can either select the currently "highlighted" menu item, or she/he can move onto the next or previous item by making the "revolving door" revolve or spin (i.e., via scrolling). FIG. 20D illustrates the menu in the middle of revolving with respect to a virtual vertical axis 1316. Moreover, each of the areas (1318 and 1320) displaying additional information also revolves with its respective menu item. FIG. 20E shows the menu having revolved to the next menu item 1322 (making it in the currently "highlighted" position 1324). Its additional information 1326 has also revolved with it. The user can select the item 1322 or continue moving onto other menu items.

When the user no longer wants or needs to select items, he/she can deactivate the menu or the menu can automatically deactivate. During deactivation, the menu can rotate in the direction opposite to that during initiation/activation (1306 in FIG. 20B). In other words, the menu can rotate downward (and "into" the screen) along the virtual horizontal axis (1308 in FIG. 20B). Deactivation can be completed when the menu has rotated into its initial position (1302 in FIG. 20A).

Additionally, consistent with the principles herein disclosed, a widget or inspector can customize and adjust known variables within the JavaScript code. For example, in the case of this menu element, a widget or inspect can alter the number of menu items (i.e., the number of wings/leaves), the revolution/spin speed of the revolving door, the angles and/or degrees of the position of the revolving door, and other details.

Figure 21A:
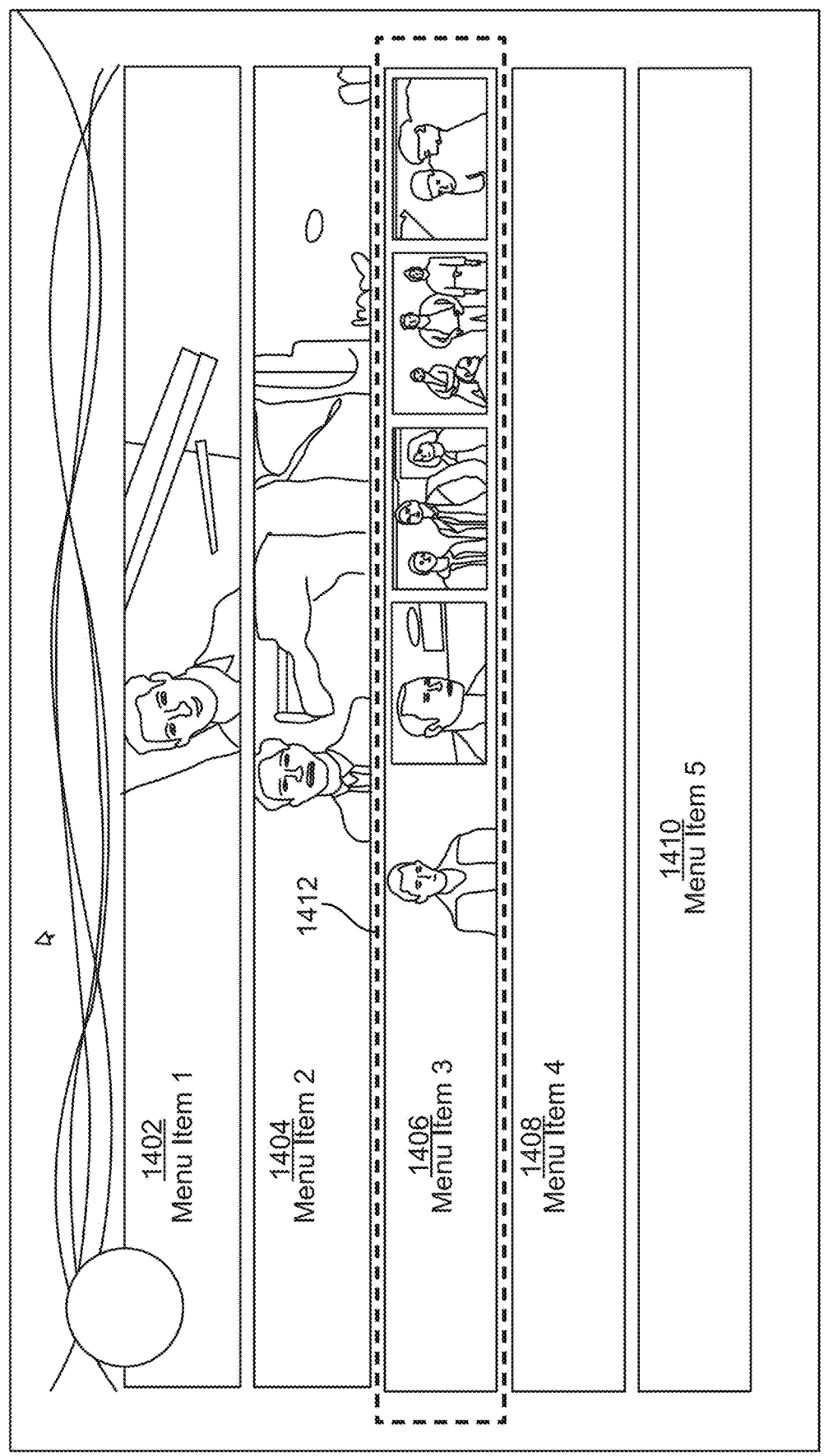
FIG. 21A illustrates an exemplary 3-Dimensional, prism menu JavaScript element.

FIG. 21A illustrates an example 3-Dimensional, prism menu JavaScript element. In this particular non-limiting example embodiment, only elongated triangular prisms are used, but other prisms can be used as well. In this example, each triangular prism can represent a menu item. FIG. 21A illustrates five menu items (1402 through 1410), each being represented by a prism. When an item is not in the currently "highlighted" (i.e., to be selected) position, it can be represented by one face of its prism (denote it as the non-"highlighted" face). When an item is currently "highlighted," it can be represented by another different prism face (denote it as the "highlighted" face). FIG. 21A shows "Menu Item 3" 1406 being currently "highlighted" and showing its "highlighted" prism face 1412. The "highlighted" prism face 1406 of "Menu Item 3" shows more detailed information 1414 about the menu item 1406. As a user moves away (i.e., scrolls up or down) from the currently "highlighted" "Menu Item 3" 1406, the prism of "Menu Item 3" 1406 will "roll" along a virtual horizontal axis to show its non-"highlighted" face. Its non-"highlighted" prism face can contain just the basic information about the item.

Figure 21B:
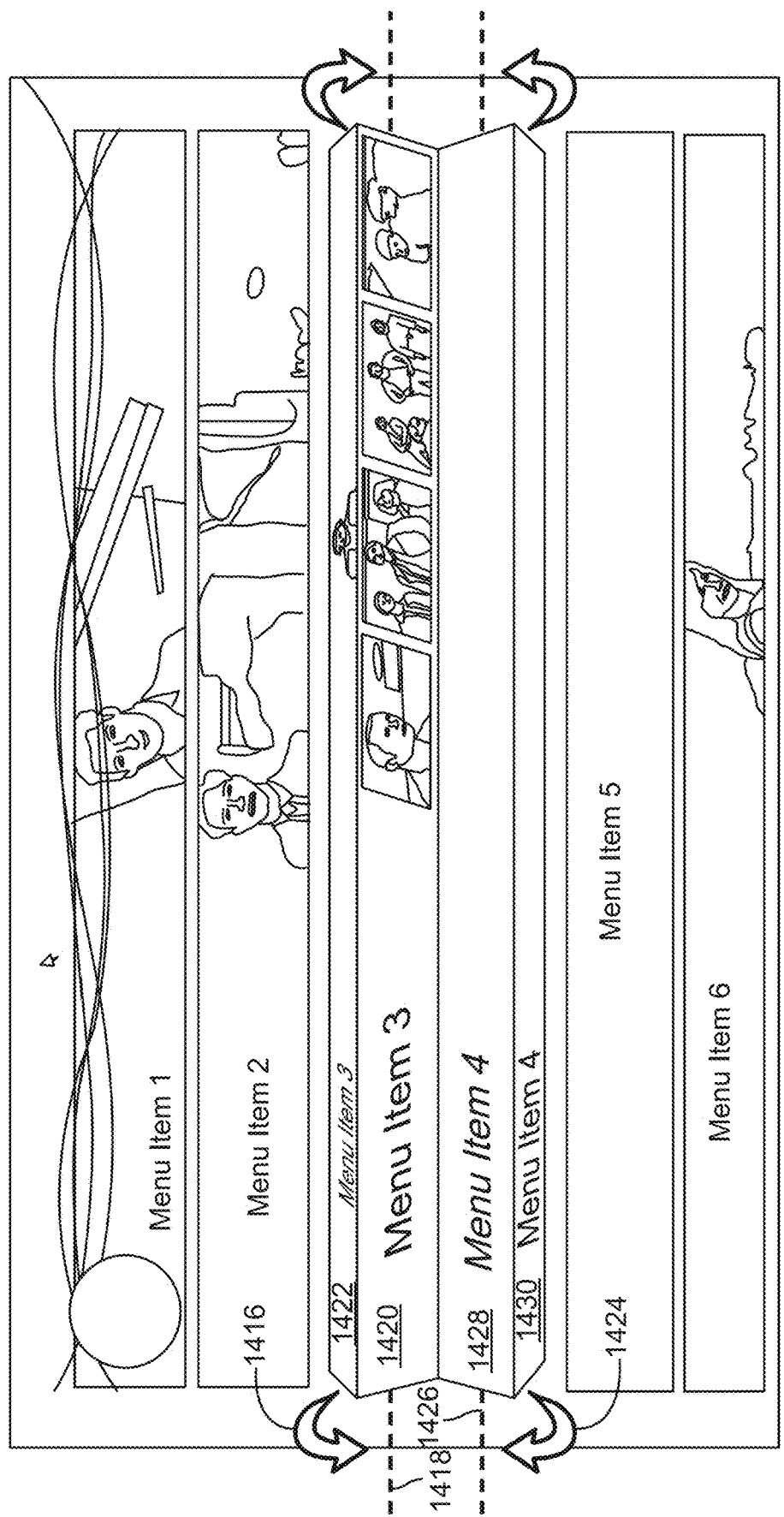
FIG. 21B illustrates an exemplary transition effect.

FIG. 21B illustrates a user moving away (i.e., scrolling down) from "Menu Item 3." As he/she scrolls down away from "Menu Item 3," the prism for "Menu Item 3" will "roll" 1416 (i.e., rotate downward and into the screen), along a virtual horizontal axis 1418, away from its "highlighted" face 1420 to show its non-"highlighted" face 1422, which contains just the basic information about "Menu Item 3." Simultaneously, the prism for "Menu Item 4" also begins to "roll" 1424 (i.e., upward and into the screen), along a horizontal axis 1426, from its non-"highlighted" face 1428 to its "highlighted" face 1430. Similarly, the "highlighted" face of "Menu Item 4" can display more detailed information about "Menu Item 4" while its non-"highlighted" face can display just the basic information. (Note: The description of the direction and manner of "rolling" herein is by non-limiting example only. One of ordinary skill in the art would know that "rolling" can occur in other ways consistent with the present disclosure. Also Note: As the user scrolls down, other menu items, such as "Menu Item 6," can become visible on the screen, while previous ones, such as "Menu Item 1," begin to go off screen.)

Figure 21C:
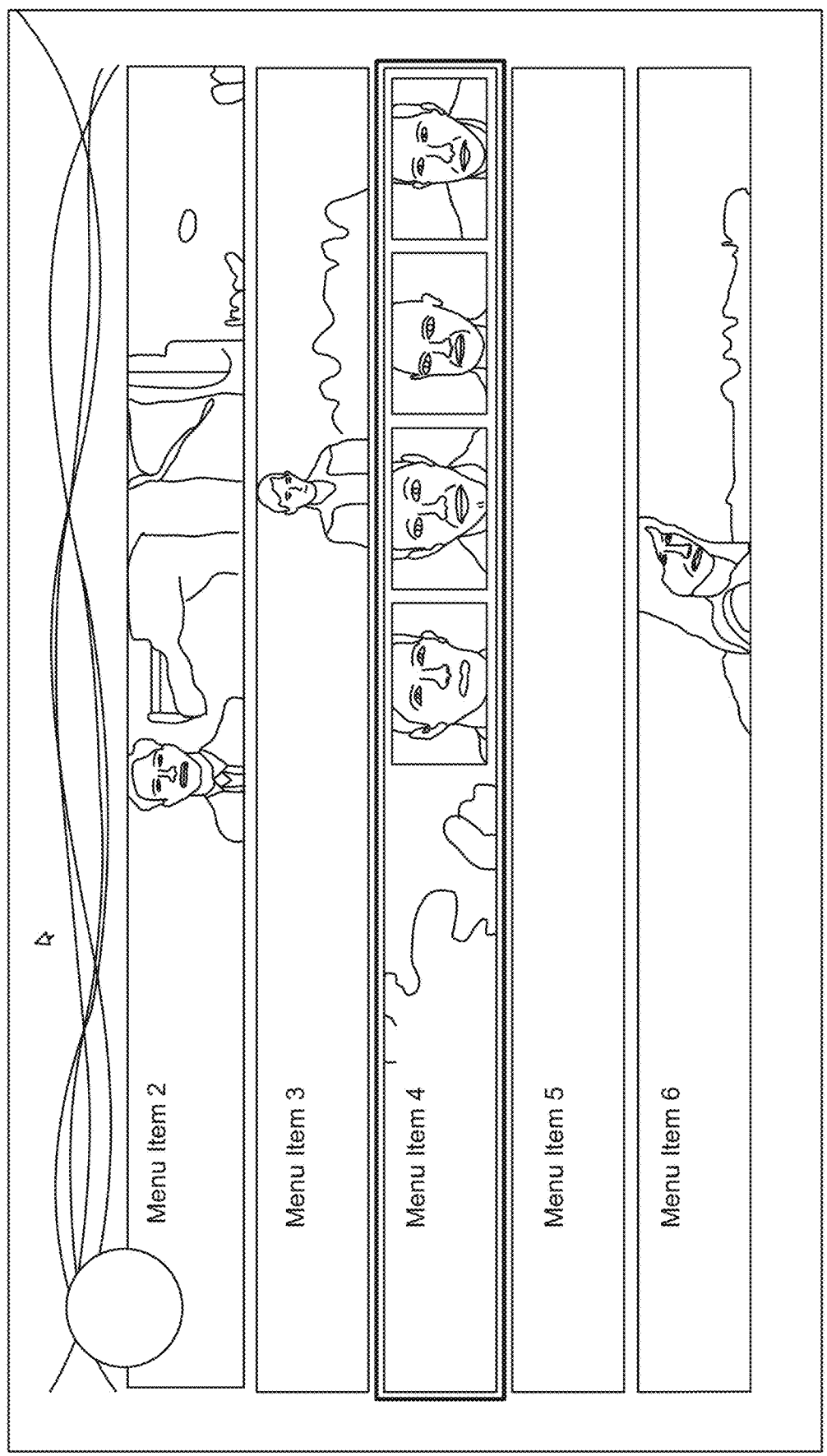
FIG. 21C illustrates an exemplary completed transition effect.
Figure 21D:
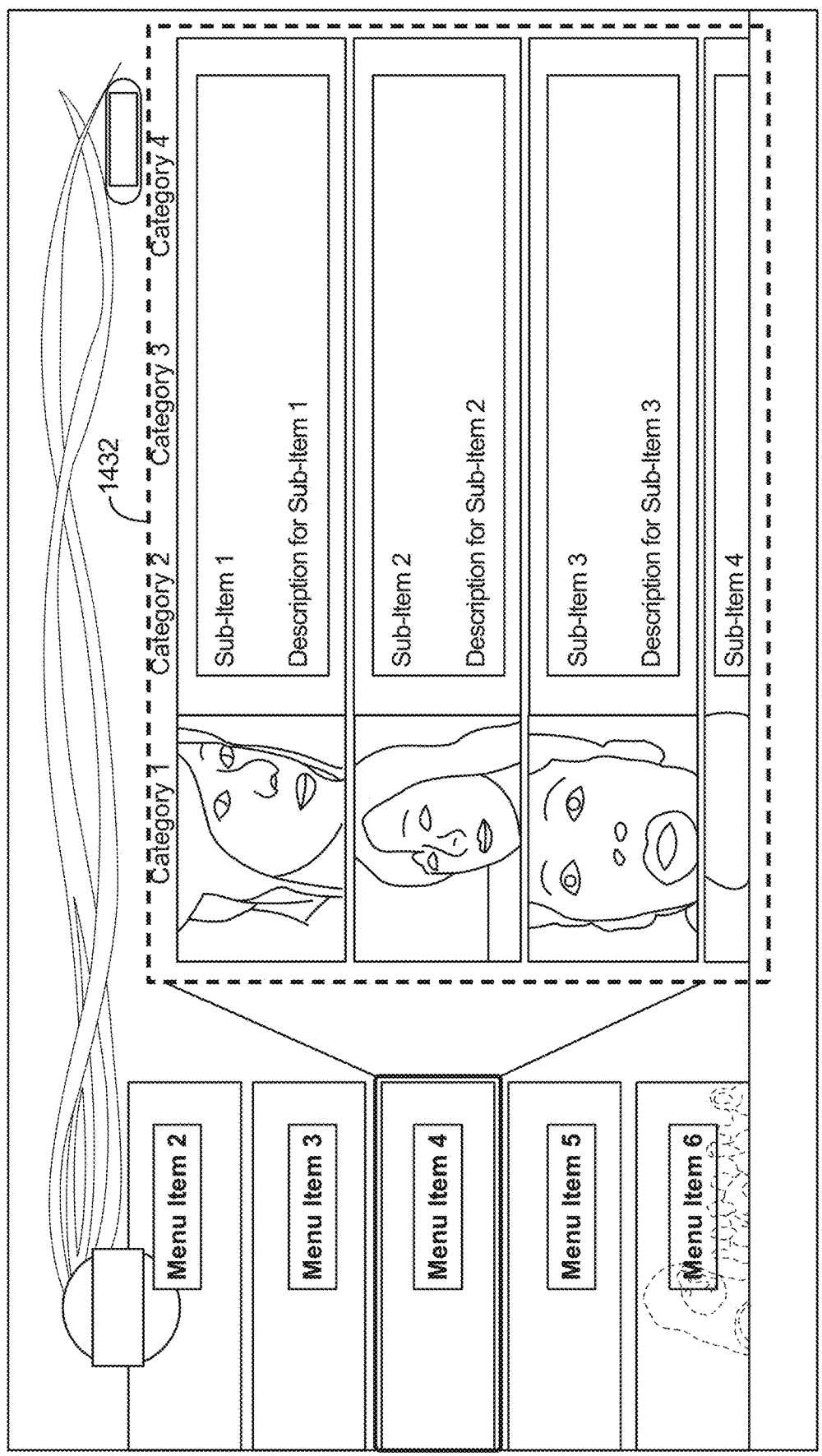
FIG. 21D illustrates an exemplary selection of a menu-item.
Figure 21E:
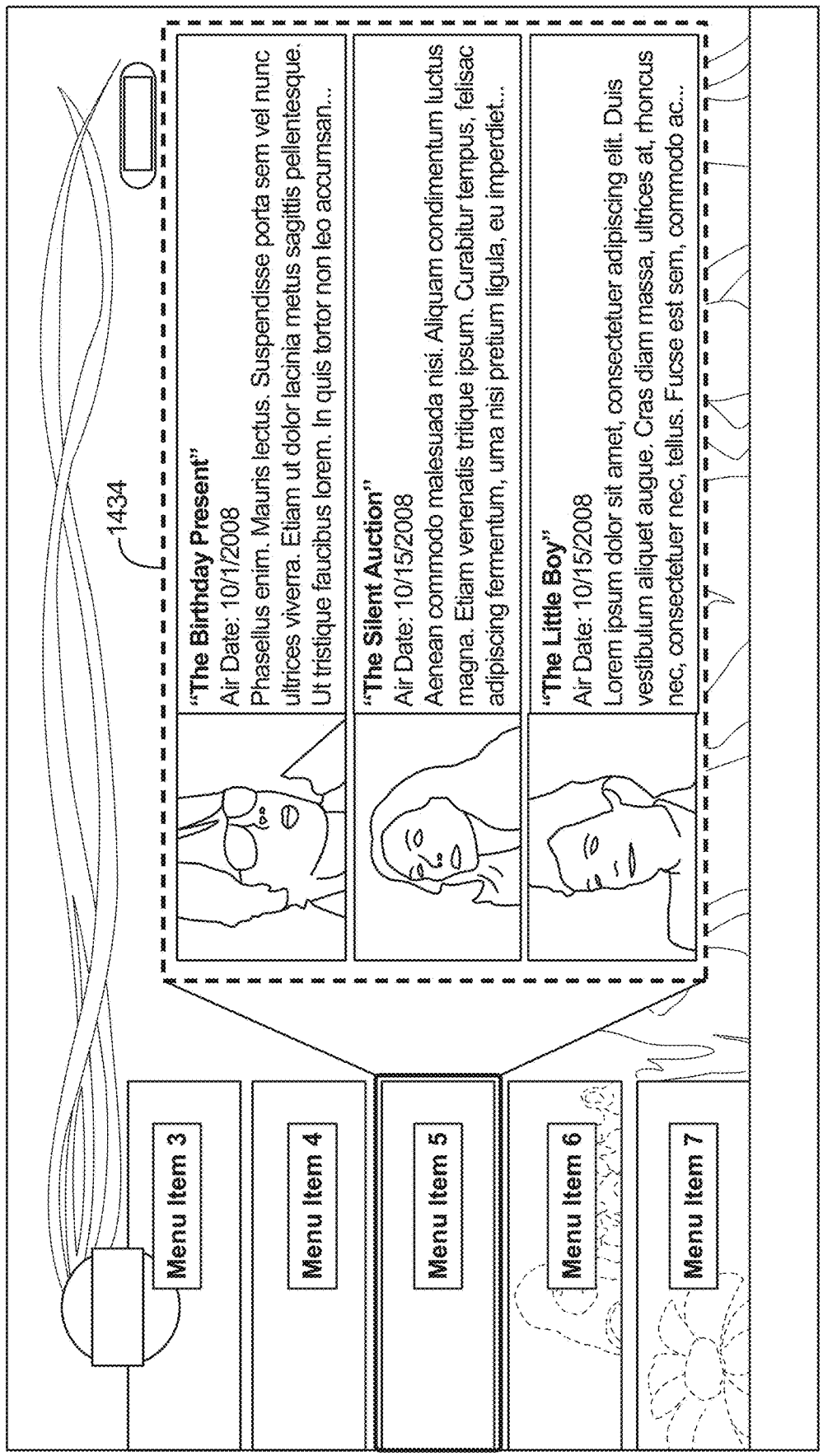
FIG. 21E illustrates an exemplary selection of a menu-item.

FIG. 21C shows "Menu Item 4" in its currently "highlighted" position after "rolling." The user can select this item or continue scrolling up or down. If the user selects this item, his/her selection can lead to a sub-menu 1432, as shown in FIG. 21D. FIG. 21D illustrates the sub-menu 1432 resulting from selecting a menu item. The user can scroll through the sub-items (i.e., scroll up or down in the area where the sub-items are positioned) in the current category ("Category 1") of the sub-menu 1432 and select a sub-item to initiate it, or he/she can choose a different category (i.e., by scroll left or right at the category area, or by selecting another category) and do the same. Additionally, the user can even scroll through (i.e., scroll up or down in the area where the menu items are positioned) the menu items and select another menu item, which can result in that menu item's own sub-menu and sub-items. FIG. 21E shows the user having scrolled to "Menu Item 5," resulting in the sub-menu 1434 of "Menu Item 5." The user can select a sub-item of his/her choice by scrolling through the sub-items and/or categories. The user can also scroll through the menu items here, or he/she can return to the previous 3-Dimensional, triangular prism menu (i.e., by scrolling right to view the off screen area to the left), and/or he/she can come back to the sub-menu again (i.e., by scrolling left to view the off screen area to the right).

Furthermore, adjusting or customizing this example element can be achieved by using a widget or an inspector. A widget or an inspector can change certain variables within the JavaScript code, thereby allowing those with little or no knowledge of computer code to nonetheless perform customizations and adjustments. The widget or inspector can adjust the number of menu items, the number of sub-menus, the number of sub-menu items, the number of categories, the speed of scrolling, the speed of "rolling," the direction of "rolling," and many other details.

Figure 22:
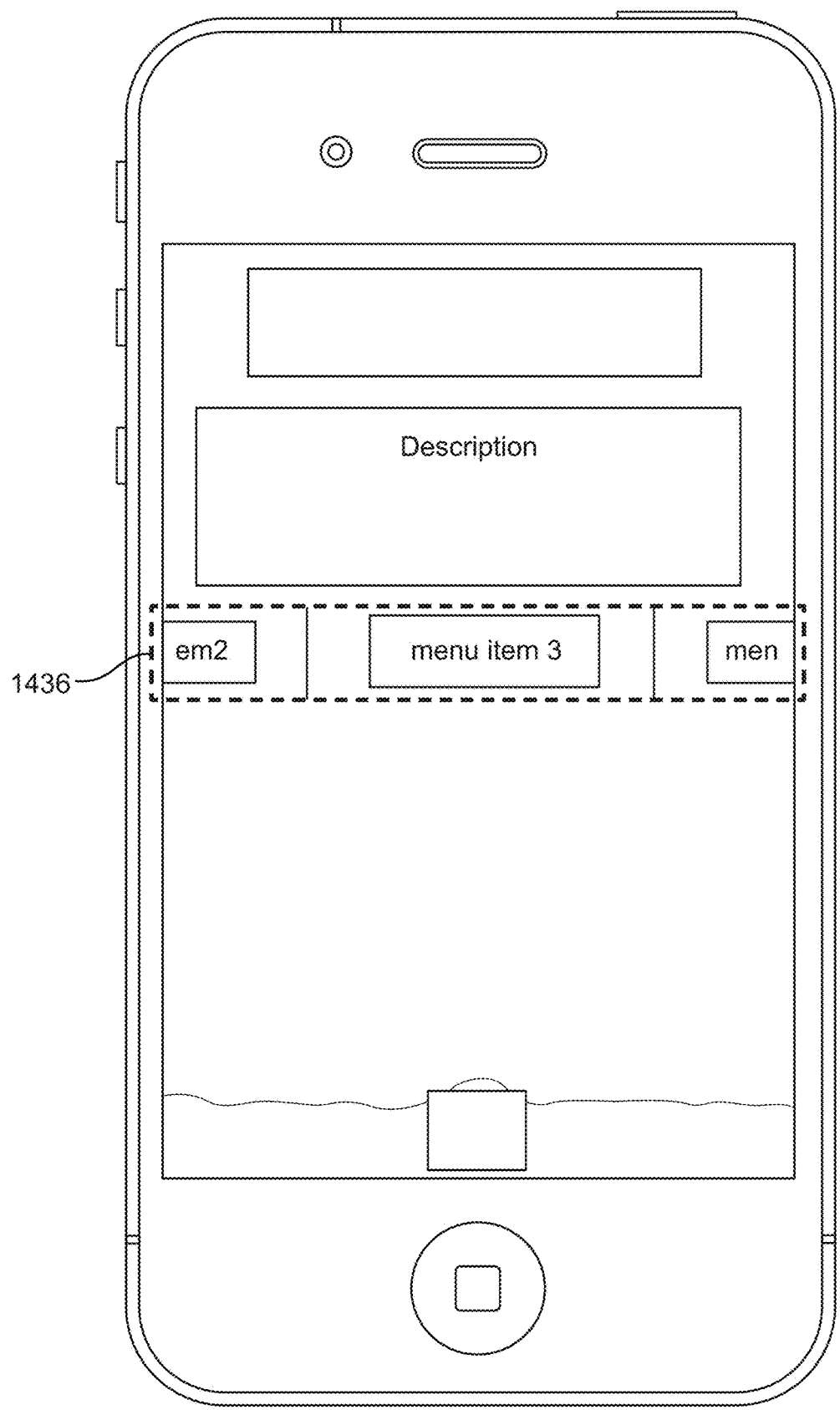
FIG. 22 illustrates an exemplary sliding strip menu JavaScript element.

FIG. 22 illustrates an example sliding strip menu JavaScript element. A user can scroll through menu items by freely sliding the menu, which can be in the form of a horizontal strip 1436 across the screen. The menu can be slid or shifted to any position of the user's choice without the background having to change. Sliding the menu can be accomplished by scrolling the menu strip with a pointing device (i.e., computer mouse) or by swiping a finger, on the menu strip, horizontally across the screen (i.e., touchscreen). The user can select any menu item that is visible on the screen to him/her.

In this example, a widget or inspect can adjust the number of menu items, the location of the sliding strip, the orientation of the sliding strip (i.e., horizontal, vertical, diagonal), and other details.

While many adjustments can be made to the form or function of user-interface elements to allow users with little or no experience working with code to create high quality content, the present technology also facilitates and allows an advanced user to add new elements or customize new elements.

Figure 23:
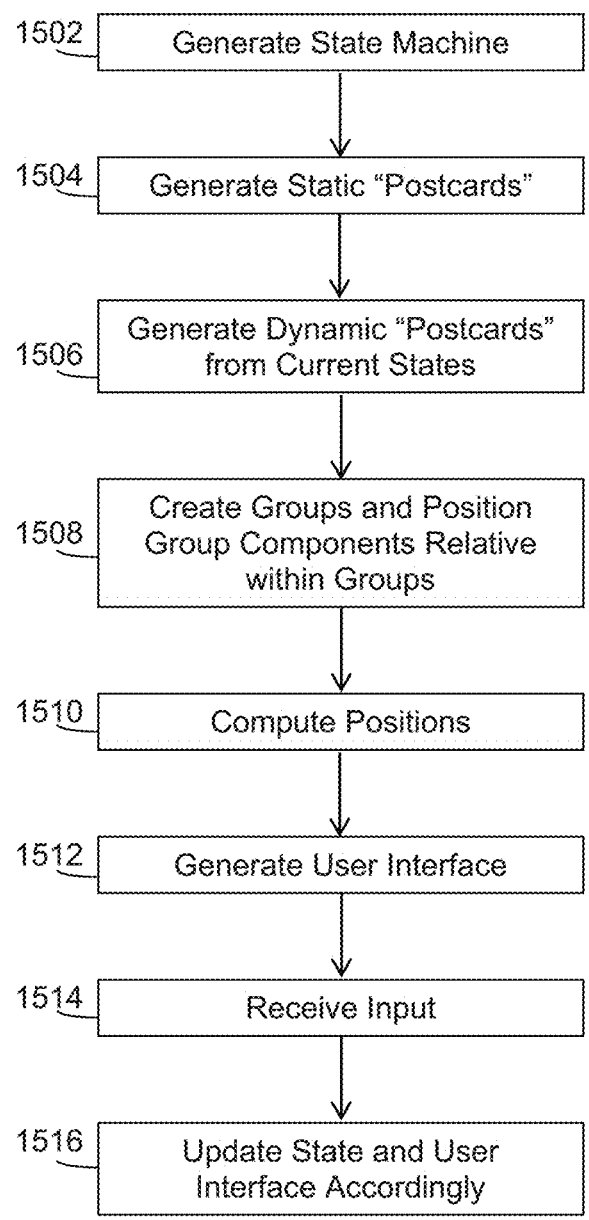
FIG. 23 illustrates an exemplary method of building a menu JavaScript element.

FIG. 23 shows a flowchart illustrating an exemplary method for building a system with elements consistent with the present principles herein disclosed. This particular exemplary method can relate to a virtual 3-Dimensional system such as those illustrated in FIG. 18 and FIG. 19. The method generates 1502 a finite state machine, giving all state variables their initial or default values. The method also generates 1504 static "postcards" and relates appropriate state variables with them. "Postcards" can be representations of states in the environment/interface that a user interacts with. Additionally, the method can generate 1506 dynamic "postcards" depending on the current state of the system. As such, a "postcard" (i.e., a static postcard) can represent a menu item in the "highlighted" position, or it (i.e., a dynamic postcard) can represent a user's moving between menu items, depending on the current state.

The method also creates 1508 groups (i.e., menus, sub-menus, menu-item groups, sub-menu item groups, etc.) and their components (i.e., menu-items, sub-menu items), and positions the groups and their components relative within the groups, depending on the current state of the system. Based on the current state, the method can compute 1510 the positions of the groups and group components. In this particular non-limiting example, the method can compute the positions of the menu and menu-items within the virtual 3-Dimensional space, based on the current state variables.

An interactive and/or animated user interface and/or environment can be generated 1512 based on the "postcards," the computed positions of the groups and group components, and/or current state variables. In this particular example, the generated user interface/environment can be a virtual 3-Dimensional space. The method can receive 1514 input (i.e., receive user input via the user interface) and update 1516 state variables and the user interface/environment accordingly.

The method also allows for a widget or inspector to alter the creation of the finite state machine (i.e., change the state variables) and/or adjust the various parameters of the system (i.e., states, state variables). As such, adjusting or customizing the system can be performed without necessarily having extensive knowledge of computer code.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method, comprising:
    at an electronic device with a display device and one or more input devices:
        displaying, via the display device, a user interface in a simulated three-dimensional environment that includes a plurality of selectable user interface objects, wherein the plurality of selectable user interface objects have different positions in the simulated three-dimensional environment, and one or more of the selectable user interface objects are displayed with a simulated depth of field effect that includes applying a respective degree of blurring to the one or more selectable user interface objects;
        while displaying the user interface in the simulated three-dimensional environment, detecting, via the one or more input devices, a first navigation input; and
        in response to detecting the first navigation input, performing a first navigation operation that includes displaying, via the display device, the one or more user interface objects at a different position in the simulated three-dimensional environment, and, in conjunction with moving the one or more user interface objects in the simulated three-dimensional environment, updating the respective degree of blurring applied to the one or more user interface objects based on the simulated depth of field effect and a respective current position of the one or more user interface objects in the simulated three-dimensional environment, including decreasing the degree of blurring applied to a respective user interface object of the one or more user interface objects in conjunction with moving the respective user interface object closer to the respective viewpoint.

2. The method of claim 1, wherein detecting the first navigation input includes detecting a selection input directed to a first selectable user interface object of the one or more selectable user interface objects.

3. The method of claim 1, wherein moving the one or more user interface objects in the simulated three-dimensional environment includes moving the one or more user interface objects closer to a respective viewpoint.

4. The method of claim 3, wherein the respective viewpoint is a simulated user viewpoint.

5. The method of claim 1, wherein performing the first navigation operation includes moving the one or more user interface objects in a first direction in the simulated three-dimensional environment, and the method further includes:
    while displaying the user interface in the simulated three-dimensional environment, detecting, via the one or more input devices, a second navigation input; and
    in response to detecting the second navigation input, performing a second navigation operation that includes moving the one or more user interface objects in a second direction that is orthogonal to the first direction in the simulated three-dimensional environment.

6. The method of claim 1, wherein performing the first navigation operation includes animating away the respective degree of blurring applied to the one or more selectable user interface objects.

7. An electronic device, comprising:
    one or more processors; and
    memory, wherein the memory is in communication with a display device and one or more input devices, and wherein the memory includes instructions, the instructions, which when executed by the one or more processors, cause the one or more processors to perform operations comprising:
        displaying, via the display device, a user interface in a simulated three-dimensional environment that includes a plurality of selectable user interface objects, wherein the plurality of selectable user interface objects have different positions in the simulated three-dimensional environment, and one or more of the selectable user interface objects are displayed with a simulated depth of field effect that includes applying a respective degree of blurring to the one or more selectable user interface objects;
        while displaying the user interface in the simulated three-dimensional environment, detecting, via the one or more input devices, a first navigation input; and
        in response to detecting the first navigation input, performing a first navigation operation that includes displaying, via the display device, the one or more user interface objects at a different position in the simulated three-dimensional environment, and, in conjunction with moving the one or more user interface objects in the simulated three-dimensional environment, updating the respective degree of blurring applied to the one or more user interface objects based on the simulated depth of field effect and a respective current position of the one or more user interface objects in the simulated three-dimensional environment, including decreasing the degree of blurring applied to a respective user interface object of the one or more user interface objects in conjunction with moving the respective user interface object closer to the respective viewpoint.

8. The electronic device of claim 7, wherein detecting the first navigation input includes detecting a selection input directed to a first selectable user interface object of the one or more selectable user interface objects.

9. The electronic device of claim 7, wherein moving the one or more user interface objects in the simulated three-dimensional environment includes moving the one or more user interface objects closer to a respective viewpoint.

10. The electronic device of claim 9, wherein the respective viewpoint is a simulated user viewpoint.

11. The electronic device of claim 7, wherein performing the first navigation operation includes moving the one or more user interface objects in a first direction in the simulated three-dimensional environment, and the memory further includes instructions for:
    while displaying the user interface in the simulated three-dimensional environment, detecting, via the one or more input devices, a second navigation input; and
    in response to detecting the second navigation input, performing a second navigation operation that includes moving the one or more user interface objects in a second direction that is orthogonal to the first direction in the simulated three-dimensional environment.

12. The electronic device of claim 7, wherein performing the first navigation operation includes animating away the respective degree of blurring applied to the one or more selectable user interface objects.

13. A non-transitory computer-readable storage medium storing instructions, the instructions, which when executed by one or more processors, cause the one or more processors to perform operations comprising:
  displaying, via a display device, a user interface in a simulated three-dimensional environment that includes a plurality of selectable user interface objects, wherein the plurality of selectable user interface objects have different positions in the simulated three-dimensional environment, and one or more of the selectable user interface objects are displayed with a simulated depth of field effect that includes applying a respective degree of blurring to the one or more selectable user interface objects;
  while displaying the user interface in the simulated three-dimensional environment, detecting, via one or more input devices, a first navigation input; and
  in response to detecting the first navigation input, performing a first navigation operation that includes displaying, via the display device, the one or more user interface objects at a different position in the simulated three-dimensional environment, and, in conjunction with moving the one or more user interface objects in the simulated three-dimensional environment, updating the respective degree of blurring applied to the one or more user interface objects based on the simulated depth of field effect and a respective current position of the one or more user interface objects in the simulated three-dimensional environment, including decreasing the degree of blurring applied to a respective user interface object of the one or more user interface objects in conjunction with moving the respective user interface object closer to the respective viewpoint.

14. The non-transitory computer-readable storage medium of claim 13, wherein detecting the first navigation input includes detecting a selection input directed to a first selectable user interface object of the one or more selectable user interface objects.

15. The non-transitory computer-readable storage medium of claim 13, wherein moving the one or more user interface objects in the simulated three-dimensional environment includes moving the one or more user interface objects closer to a respective viewpoint.

16. The non-transitory computer-readable storage medium of claim 15, wherein the respective viewpoint is a simulated user viewpoint.

17. The non-transitory computer-readable storage medium of claim 13, wherein performing the first navigation operation includes moving the one or more user interface objects in a first direction in the simulated three-dimensional environment, and the computer-readable storage medium further includes instructions for:
  while displaying the user interface in the simulated three-dimensional environment, detecting, via the one or more input devices, a second navigation input; and
  in response to detecting the second navigation input, performing a second navigation operation that includes moving the one or more user interface objects in a second direction that is orthogonal to the first direction in the simulated three-dimensional environment.

18. The non-transitory computer-readable storage medium of claim 13, wherein performing the first navigation operation includes animating away the respective degree of blurring applied to the one or more selectable user interface objects.

* * * * *